US012439086B2

(12) United States Patent
Kim

(10) Patent No.: US 12,439,086 B2
(45) **Date of Patent: *Oct. 7, 2025**

(54) IMAGE DATA ENCODING/DECODING METHOD AND APPARATUS

(71) Applicant: B1 INSTITUTE OF IMAGE TECHNOLOGY, INC., Seoul (KR)

(72) Inventor: Ki Baek Kim, Seoul (KR)

(73) Assignee: B1 INSTITUTE OF IMAGE TECHNOLOGY INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,056

(22) Filed: Jun. 18, 2024

(65) Prior Publication Data

US 2024/0340451 A1 Oct. 10, 2024

Related U.S. Application Data

(63) Continuation of application No. 18/364,056, filed on Aug. 2, 2023, now Pat. No. 12,069,304, which is a (Continued)

(30) Foreign Application Priority Data

Oct. 4, 2016 (KR) ........................ 10-2016- 0127890
Oct. 6, 2016 (KR) ........................ 10-2016-0129389
Jul. 17, 2017 (KR) ........................ 10-2017-0090619

(51) Int. Cl.
*H04N 19/597* (2014.01)
*G06T 3/16* (2024.01)
(Continued)

(52) U.S. Cl.
CPC ............ *H04N 19/597* (2014.11); *G06T 3/16* (2024.01); *H04N 13/139* (2018.05); (Continued)

(58) Field of Classification Search
CPC .... H04N 19/597; H04N 19/70; H04N 13/139; H04N 13/161
See application file for complete search history.

(56) References Cited

U.S. PATENT DOCUMENTS

2014/0355669 A1* 12/2014 Chien ................ H03M 7/4018 375/240.02
2016/0165209 A1* 6/2016 Huang ................ H04N 19/597 348/43
(Continued)

*Primary Examiner* — Rowina J Cattungal

(57) ABSTRACT

Disclosed are methods and apparatuses for image data encoding/decoding. A method of decoding an image includes receiving a bitstream in which the image is encoded; obtaining index information for specifying a block division type of a current block in the image; and determining the block division type of the current block from a candidate group pre-defined in the decoding apparatus. The candidate group includes a plurality of candidate division types, including at least one of a non-division, a first quad-division, a second quad-division, a binary-division or a triple-division. The method also includes dividing the current block into a plurality of sub-blocks; and decoding each of the sub-blocks with reference to syntax information obtained from the bitstream.

3 Claims, 43 Drawing Sheets

Related U.S. Application Data continuation of application No. 18/325,521, filed on May 30, 2023, now Pat. No. 11,902,578, which is a continuation of application No. 18/095,665, filed on Jan. 11, 2023, now Pat. No. 11,818,396, which is a continuation of application No. 17/580,053, filed on Jan. 20, 2022, now Pat. No. 11,601,677, which is a continuation of application No. 17/027,189, filed on Sep. 21, 2020, now Pat. No. 11,539,979, which is a continuation of application No. 16/375,748, filed on Apr. 4, 2019, now abandoned, which is a continuation of application No. PCT/KR2017/011152, filed on Oct. 10, 2017.

(51) Int. Cl.

| | |
|---|---|
| ***H04N 13/00*** | (2018.01) |
| ***H04N 13/139*** | (2018.01) |
| ***H04N 13/161*** | (2018.01) |
| ***H04N 19/70*** | (2014.01) |

(52) U.S. Cl.

CPC .......... *H04N 13/161* (2018.05); *H04N 19/70* (2014.11); *H04N 2013/0085* (2013.01)

(56) References Cited

U.S. PATENT DOCUMENTS

| | | | | |
|---|---|---|---|---|
| 2018/0205972 | A1* | 7/2018 | Piao | H04N 19/13 |
| 2021/0243461 | A1* | 8/2021 | Park | H04N 19/105 |
| 2021/0297684 | A1* | 9/2021 | Park | H04N 19/159 |

* cited by examiner

IMAGE DATA ENCODING/DECODING METHOD AND APPARATUS

RELATED APPLICATIONS

This application is a Continuation application of U.S. patent application Ser. No. 18/364,056, filed on Aug. 2, 2023, which is a Continuation application of U.S. patent application Ser. No. 18/325,521, filed on May 30, 2023, which is now U.S. Pat. No. 11,902,578, which is a Continuation application of U.S. patent application Ser. No. 18/095,665, filed on Jan. 11, 2023, which is now U.S. Pat. No. 11,818,396, which is a Continuation application of U.S. patent application Ser. No. 17/580,053, filed on Jan. 20, 2022, which is now U.S. Pat. No. 11,601,667, which is a Continuation application of U.S. patent application Ser. No. 17/027,189, filed on Sep. 21, 2020, which is now U.S. Pat. No. 11,539,979, which is a Continuation application of U.S. patent application Ser. No. 16/375,748, filed Apr. 4, 2019, now abandoned, which is a Continuation application of the International Patent Application Serial No. PCT/KR2017/011152, filed Oct. 10, 2017, which claims priority to the Korean Patent Application Serial No. 10-2016-0127890, filed Oct. 4, 2016; the Korean Patent Application Serial No. 10-2016-0129389, filed Oct. 6, 2016; and the Korean Patent Application Serial No. 10-2017-0090619, filed Jul. 17, 2017. All of these applications are incorporated by reference herein in their entireties.

TECHNICAL FIELD

The present invention relates to image data encoding and decoding technology, and more particularly, to a method and apparatus for encoding and decoding a 360-degree image for realistic media service.

BACKGROUND

With the spread of the Internet and mobile terminals and the development of information and communication technology, the use of multimedia data is increasing rapidly. Recently, demand for high-resolution images and high-quality images such as a high definition (HD) image and an ultra high definition (UHD) image is emerging in various fields, and demand for realistic media service such as virtual reality, augmented reality, and the like is increasing rapidly. In particular, since multi-view images captured with a plurality of cameras are processed for 360-degree images for virtual reality and augmented reality, the amount of data generated for the processing increases massively, but the performance of an image processing system for processing a large amount of data is insufficient.

As described above, in an image encoding and decoding method and apparatus of the related art, there is a demand for improvement of performance in image processing, particularly, image encoding/decoding.

SUMMARY

It is an object of the present invention to provide a method for improving an image setting process in initial steps for encoding and decoding. More particularly, the present invention is directed to providing an encoding and decoding method and apparatus for improving an image setting process in consideration of the characteristics of a 360-degree image.

According to an aspect of the present invention, there is provided a method of decoding a 360-degree image.

Here, the method of decoding a 360-degree image may include receiving a bitstream including an encoded 360-degree image, generating a predicted image with reference to syntax information acquired from the received bitstream, acquiring a decoded image by combining the generated predicted image with a residual image acquired by inversely quantizing and inversely transforming the bitstream, and reconstructing the decoded image into the 360-degree image according to a projection format.

Here, the syntax information may include projection format information for the 360-degree image.

Here, the projection format information may be information indicating at least one of an Equi-Rectangular Projection (ERP) format in which the 360-degree image is projected into a 2D plane, a CubeMap Projection (CMP) format in which the 360-degree image is projected to a cube, an OctaHedron Projection (OHP) format in which the 360-degree image is projected to an octahedron, and an IcoSahedral Projection (ISP) format in which the 360-degree image is projected to a polyhedron.

Here, the reconstructing may include acquiring arrangement information according to region-wise packing with reference to the syntax information and rearranging blocks of the decoded image according to the arrangement information.

Here, the generating of the predicted image may include performing image expansion on a reference picture acquired by restoring the bitstream, and generating a predicted image with reference to the reference picture on which the image expansion is performed.

Here, the performing of the image expansion may include performing image expansion on the basis of partitioning units of the reference picture.

Here, the performing of the image expansion on the basis of the partitioning units may include generating an expanded region individually for each partitioning unit by using the reference pixel of the partitioning unit.

Here, the expanded region may be generated using a boundary pixel of a partitioning unit spatially adjacent to a partitioning unit to be expanded or using a boundary pixel of a partitioning unit having image continuity with a partitioning unit to be expanded.

Here, the performing of the image expansion on the basis of the partitioning units may include generating an expanded image for a region where two or more partitioning units that are spatially adjacent to each other among the partitioning units are combined, using a boundary pixel of the combined region.

Here, the performing of the image expansion on the basis of the partitioning units may include generating an expanded region between partitioning units that are spatially adjacent to each other among the partitioning units, using all adjacent pixel information of the adjacent partitioning units.

Here, the performing of the image expansion on the basis of the partitioning units may include generating the expanded region using an average value of adjacent pixels of the spatially adjacent partitioning units.

Here, the generating of the predicted image may include generating a prediction block of a current block to be decoded using a reference region that is included within at least one reference picture and is set in a region having image continuity between faces according to the projection format, by referring to motion information obtained from the syntax information.

Here, the reference picture may be expanded in up, down, left, and right directions on the basis of image continuity according to the projection format, and then the reference region is set.

Here, the reference picture may be expanded in a face unit, and the reference region is set over the face boundary.

Here, the motion information may include at least one among a reference picture list to which the reference picture belongs, an index of the reference picture, and a motion vector indicating the reference region.

Here, the generating of the prediction block of the current block may include partitioning the current block into a plurality of sub-blocks and generating a prediction block for each of the plurality of sub-blocks that result from the partitioning.

With the image encoding/decoding method and apparatus according to an embodiment of the present invention, it is possible to enhance compression performance. In particular, for a 360-degree image, it is possible to enhance compression performance.

DETAILED DESCRIPTION

Figure 1:
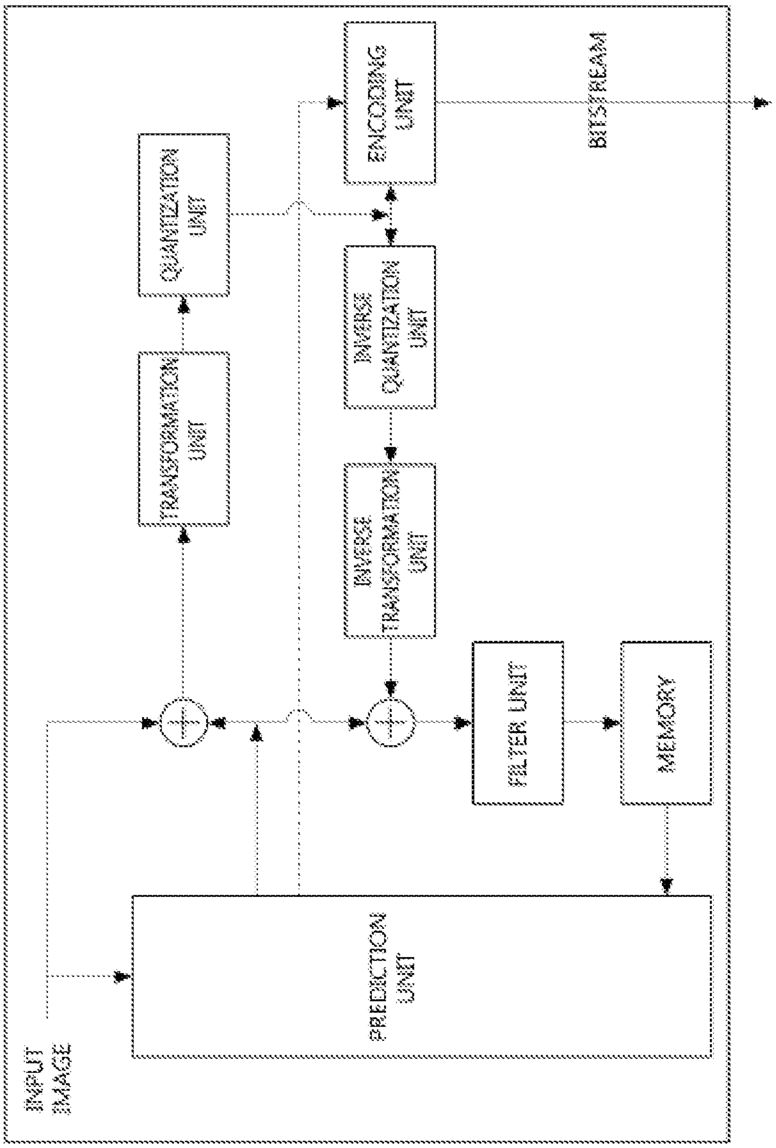
FIG. 1 is a block diagram of an image encoding apparatus according to an embodiment of the present invention.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term “and/or” includes any and all combinations of one or more of the associated listed items.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e., “between” versus “directly between”, “adjacent” versus “directly adjacent”, etc.).

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises”, “comprising,”, “includes” and/or “including”, when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An image encoding apparatus and an image decoding apparatus may each be a user terminal such as a personal computer (PC), a laptop computer, a personal digital assistant (PDA), a portable multimedia player (PMP), a PlayStation Portable (PSP), a wireless communication terminal, a smart phone, and a TV, a virtual reality (VR) device, an augmented reality (AR) device, a mixed reality (MR) device, a head mounted display (HMD) device, and smart glasses or a server terminal such as an application server and a service server, and may include various devices having a communication device, such as a communication modem, for communicating with various equipment or wired/wireless communication networks, a memory for storing various programs and data used to encode or decode an image or perform inter- or intra-prediction for the encoding or decoding, a processor for executing programs to perform computation and control operations, and so on. In addition, an image encoded into a bitstream by the image encoding apparatus may be transmitted, in real time or in non-real time, to the image decoding apparatus through a wired/wireless communication network such as the Internet, a short-range wireless network, a wireless local area network (LAN), a WiBro network, a mobile communication network or through a variety of communication interfaces such as a cable, a universal serial bus (USB), or the like. Then, the bitstream may be decoded by the image decoding apparatus to be restored and replayed as the image.

Also, the image encoded into the bitstream by the image encoding apparatus may be transferred from the image encoding apparatus to the image decoding apparatus through a computer-readable recording medium.

The above-described image encoding apparatus and decoding apparatus may be separate apparatuses, but may be provided as one image encoding/decoding apparatus according to the implementation. In this case, some elements of the image encoding apparatus may be substantially the same as those of the image decoding apparatus and may be implemented to include at least the same structures or perform the same functions.

Therefore, in the following detailed description of technical elements and their working principles, redundant description of the corresponding technical elements will be omitted.

Also, the image decoding apparatus corresponds to a computing apparatus that applies an image encoding method performed by the image encoding apparatus to a decoding process, and thus the following description will focus on the image encoding apparatus.

The computing apparatus may include a memory configured to store a program or a software mode for implementing an image encoding method and/or an image decoding method and a processor connected to the memory to execute the program. Also, the image encoding apparatus may also be referred to as an encoder, and the image decoding apparatus may also be referred to as a decoder.

Generally, an image may be composed of a series of still images. The still images may be classified in units of groups of pictures (GOPs), and each still image may be referred to as a picture. In this case, the picture may indicate one of a frame and a field in a progressive signal and an interlace signal. The picture may be represented as “frame” when encoding/decoding is performed on a frame basis and may be represented as “field” when encoding/decoding is performed on a field basis. The present invention assumes a progressive signal, but may also be applied to an interlace signal. As a higher concept, units such as a GOP and a sequence may exist, and also each picture may be partitioned into predetermined areas such as slices, tiles, blocks, and the like. Also, one GOP may include units such as I-picture, P-picture, and B-picture. I-picture may refer to a picture that is autonomously encoded/decoded without using a reference picture, and P-picture and B-picture may refer to a picture that is encoded/decoded by performing a process such as motion estimation and motion compensation using a reference picture. Generally, P-picture may use I-picture and B-picture as reference pictures, and B-picture may use I-picture and P-picture as reference pictures. However, the above definitions may also be changed by settings of encoding/decoding.

Here, a picture referred to in encoding/decoding is called a reference picture, and a block or pixel referred to in encoding/decoding is called a reference block or a reference pixel. Also, reference data may include frequency-domain coefficients and various types of encoding/decoding information generated and determined during an encoding/decoding process, as well as spatial-domain pixel values. For example, the reference data may correspond to intra-prediction information or motion information in a prediction part, transformation information in a transformation part/an inverse transformation part, quantization information in a quantization part/an inverse quantization part, encoding/decoding information (context information) in an encoding part/a decoding part, filter information in an in-loop filter part, and the like.

The minimum unit of the image may be a pixel, and the number of bits used to represent one pixel is called a bit depth. Generally, the bit depth may be eight bits, and a bit depth of eight or more bits may be supported depending on the encoding settings. At least one bit depth may be supported depending on a color space. Also, at least one color space may be included according to an image color format. One or more pictures having the same size or one or more pictures having different sizes may be included according to a color format. For example, YCbCr 4:2:0 may be composed of one luminance component (Y in this example) and two chrominance components (Cb/Cr in this example). At this time, the composition ratio of the chrominance components and the luminance component may be 1:2 in width and height. As another example, YCbCr 4:4:4 may have the same composition ratio in width and height. Like the above example, when one or more color spaces are included, a picture may be partitioned into the color spaces.

The present invention will be described on the basis of any color space (Y in this example) of any color format (YCbCr in this example), and this description will be applied to another color space (Cb and Cr in this example) of the color format in the same or similar manner (settings dependent on a specific color space). However, a partial difference (settings independent of a specific color space) may be given to each color space. That is, the settings dependent on each color space may refer to settings proportional to or dependent on the composition ratio of each component (e.g., 4:2:0, 4:2:2, or 4:4:4), and the setting independent of each color space may refer to settings of only a corresponding color space, independently from or regardless of the composition ratio of each component. In the present invention, some elements may have independent settings or dependent settings depending on the encoder/decoder.

Setting information or syntax elements needed during an image encoding process may be determined at a level of units such as a video, a sequence, a picture, a slice, a tile, a block, and the like. The units include a video parameter set (VPS), a sequence parameter set (SPS), a picture parameter set (PPS), a slice header, a tile header, and a block header. An encoder may add the units to a bitstream and send the bitstream to a decoder. The decoder may parse the bitstream at the same level, restore the setting information sent by the encoder, and use the setting information in an image decoding process. Also, related information may be transmitted through a bitstream in the form of supplement enhancement information (SEI) or metadata, and then may be parsed and then used. Each parameter set has a unique ID value, and a lower parameter set may have an ID value of an upper parameter set to be referred to. For example, a lower parameter set may refer to information of an upper parameter set having a corresponding ID value among one or more upper parameter sets. Among various examples of the above-described units, when any one unit includes one or more different units, the any one unit may be referred to as an upper unit, and the included units may be referred to as a lower unit.

Setting information having occurred in such a unit may include settings independent of each unit or settings dependent on a previous, following, or upper unit. Here, it will be understood that the dependent settings indicate setting information of a corresponding unit using flag information corresponding to settings of the previous, following, or upper unit (e.g., 1-bit flag; 1 indicates Follow, and 0 indicates Do Not Follow). In the present invention, the setting information will be described, focusing on an example of the independent settings. However, an example may also be included in which a relation dependent on the setting information of the previous, following, or upper unit of the current unit is added to, or substituted for, the independent settings.

Figure 2:
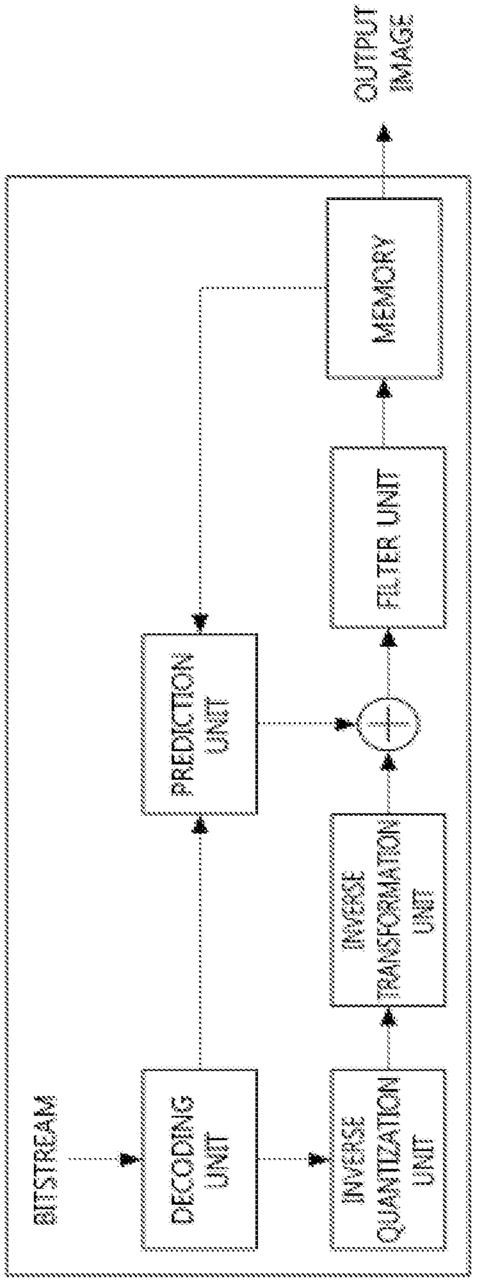
FIG. 2 is a block diagram of an image decoding apparatus according to an embodiment of the present invention.

FIG. 1 is a block diagram of an image encoding apparatus according to an embodiment of the present invention. FIG. 2 is a block diagram of an image decoding apparatus according to an embodiment of the present invention.

Referring to FIG. 1, the image encoding apparatus may be configured to include a prediction part, a subtractor, a transformation part, a quantization part, an inverse quantization part, an inverse transformation part, an adder, an in-loop filter part, a memory, and/or an encoding part, some of which may not necessarily be included. Some or all of the elements may be included selectively depending on the implementation, and some additional elements which are not shown herein may be included.

Referring to FIG. 2, the image decoding apparatus may be configured to include a decoding part, a prediction part, an inverse quantization part, an inverse transformation part, an adder, an in-loop filter part, and/or a memory, some of which may not necessarily be included. Some or all of the elements may be included selectively depending on the implementation, and some additional elements which are not shown herein may be included.

The image encoding apparatus and decoding apparatus may be separate apparatuses, but may be provided as one image encoding/decoding apparatus depending on the implementation. In this case, some elements of the image encoding apparatus may be substantially the same as those of the image decoding apparatus and may be implemented to include at least the same structures or perform the same functions. Therefore, in the following detailed description of technical elements and their working principles, redundant description of the corresponding technical elements will be omitted. The image decoding apparatus corresponds to a computing apparatus that applies an image encoding method performed by the image encoding apparatus to a decoding process, and thus the following description will focus on the image encoding apparatus. The image encoding apparatus may also be referred to as an encoder, and the image decoding apparatus may also be referred to as a decoder.

The prediction part may be implemented using a prediction module and may generate a prediction block by performing intra-prediction or inter-prediction on a block to be encoded. The prediction part generates the prediction block by predicting a current block to be encoded in an image. In other words, the prediction part may predict pixel values of pixels of a current block to be encoded in an image through intra-prediction or inter-prediction to generate a prediction block having predicted pixel values of the pixels. Also, the prediction part may deliver information needed to generate the prediction block to the encoding part so that prediction mode information is encoded. The encoding part adds corresponding information to a bitstream and transmits the bitstream to the decoder. The decoding part of the decoder may parse the corresponding information, restore the prediction mode information, and then use the prediction mode information to perform intra-prediction or inter-prediction.

The subtractor subtracts the prediction block from the current block to generate a residual block. In other words, the subtractor may calculate a difference between a pixel value of each pixel of the current block to be encoded and a predicted pixel value of each pixel of the prediction block generated through the prediction part to generate a residual block, which is a block-type residual signal.

The transformation part may transform a signal belonging to a space domain into a signal belonging to a frequency domain. In this case, a signal acquired through the transformation process is called a transformed coefficient. For example, the residual block with the residual signal delivered from the subtractor may be transformed into a transformation block with a transformed coefficient. In this case, an input signal is determined according to encoding settings and is not limited to the residual signal.

The transformation part may perform transformation on the residual block by using a transformation technique such as Hadamard Transform, Discrete Sine Transform (DST)-based transformation, and Discrete Cosine Transform (DCT)-based transformation. However, the present invention is not limited thereto, and various enhanced and modified transformation techniques may be used.

For example, at least one of the transformation techniques may be supported, and at least one detailed transformation technique may be supported in each transformation technique. In this case, the at least one detailed transformation technique may be a transformation technique in which some base vectors are differently constructed in each transformation technique. For example, as the transformation techniques, DST-based transformation and DCT-based transformation may be supported. Detailed transformation techniques such as DST-I, DST-II, DST-III, DST-V, DST-VI, DST-VII, and DST-VIII may be supported for DST, and detailed transformation techniques such as DCT-I, DCT-II, DCT-III, DCT-V, DCT-VI, DCT-VII, and DCT-VIII may be supported for DCT.

One of the transformation techniques may be set as a default transformation technique (e.g., one transformation technique && one detailed transformation technique), and additional transformation techniques may be supported (e.g., a plurality of transformation techniques||a plurality of detailed transformation techniques). Whether to support an additional transformation technique may be determined in units of sequences, pictures, slices, or tiles, and related information may be generated according to the units. When an additional transformation technique is supported, transformation technique selection information may be determined in block units, and related information may be generated.

The transformation may be performed horizontally and/or vertically. For example, two-dimensional (2D) transformation is performed by horizontally and vertically performing one-dimensional (1D) transformation using a base vector so that a pixel value in a spatial domain may be transformed into a frequency domain.

Also, the transformation may be performed horizontally and/or vertically in an adaptive manner. In detail, whether to perform the transformation in the adaptive manner may be determined according to at least one encoding setting. For the intra-prediction, for example, DCT-I may be applied horizontally and DST-I may be applied vertically when the prediction mode is a horizontal mode, DST-VI may be applied horizontally and DCT-VI may be applied vertically when the prediction model is a vertical mode, DCT-II may be applied horizontally and DCT-V may be applied vertically when the prediction mode is Diagonal down left, and DST-I may be applied horizontally and DST-VI may be applied vertically when the prediction mode is Diagonal down right.

The sizes and forms of transformation blocks may be determined according to encoding costs for candidates of the size and shape of the transformation blocks. Image data of the transformation blocks and information regarding the determined sizes and forms of the transformation blocks may be encoded.

Among the transformation forms, square transformation may be set as a default transformation form, and an additional transformation form (e.g., a rectangular form) may be supported. Whether to support an additional transformation form may be determined in units of sequences, pictures, slices, or tiles, and related information may be generated according to the units. Transformation form selection information may be determined in block units, and related information may be generated.

Also, whether to support a transformation block form may be determined according to encoding information. In this case, the encoding information may correspond to a slice type, an encoding mode, the size and shape of a block, a block partitioning scheme, etc. That is, one transformation form may be supported according to at least one piece of encoding information, and a plurality of transformation forms may be supported according to at least one piece of encoding information. The former case may be an implicit situation, and the latter case may be an explicit situation. For the explicit situation, adaptive selection information indicating an optimal candidate group selected from among a plurality of candidate groups may be generated and added to a bitstream. According to the present invention, in addition to this example, it will be understood that when encoding information is explicitly generated, the information is added to a bitstream in various units and related information is parsed in various units and restored into decoding information by the decoder. Also, it will be understood that when encoding/decoding information is implicitly processed, the processing is performed through the same process, rule, and the like by the encoder and decoder.

As an example, the support of the rectangular transformation may be determined according to a slice type. A transformation form supported for I-slice may be square transformation, and a transformation form supported for P/B-slice may be square or rectangular transformation.

As an example, the support of the rectangular transformation may be determined according to an encoding mode. A transformation form supported for intra-prediction may be square transformation, and a transformation form supported for inter-prediction may be square transformation and/or rectangular transformation.

As an example, the support of the rectangular transformation may be determined according to the size and shape of a block. A transformation form supported by a block of a certain size or greater may be square transformation, and a transformation form supported by a block of less than a certain size may be square transformation and/or rectangular transformation.

As an example, the support of the rectangular transformation may be determined according to a block partitioning scheme. When a block to be transformed is a block acquired through a quad-tree partitioning scheme, the supported transformation form may be square transformation. When a block to be transformed is a block acquired through a binary tree partitioning scheme, the supported transformation form may be square transformation or rectangular transformation.

The above example may be an example of the support of the transformation form according to one piece of encoding information, and a plurality of pieces of information may be associated with additional transformation form support settings in combination. The above example is merely an example of the additional transformation form support according to various encoding settings. However, the present invention is not limited thereto, and various modifications may be made thereto.

The transformation process may be omitted according to encoding settings or image characteristics. For example, the transformation process (including the inverse process) may be omitted according to encoding settings (e.g., in this example, a lossless compression environment is assumed). As another example, the transformation process may be omitted when compression performance through transformation is not shown according to the image characteristics. In this case, the transformation may be omitted for all the units or one of the horizontal unit and the vertical unit. Whether to support the omission may be determined according to the size and shape of a block.

For example, it is assumed that horizontal transformation and vertical transformation are set to be jointly omitted. The transformation may be performed neither horizontally nor vertically when a transformation omission flag is 1, and the transformation may be performed both horizontally and vertically when the transformation omission flag is 0. On the other hand, it is assumed that horizontal transformation and vertical transformation are set to be independently omitted. The horizontal transformation is not performed when a first transformation omission flag is 1, and the horizontal transformation is performed when the first transformation omission flag is 0. Then vertical transformation is not performed when a second transformation omission flag is 1, and the vertical transformation is performed when the second transformation omission flag is 0.

The omission of the transformation may be supported when the size of a block corresponds to a range A, and the omission of the transformation cannot be supported when the size of a block corresponds to a range B. For example, when the width of a block is greater than M or the height of a block is greater than N, the transformation omission flag cannot be supported. When the width of a block is less than m or the height of a block is less than n, the transformation omission flag may be supported. M (m) and N (n) may be the same as or different from each other. Settings associated with the transformation may be determined in units of sequences, pictures, slices, or the like.

When an additional transformation technique is supported, a transformation technique setting may be determined according to at least one piece of encoding information. In this case, the encoding information may correspond to a slice type, an encoding mode, the size and shape of a block, a prediction mode, etc.

As an example, the support of the transformation technique may be determined according to the encoding mode. The transformation technique supported for the intra-prediction may include DCT-I, DCT-III, DCT-VI, DST-II, and DST-III, and the transformation technique supported for the inter-prediction may include DCT-II, DCT-III, and DST-III.

As an example, the support of the transformation technique may be determined according to the slice type. The transformation technique supported for I-slice may include DCT-I, DCT-II, and DCT-III, the transformation technique supported for P-slice may include DCT-V, DST-V, and DST-VI, and the transformation technique supported for B-slice may include DCT-I, DCT-II, and DST-III.

As an example, the support of the transformation technique may be determined according to the prediction mode. The transformation technique supported by a prediction mode A may include DCT-I and DCT-II, the transformation technique supported by a prediction mode B may include DCT-I and DST-I, and the transformation technique supported by a prediction mode C may include DCT-I. In this case, the prediction mode A and the prediction mode B may be each a directional mode, and the predication mode C may be a non-directional mode.

As an example, the support of the transformation technique may be determined according to the size and shape of a block. The transformation technique supported by a block of a certain size or greater may include DCT-II, the transformation technique supported by a block of less than a certain size may include DCT-II and DST-V, and the transformation technique supported by a block of a certain size or greater and less than a certain size may include DCT-I, DCT-II, and DST-I. Also, the transformation technique supported in a square shape form may include DCT-I and DCT-II, and the transformation technique supported in a rectangular shape may include DCT-I and DST-I.

The above example may be an example of the support of the transformation technique according to one piece of encoding information, and a plurality of pieces of information may be associated with additional transformation technique support settings in combination. The present invention is not limited to the above example, and modifications may be made thereto. Also, the transformation part may deliver information needed to generate a transformation block to the encoding part so that the information is encoded. The encoding part adds corresponding information to a bitstream and transmits the bitstream to the decoder. The decoding part of the decoder may parse the information and use the parsed information in the inverse transformation process.

The quantization part may quantize input signals. In this case, a signal acquired through the quantization process is called a quantized coefficient. For example, the quantization part may quantize a residual block with a residual transformation coefficient delivered from the transformation part and thus acquire a quantization block with a quantization coefficient. In this case, the input signal is determined according to encoding settings and is not limited to the residual transformation coefficient.

The quantization part may use a quantization technique such as Dead Zone Uniform Threshold Quantization, Quantization Weighted Matrix, or the like to quantize the transformed residual block. However, the present invention is not limited thereto, and various quantization techniques that are improved and modified may be used. Whether to support an additional quantization technique may be determined in units of sequences, pictures, slices, or tiles, and related information may be generated according to the units. When an additional quantization technique is supported, quantization technique selection information may be determined in block units, and related information may be generated.

When an additional quantization technique is supported, a quantization technique setting may be determined according to at least one piece of encoding information. In this case, the encoding information may correspond to a slice type, an encoding mode, the size and shape of a block, a prediction mode, etc.

For example, the quantization part may differently set a quantization weighted matrix corresponding to an encoding mode and a weighted matrix applied according to the inter-prediction/intra-prediction. Also, the quantization part may differently set a weighted matrix applied according to an intra-prediction mode. In this case, when it is assumed that the quantization weighted matrix has a size of M×N, which is the same as the size of the quantization block, the quantization weighted matrix may be a quantization matrix in which some quantization components are differently constructed.

The quantization process may be omitted according to encoding settings or image characteristics. For example, the quantization process (including the inverse process) may be omitted according to encoding settings (e.g., in this example, a lossless compression environment is assumed). As another example, the quantization process may be omitted when compression performance through quantization is not shown according to the image characteristics. In this case, some or all of the regions may be omitted, and whether to support the omission may be determined according to the size and shape of a block.

Information regarding quantization parameters (QPs) may be generated in units of sequences, pictures, slices, tiles, or blocks. For example, a default QP may be set in an upper unit in which the QP information is first generated <1>, and a QP may be set to a value that is the same as or different from that of the QP set in the upper unit. In the quantization process performed in some units through the process, the QP may be finally determined. In this case, the unit such as a sequence and a picture may be an example corresponding to <1>, the unit such as a slice, a tile, and a block may be an example corresponding to <2>, and the unit such as a block may be an example corresponding to <3>.

The information regarding the QP may be generated on the basis of a QP in each unit. Alternatively, a predetermined QP may be set as a predicted value, and information regarding differences from the QPs in the units may be generated. Alternatively, a QP acquired based on at least one of a QP set in an upper unit, a QP set in the same and previous unit, or a QP set in a neighboring unit may be set as a predicted value, and information regarding a difference from a QP in the current unit may be generated. Alternatively, a QP set in an upper unit and a QP acquired based on at least one piece of encoding information may be set as predicted values, and difference information from the QP in the current unit may be generated. In this case, the same and previous unit may be a unit that may be defined in an order of encoding the units, the neighboring unit may be a spatially adjacent unit, and the encoding information may be a slice type, an encoding mode, a prediction mode, location information, etc. of a corresponding unit.

As an example, the QP in the current unit may be used to set the QP in the upper unit as a predicted value and generate difference information. Information regarding a difference between a QP set in a slice and a QP set in a picture may be generated, or information regarding a difference between a QP set in a tile and a QP set in a picture may be generated. Also, information regarding a difference between a QP set in a block and the QP set in the slice or tile may be generated. Also, information regarding a difference between a QP set in a sub-block and the QP set in the block may be generated.

As an example, the QP in the current unit may be used to set a QP acquired based on a QP in at least one neighboring unit or a QP in at least one previous unit as a predicted value and generate difference information. Information regarding a difference from a QP acquired based on a QP of a neighboring block, such as a block on a left side, an upper left side, a lower left side, an upper side, an upper right side, and the like of the current block may be generated. Alternatively, information regarding a difference from a QP of an encoded picture before the current picture may be generated.

As an example, the QP in the current unit may be used to set a QP in an upper unit and a QP acquired based on at least one piece of encoding information as predicted values and generate difference information. Also, information regarding a difference between the QP in the current bock and a QP of a slice corrected according to a slice type (I/P/B) may be generated. Alternatively, information regarding a difference between the QP in the current bock and a QP of a tile corrected according to the encoding mode (intra/inter) may be generated. Alternatively, information regarding a difference between the QP in the current bock and a QP of a picture corrected according to the prediction mode (directionality/non-directionality) may be generated. Alternatively, information regarding a difference between the QP in the current bock and a QP of a picture corrected according to location information (x/y) may be generated. In this case, the correction may refer to an operation of adding or subtracting an offset to or from a QP in an upper unit used for prediction. In this case, at least one piece of offset information may be supported according to encoding settings, and information that is implicitly processed or explicitly associated may be generated according to a predetermined process. The present invention is not limited to the above example, and modifications may be made thereto.

The above example may be an example that is allowed when a signal indicating QP variation is provided or activated. For example, when the signal indicating QP variation is neither provided nor activated, the difference information is not generated, and the predicted QP may be determined as a QP in each unit. As another example, when the signal indicating QP variation is provided or activated, the difference information is generated, and the predicted QP may be determined as a QP in each unit when the difference information has a value of 0.

The quantization part may deliver information needed to generate a quantization block to the encoding part so that the information is encoded. The encoding part adds corresponding information to a bitstream and transmits the bitstream to the decoder. The decoding part of the decoder may parse the information and use the parsed information in the inverse quantization process.

The above example has been described under the assumption that a residual block is transformed and quantized through the transformation part and the quantization part. However, a residual signal of the residual block may be transformed into a residual block with a transformation efficient while the quantization process is not performed. Alternatively, only the quantization process may be performed while the residual signal of the residual block is not transformed into a transformation coefficient. Alternatively, neither the transformation process nor the quantization process may be performed. This may be determined according to encoding settings.

The encoding part may scan a quantization coefficient, a transformation coefficient, or a residual signal of the generated residual block in at least one scan order (e.g., zigzag scanning, vertical scanning, horizontal scanning, etc.), generate a quantization coefficient string, a transformation coefficient string, or a signal string, and encode the quantization coefficient string, transformation coefficient string, or signal string using at last one entropy coding technique. In this case, information regarding the scan order may be determined according to encoding settings (e.g., an encoding mode, a prediction mode, etc.) and may be used to generate information that is implicitly determined or explicitly associated. For example, one scanning order may be selected from among a plurality of scanning orders according to the intra-prediction mode.

Also, the encoding part may generate encoding data including encoding information delivered from each element and may output the encoding data in a bitstream. This may be implemented with a multiplexer (MUX). In this case, the encoding may be performed using a method such as Exponential Golomb, Context Adaptive Variable Length Coding (CAVLC), and Context Adaptive Binary Arithmetic Coding (CABAC) as an encoding technique. However, the present invention is not limited thereto, and various encoding techniques obtained by improving and modifying the above encoding techniques may be used.

When entropy encoding (e.g., CABAC in this example) is performed on a syntax element such as information generated through an encoding/decoding process and the residual block data, an entropy encoding apparatus may include a binarizer, a context modeler, and a binary arithmetic coder. In this case, the binary arithmetic coder may include a regular coding engine and a bypass coding engine.

A syntax element input to the entropy encoding apparatus may not be a binary value. Thus, when syntax elements are not binary values, the binarizer may binarize the syntax elements and output a bin string composed of 0s or 1s. In this case, a bin represents a bit composed of 0 or 1 and may be encoded through the binary arithmetic coder. In this case, one of the regular coding engine and the bypass coding engine may be selected on the basis of the probability of occurrence of 0 and 1 and this may be determined according to encoding/decoding settings. When a syntax element is data having the frequency of 0 equal to the frequency of 1, the bypass coding engine may be used; otherwise, the regular coding engine may be used.

When the syntax element is binarized, various methods may be used. For example, Fixed Length Binarization, Unary Binarization, Truncated Rice Binarization, K-th Exp-Golomb binarization, and the like may be used. Also, signed binarization or unsigned binarization may be performed depending on the range of the value of the syntax element. The binarization process for the syntax elements according to the present invention may include an additional binarization method as well as the binarization described in the above example.

The inverse quantization part and the inverse transformation part may be implemented by inversely perform the processes performed in the transformation part and the quantization part. For example, the inverse quantization part may inversely quantize a transformation coefficient quantized by the quantization part, and the inverse transformation part may inversely transform the inversely quantized transformation coefficient to generate a restored residual block.

The adder adds the prediction block and the restored residual block to restore a current block. The restored block may be stored in the memory and may be used as reference data (for the prediction part, the filter part, etc.).

The in-loop filter part may additionally perform a post-processing filtering process of one or more of a deblocking filter, a sample adaptive offset (SAO), an adaptive loop filter (ALF), and the like. The deblocking filter may remove block distortion generated at a boundary between blocks from a restored image. The ALF may perform filtering on the basis of a value obtained by comparing an input image to a restored image. In detail, the ALF may perform filtering on the basis of a value obtained by comparing an input image to an image restored after a block is filtered through the deblocking filter. Alternatively, the ALF may perform filtering on the basis of a value obtained by comparing an input image to an image restored after a block is filtered through the SAO. The SAO may restore an offset difference on the basis of a value obtained by comparing an input image to a restored image and may be applied in the form of band offset (BO), edge offset (EO), and the like. In detail, the SAO may add an offset against an original image to the restored image, to which the deblocking filter is applied, in units of at least one pixel and may be applied in the form of BO, EO, and the like. In detail, the SAO may add an offset against an original image to an image restored after a block is filtered through the ALF in pixel units and may be applied in the form of BO, EO, and the like.

As filtering information, setting information regarding whether to support each post-processing filter may be generated in units of sequences, pictures, slices, tiles, or the like. Also, the setting information regarding whether to execute each post-processing filter may be generated in units of pictures, slices, tiles, blocks, or the like. The range in which the filter is performed may be classified into the inside of an image and the boundary of an image. The setting information considering the classification may be generated. Also, information regarding the filtering operation may be generated in units of pictures, slices, tiles, blocks, or the like. The information may be implicitly or explicitly processed, and an independent filtering process or a dependent filtering process may be applied to the filtering depending on a color component, and this may be determined according to encoding settings. The in-loop filter part may deliver the filtering information to the encoding part so that the information is encoded. The encoding part adds corresponding information to a bitstream and transmits the bitstream to the decoder. The decoding part of the decoder may parse the information and apply the parsed information to the in-loop filter part.

The memory may store the restored block or picture. The restored block or picture stored in the memory may be provided to the prediction part, which performs intra-prediction or inter-prediction. In detail, for the processing, a space in which a bitstream compressed by an encoder is stored in the form of queues may be set as a coded picture buffer (CPB), and a space in which the decoded image is stored in picture units may be set as a decoded picture buffer (DPB). The CPB may store the decoding parts in the decoding order, emulate the decoding operation in the encoder, and store the compressed bitstream through the emulation process. The bitstream output from the CPB is restored through the decoding process, and the restored image is stored in the DPB, and pictures stored in the DPB may be referred to during an image encoding/decoding process.

The decoding part may be implemented by inversely performing the process of the encoding part. For example, the decoding part may receive a quantization coefficient string, a transformation coefficient string, or a signal string from the bitstream, decode the string, parse decoding data including decoding information, and deliver the parsed decoding data to each element.

Next, an image setting process applied to the image encoding/decoding apparatus according to an embodiment of the present invention will be described. This is an example (initial image settings) applied before encoding/decoding, but some processes may be examples to be applied to the other steps (e.g., steps after the encoding/decoding or sub-steps of the encoding/decoding). The image setting process may be performed in consideration of network and user environments such as multimedia content characteristics, bandwidths, user terminal performance, and accessibility. For example, image partitioning, image resizing, image reconstruction, and the like may be performed according to encoding/decoding settings. The following description of the image setting process focuses on a rectangular image. However, the present invention is not limited thereto, and the image setting process may be applied to polygonal images. The same image settings may be applied irrespective of the image form or different image settings may be applied, which may be determined according to encoding/decoding settings. For example, after information regarding the image shape (e.g., a rectangular shape or a non-rectangular shape) is checked, information regarding corresponding image settings may be constructed.

The following example will be described under the assumption that dependent settings are provided to a color space. However, independent settings may be provided to the color space. Also, in the following example, the independent settings may include independently providing encoding/decoding settings to each color space. Although one color space is described, it is assumed that an example in which the description is applied to another color space (e.g., an example in which N is generated in the chrominance component when M is generated in the luminance component) is included, and this may be derived. Also, the dependent settings may include an example in which settings are made in proportion to a color format composition ratio (e.g., 4:4:4, 4:2:2, 4:2:0, etc.) (for example, for 4:2:0, M/2 in the chrominance component in the case of M in the luminance component). It is assumed that an example in which the description is applied to each color space is included, and this may be derived. This description is not limited to the above example and may be applied in common to the present invention.

Some constructions in the following example may be applied to various encoding techniques such as spatial domain encoding, frequency domain encoding, block-based encoding, object-based encoding, and the like.

Generally, an input image may be encoded or decoded as it is or after image partitioning. For example, the partitioning may be performed for error robustness or the like in order to prevent damage caused by packet loss during transmission. Alternatively, the partitioning may be performed in order to classify regions having different properties in the same image according to the characteristics, type, and the like of the image.

According to the present invention, the image partitioning process may include a partitioning process and an inverse partitioning process. The following example description will focus on the partitioning process, but the inverse partitioning process may be inversely derived from the partitioning process.

Figure 3:
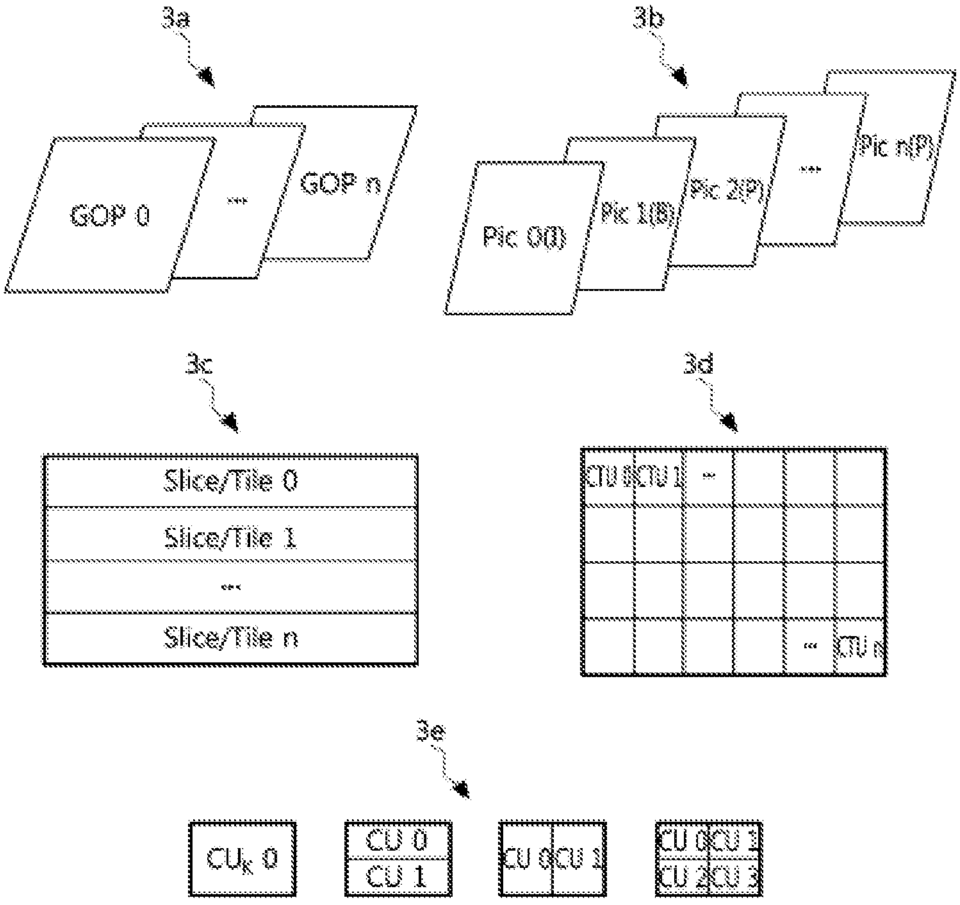
FIG. 3 is an example diagram in which image information is partitioned into layers in order to compress an image.

FIG. 3 is an example diagram in which image information is partitioned into layers in order to compress an image.

Section 3A is an example diagram in which an image sequence is composed of a plurality of GOP. Also, one GOP may be composed of I-pictures, P-pictures, and B-pictures, as shown in Section 3B. One picture may be composed of slices, tiles, and the like, as shown in Section 3C. A slice, tile, or the like may be composed of a plurality of default encoding parts, as shown in Section 3D, and a default encoding part may be composed of at least one encoding sub-unit, as shown in section 3E. The image setting process according to the present invention will be described on the basis of an example to be applied to a unit such as a picture, a slice, and a tile, as shown in Sections 3B and 3C.

Figure 4:
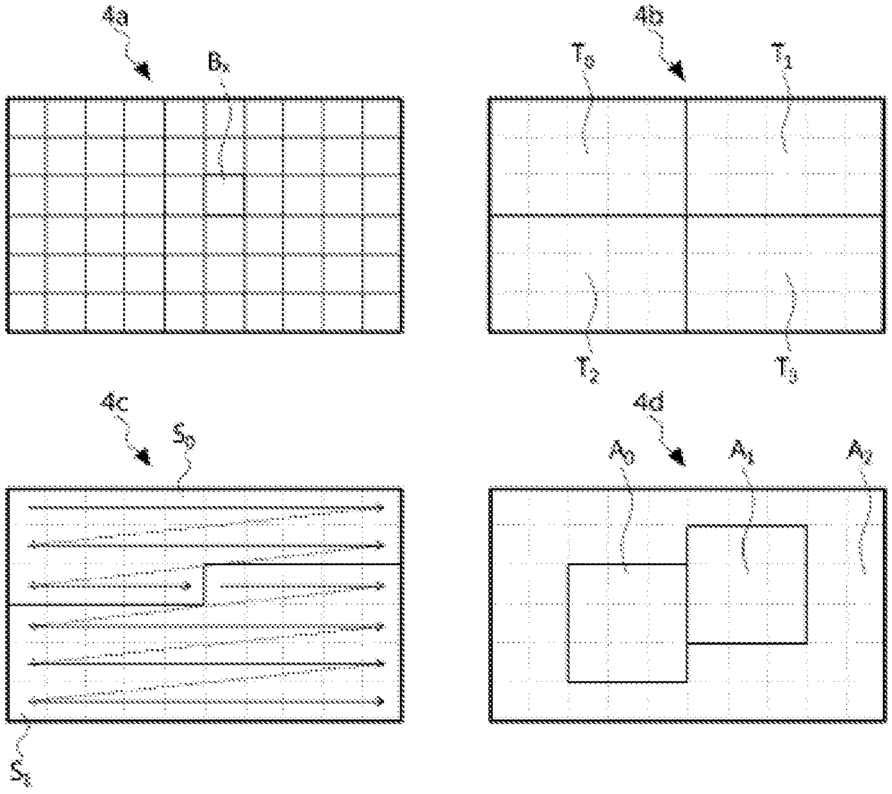
FIG. 4 is a conceptual diagram showing examples of image partitioning according to an embodiment of the present invention.

FIG. 4 is a conceptual diagram showing examples of image partitioning according to an embodiment of the present invention.

Section 4A is a conceptual diagram in which an image (e.g., a picture) is laterally and longitudinally partitioned at regular intervals. A partitioned region may be referred to as a block. Each block may be a default encoding part (or a maximum encoding part) acquired through a picture partitioning part and may be a basic unit to be applied to a partitioning unit, which will be described below.

Section 4B is a conceptual diagram in which an image is partitioned in at least one direction selected from a lateral direction and a longitudinal direction. Partitioned regions $T_0$ to $T_3$ may be referred to as tiles, and each region may be encoded or decoded independently or dependently from the other regions.

Section 4C is a conceptual diagram in which an image is partitioned into groups of consecutive blocks. Partitioned regions $S_0$ and $S_1$ may be referred to as slices, and each region may be encoded or decoded independently or dependently from the other regions. A group of consecutive blocks may be defined according to a scan order. Generally, a group of consecutive blocks conforms to raster scan order. However, the present invention is not limited thereto, and a group of consecutive blocks may be determined according to encoding/decoding settings.

Section 4D is a conceptual diagram in which an image is partitioned into groups of blocks according to any user-defined settings. Partitioned regions $A_0$ to $A_2$ may be referred to as arbitrary partitions, and each region may be encoded or decoded independently or dependently from the other regions.

The independent encoding/decoding may denote that when some units (or regions) are encoded or decoded, data in other units cannot be referenced. In detail, pieces of information used or generated during texture encoding and entropy encoding for some units may be independently encoded without being referenced to one another. Even in the decoder, for texture decoding and entropy decoding for some units, parsing information and restoration information in other units may not be referenced to each other. In this case, whether to reference data in other units (or regions) may be limited in a spatial region (e.g., between regions in one image), but may also be limited in a temporal region (e.g., between consecutive images or between frames) according to encoding/decoding settings. For example, when some units of the current image and some units of another image have continuity or have the same encoding environments, a reference may be made; otherwise, the reference may be limited.

Also, the dependent encoding/decoding may denote that when some units are encoded or decoded, data in other units can be referenced. In detail, pieces of information used or generated during texture encoding and entropy encoding for some units may be dependently encoded along with being referenced to one another. Even in the decoder, for texture decoding and entropy decoding for some units, parsing information and restoration information in other units may be referenced to each other. That is, the above settings may be the same as or similar to those of general encoding/decoding. In this case, in order to identify a region (here, a face <Face> and the like generated according to a projection format), the region may be partitioned according to the characteristics, type, and the like of the image (e.g., a 360-degree image).

In the above example, independent encoding/decoding settings (e.g., independent slice segments) may be provided to some units (a slice, a tile, and the like), and dependent encoding/decoding settings (e.g., dependent slice segments) may be provided to other units. According to the present invention, the following description will focus on the independent encoding/decoding settings.

As shown in Section 4A, a default encoding part acquired through the picture partitioning part may divided into default encoding blocks according to a color space, and may have a size and shape determined according to the characteristics and resolution of the image. The supported size or shape of the block may be an N×N square ($2^n \times 2^n$; 256×256, 128×128, 64×64, 32×32, 16×16, 8×8, etc.; n is an integer ranging from 3 to 8) having a width and a height represented as the exponent of 2 ($2^n$) or an M×N rectangle ($2^m \times 2^n$). For example, an input image may be partitioned into 128×128 for an 8 k UHD image, 64×64 for a 1080p HD image, or 16×16 for a WVGA image depending on the resolution and may be partitioned into 256×256 for a 360-degree image depending on the image type. The default encoding part may be partitioned into encoding sub-units and then encoded or decoded. Information regarding the default encoding part may be added to a bitstream in units of sequences, pictures, slices, tiles, or the like, and may be parsed by the decoder to restore related information.

The image encoding method and the image decoding method according to an embodiment of the present invention may include the following image partitioning steps. In this case, the image partitioning process may include an image partitioning indication step, an image partitioning type identification step, and an image partitioning performing step. Also, the image encoding apparatus and the image decoding apparatus may be configured to include an image partitioning indication part, an image partitioning type identification part, and an image partitioning performing part, which perform the image partitioning indication step, the image partitioning type identification step, and the image partitioning performing step, respectively. For the encoding, a related syntax element may be generated. For the decoding, a related syntax element may be parsed.

In the block partitioning process, as shown in Section 4A, the image partitioning indication part may be omitted. The image partitioning type identification part may check information regarding the size and shape of a block, and the image partitioning part may perform partitioning through identified partitioning type information in the default encoding parts.

A block may be a unit to be always partitioned, but whether to partition the other partitioning units (a tile, a slice, and the like) may be determined according to encoding/decoding settings. As default settings, the picture partitioning part may perform partitioning in block units and then perform partitioning in other units. In this case, the block partitioning may be performed on the basis of a picture size.

Also, the partitioning may be performed in block units after being performed in other units (tiles, slices, or the like). That is, the block partitioning may be performed on the basis of the size of a partitioning unit. This may be determined through explicit or implicit processing according to encoding/decoding settings. The following example description assumes the former case and also will focus in units other than blocks.

In the image partitioning indication step, whether to perform image partitioning may be determined. For example, when a signal indicating image partitioning (e.g., tiles_enabled_flag) is confirmed, the partitioning may be performed. When the signal indicating image partitioning is not confirmed, the partitioning may not be performed, or the partitioning may be performed by confirming other encoding/decoding information.

In detail, it is assumed that the signal indicating image partitioning (e.g., tiles_enabled_flag) is confirmed. When the signal is activated (e.g., tiles_enabled_flag=1), the partitioning may be performed in a plurality of units. When the signal is deactivated (e.g., tiles_enabled_flag=0), the partitioning may not be performed. Alternatively, the signal indicating image partitioning not being confirmed may denote that the partitioning is not performed or is performed in at least one unit. Whether to perform partitioning in a plurality of units may be confirmed through another signal (e.g., first_slice_segment_in_pic_flag).

In summary, when the signal indicating image partitioning is provided, the corresponding signal is a signal for indicating whether to perform the partitioning in a plurality of units. Whether to partition the corresponding image may be determined according to the signal. For example, it is assumed that tiles_enabled_flag is a signal indicating whether to partition an image. Here, tiles_enabled_flag being equal to 1 may denote that an image is partitioned into a plurality of tiles, and tiles_enabled_flag being equal to 0 may denote that an image is not partitioned.

In summary, when the signal indicating image partitioning is not provided, the partitioning may not be performed, or whether to partition a corresponding image may be determined by another signal. For example, first_slice_segment_in_pic_flag is not a signal indicating whether to perform image partitioning but a signal indicating the first slice segment in an image. Thus, whether to perform partitioning in two or more units (e.g., the flag being 0 denotes that the image is partitioned into a plurality of slices) may be confirmed.

The present invention is not limited to the above example, and modifications may be made thereto. For example, a signal indicating image partitioning may not be provided for each tile and may be provided for each slice. Alternatively, the signal indicating image partitioning may be provided on the basis of the type, characteristics, and the like of an image.

In the image partitioning type identification step, an image partitioning type may be identified. The image partitioning type may be defined by a partitioning method, partitioning information, and the like.

In Section 4B, the tile may be defined as a unit acquired by lateral and longitudinal partitioning. In detail, the tile may be defined as a group of adjacent blocks in a quadrilateral space partitioned by at least one lateral or longitudinal partitioning line passing through an image.

Tile partitioning information may include boundary location information for a column and a row, tile number information for a column and a row, tile size information, and the like. The tile number information may include the number of columns for the tiles (e.g., num_tile_columns) and the number of rows for the tiles (e.g., num_tile_rows).

Thus, the image may be partitioned into a number (=the number of columns×the number of rows) of tiles. The tile size information may be acquired on the basis of the tile number information. The width or height of the tile may be uniform or non-uniform, and thus under predetermined rules, related information (e.g., uniform_spacing_flag) may be implicitly determined or explicitly generated. Also, the tile size information may include size information of each column and each row of a tile (e.g., column_width_tile[i] and row_height_tile[i]) or include size information of the width and height of each tile. Also, the size information may be information that may be additionally generated according to whether a tile size is uniform (e.g., when the partitioning is non-uniform because uniform_spacing_flag is 0).

In Section 4C, a slice may be defined as a unit of grouping consecutive blocks. In detail, the slice may be defined as a group of consecutive blocks in predetermined scan order (here, in raster scan).

Slice partitioning information may include slice number information, slice location information (e.g., slice_segment_address), and the like. In this case, the slice location information may be location information of a predetermined block (e.g., the first rank in scan order in the slice). In this case, the location information may be block scan order information.

In Section 4D, various partitioning settings are allowed for the arbitrary partition.

In Section 4D, a partitioning unit may be defined as a group of blocks that are spatially adjacent to one another, and information regarding the partitioning may include information regarding the size, form, and location of the partitioning unit. This is merely an example of the arbitrary partition, and various partitioning forms may be allowed as shown in FIG. 5.

Figure 5:
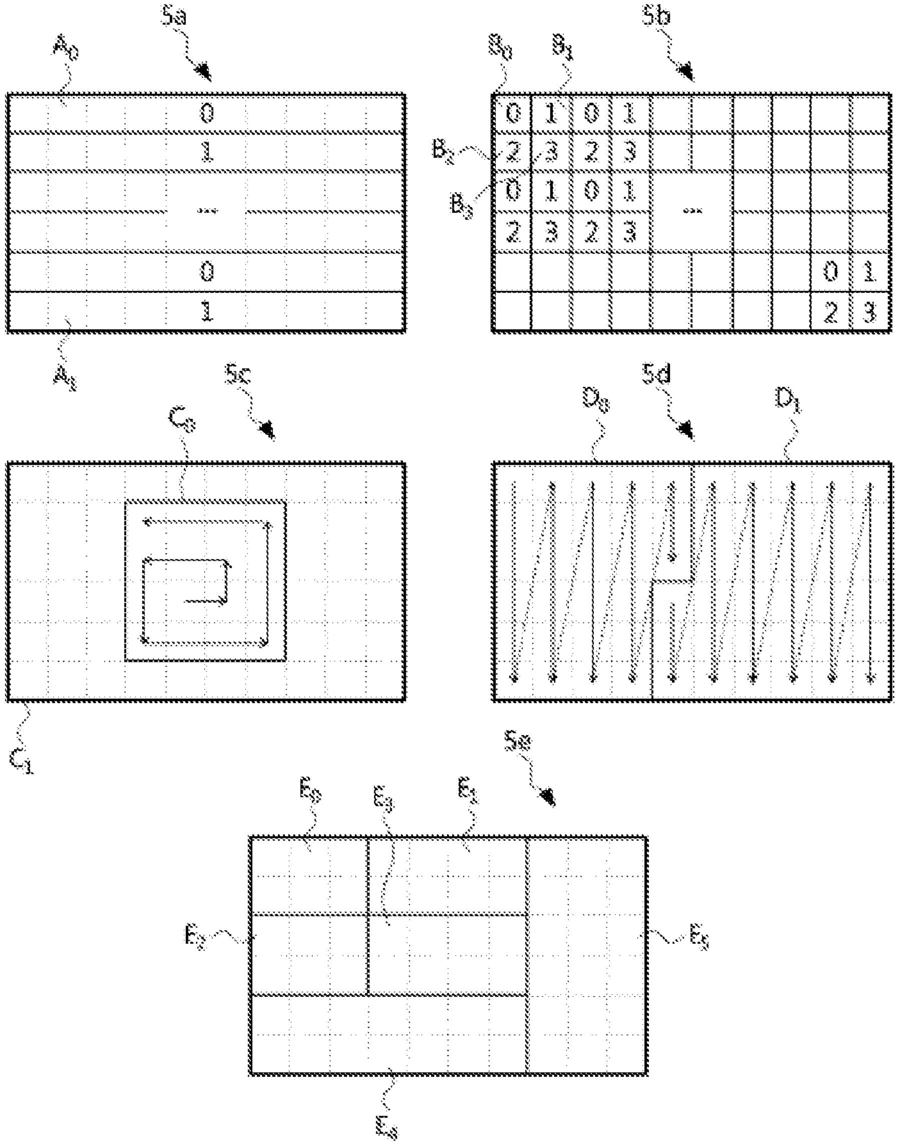
FIG. 5 is another example diagram of an image partitioning method according to an embodiment of the present invention.

FIG. 5 is another example diagram of an image partitioning method according to an embodiment of the present invention.

In Sections 5A and 5B, an image may be laterally or longitudinally partitioned into a plurality of regions at at least one block interval, and the partitioning may be performed on the basis of block location information. Section 5A illustrates examples $A_0$ and $A_1$ in which the partitioning is laterally performed on the basis of row information of each block, and Section 5B illustrates examples $B_0$ to $B_3$ in which the partitioning is laterally and longitudinally performed on the basis of column information and row information of each block. Information regarding the partitioning may include the number of partitioning units, block interval information, a partitioning direction, etc., and when the partitioning information is implicitly included according to a predetermined rule, some of the partitioning information may not be generated.

In Sections 5C and 5D, an image may be partitioned into groups of consecutive blocks in scan order. An additional scan order other than the conventional slice raster scan order may be applied to the image partitioning. Section 5C illustrates examples $C_0$ and $C_1$ in which scanning is performed clockwise or counter-clockwise with respect to a start block (Box-Out), and Section 5D illustrates examples $D_0$ and $D_1$ in which scanning is performed vertically with respect to a start block (Vertical). Information regarding the partitioning may include information regarding the number of partitioning units, information regarding the locations of the partitioning units (e.g., the first rank in scan order in the partitioning unit), information regarding the scan order, and the like, and when the partitioning information is implicitly included according to a predetermined rule, some of the partitioning information may not be generated.

In Section 5E, an image may be partitioned using lateral and longitudinal partitioning lines. An existing tile may be partitioned by a lateral or longitudinal partitioning line. Thus, the partitioning may be performed in the form of a quadrilateral space, but it may not be possible to partition the image using the partitioning line. For example, an example in which an image is partitioned by some partitioning lines for the image (e.g., a partitioning line between a left boundary of E5 and a right boundary of E1, E3, and E4) may be possible, and an example in which an image is partitioned by some partitioning lines for the image (e.g., a partitioning line between a lower boundary of E2 and E3 and an upper boundary of E4) may be impossible. Also, the partitioning may be performed on a block unit basis (e.g., after block partitioning is performed first) or may be performed by the lateral or longitudinal partitioning line (e.g., the partitioning is performed by the partitioning line, irrespective of the block partitioning). Thus, each partitioning unit may not be a multiple of the block. Thus, partitioning information different from that of an existing tile may be generated, and the partitioning information may include information regarding the number of partitioning units, information regarding the locations of the partitioning units, information regarding the sizes of the partitioning units, etc. For example, the information regarding the locations of the partitioning units may be generated as location information (e.g., which is measured in pixel units or in block units) on the basis of a predetermined location (e.g., at the upper left corner of the image), and the information regarding the sizes of the partitioning units may be generated as information regarding the width and height of each partitioning unit (e.g., which is measured in pixel units or in block units).

Like the above example, the partitioning according to any user-defined settings may be performed by applying a new partitioning method or by changing some elements of the existing partitioning. That is, the partitioning method may be supported by replacing or adding to a conventional partitioning method and may be supported by changing some settings of the conventional partitioning method (a slice, a tile, etc.) (e.g., according to another scan order, by using another partitioning method in a quadrilateral shape to generate other partitioning information, or according to dependent encoding/decoding characteristics). Also, settings for configuring an additional partitioning unit (e.g., settings other than partitioning according to a scan order or partitioning according to a certain interval difference) may be supported, and an additional partitioning unit form (e.g., a polygonal form such as a triangle other than partitioning into a quadrilateral space) may be supported. Also, the image partitioning method may be supported on the basis of the type, characteristics, and the like of an image. For example, a partial partitioning method (e.g., the face of a 360-degree image) may be supported according to the type, characteristics, and the like of an image. Information regarding the partitioning may be generated on the basis of the support.

In the image partitioning performing step, an image may be partitioned on the basis of identified partitioning type information. That is, the image may be partitioned into a plurality of partitioning units on the basis of the identified partitioning type and may be encoded or decoded on the basis of the acquired partitioning units.

In this case, whether to have encoding/decoding settings in each partitioning unit may be determined depending on the partitioning type. That is, setting information needed during an encoding/decoding process for each partitioning unit may be assigned by an upper unit (e.g., a picture) or independent encoding/decoding settings may be provided for each partitioning unit.

Generally, a slice may have independent encoding/decoding settings (e.g., a slice header) for each partitioning unit, and a tile cannot have independent encoding/decoding settings for each partitioning unit and may have settings dependent on encoding/decoding settings of a picture (e.g., PPS). In this case, information generated in association with a tile may be the partitioning information, and may be included in the encoding/decoding settings of the picture. The present invention is not limited to the above example, and modifications may be made thereto.

Encoding/decoding setting information for a tile may be generated in units of videos, sequences, pictures, or the like. At least one piece of encoding/decoding setting information is generated in an upper unit, and one piece of the generated encoding/decoding setting information may be referenced. Alternatively, independent encoding/decoding setting information (e.g., a tile header) may be generated in tile units. This is different from the case of following one encoding/decoding setting determined in an upper unit in that encoding/decoding is performed while at least one encoding/decoding setting is provided in tile units. That is, all the tiles may be encoded or decoded according to the same encoding/decoding settings, or at least one tile may be encoded or decoded according to different encoding/decoding settings from those of the other tiles.

The above example focuses on various encoding/decoding settings in the tile. However, the present invention is not limited thereto, and the same or similar settings may be applied even to other partitioning types.

As an example, in some partitioning types, partitioning information may be generated in an upper unit, and encoding or decoding may be performed according to a single encoding/decoding setting of the upper unit.

As an example, in some partitioning types, partitioning information may be generated in an upper unit, and independent encoding/decoding settings for each partitioning unit in the upper unit may be generated, and encoding or decoding may be performed according to the generated encoding/decoding settings.

As an example, in some partitioning types, partitioning information may be generated in an upper unit, and a plurality of pieces of encoding/decoding setting information may be supported in the upper unit. Encoding or decoding may be performed according to encoding/decoding settings referenced by each partitioning unit.

As an example, in some partitioning types, partitioning information may be generated in an upper unit, and independent encoding/decoding settings may be generated in corresponding partitioning units. Encoding or decoding may be performed according to the generated encoding/decoding settings.

As an example, in some partitioning types, independent encoding/decoding settings including partitioning information may be generated in corresponding partitioning units, and encoding or decoding may be performed according to the generated encoding/decoding settings.

Encoding/decoding setting information may include information needed to encode or decode a tile, such as a tile type, information regarding a referenced picture list, quantization parameter information, inter-prediction setting information, in-loop filtering setting information, in-loop filtering control information, a scan order, whether to perform encoding or decoding, and the like. The encoding/decoding setting information may be used to explicitly generate related information or may have encoding/decoding settings that are implicitly determined according to the format, characteristics, and the like of the image which are determined in an upper unit. Also, the related information may be explicitly generated on the basis of information acquired through the settings.

Next, an example in which image partitioning is performed in the encoding/decoding apparatus according to an embodiment of the present invention will be described.

A partitioning process may be performed on an input image before encoding is started. The image may be partitioned using the partitioning information (e.g., image partitioning information, partitioning unit setting information, etc.) and then may be encoded in partitioning units. The image encoding data may be stored in the memory after the encoding is complete, and may be added to a bitstream and then transmitted.

A partitioning process may be performed before decoding is started. The image may be partitioned using the partitioning information (e.g., image partitioning information, partitioning unit setting information, etc.), and then image decoding data may be parsed and decoded in partitioning units. The image decoding data may be stored in the memory after the decoding is complete, and the plurality of partitioning units are merged into a single unit, and thus an image may be output.

Through the above example, the image partitioning process has been described. Also, according to the present invention, a plurality of partitioning processes may be performed.

For example, an image may be partitioned, and partitioning units of the image may be partitioned. The partitioning may be the same partitioning process (e.g., slice/slice, tile/tile, etc.) or a different partitioning process (e.g., slice/tile, tile/slice, tile/face, face/title, slice/face, face/slice, etc.). In this case, the following partitioning process may be performed on the basis of the preceding partitioning result, and partitioning information generated during the following partitioning process may be generated on the basis of a preceding partitioning result.

Also, a plurality of partitioning processes A may be performed, and the partitioning process may be a different partitioning process (e.g., slice/face, tile/face, and the like). In this case, the following partitioning process may be performed on the basis of or independently of the preceding partitioning result, and partitioning information generated during the following partitioning process may be generated on the basis of or independently of the preceding partitioning result.

The plurality of image partitioning processes may be determined according to encoding/decoding settings. However, the present invention is not limited to the above example, and various modifications may be made thereto.

The encoder may add the information generated during the above process to a bitstream in units of at least one of sequences, pictures, slices, tiles, and the like, and the decoder may parse related information from the bitstream. That is, the information may be added to one unit and may be duplicated and added to a plurality of units. For example, a syntax element indicating whether to support some information or a syntax element indicating whether to perform activation may be generated in some units (e.g., an upper unit), and the same or similar information may be generated in some units (e.g., a lower unit). That is, even when related information is supported and set in the upper unit, the lower unit may have individual settings. This description is not limited to the above example and may be applied in common to the present invention. Also, the information may be included in the bitstream in the form of SEI or metadata.

Generally, an input image may be encoded or decoded as it is, but the encoding or decoding may be performed after the image is resized (expanded or reduced; resolution adjustment). For example, in a hierarchical coding scheme (Scalability Video Coding) for supporting spatial, temporal, and image-quality scalability, image resizing such as the entire expansion and reduction of an image may be performed. Alternatively, the image resizing may be performed such as partial expansion and reduction of an image. The image resizing may be variously performed, that is, may be performed for the purpose of adaptability to encoding environments, for the purpose of encoding uniformity, for the purpose of encoding efficiency, for the purpose of image quality improvement, or according to the type, characteristics, and the like of an image.

As a first example, the resizing process may be performed during a process performed according to the characteristics, type, and the like of an image (e.g., hierarchical encoding, 360-degree image encoding, etc.).

As a second example, the resizing process may be performed at an initial encoding/decoding step. The resizing process may be performed before encoding or decoding is performed. The resized image may be encoded or decoded.

As a third example, the resizing process may be performed during a prediction step (intra-prediction or inter-prediction) or before prediction. During the resizing process, image information (e.g., information regarding a pixel referenced for intra-prediction, information regarding an intra-prediction mode, information regarding reference pictures used for inter-prediction, information regarding an inter-prediction prediction mode, etc.) may be used at the prediction step.

As a fourth example, the resizing process may be performed during a filtering step or before filtering. In the resizing process, image information in the filtering step may be used (e.g., pixel information to be applied to the deblocking filter, pixel information to be applied to SAO, information regarding SAO filtering, pixel information applied to ALF, information regarding ALF filtering, and the like).

Also, after the resizing process is performed, the image may be processed through an inverse resizing process and changed to an image before resizing (in terms of an image size) or may be unchanged. This may be determined according to encoding/decoding settings (e.g., characteristics in which the resizing is performed). In this case, the resizing process may be an expansion process while the inverse resizing process is a reduction process and may be a reduction process while the inverse resizing process is an expansion process.

When the resizing process is performed according to the first to fourth examples, the inverse resizing process is performed in the following step so that an image before resizing may be acquired.

When the resizing process is performed through hierarchical encoding or according to the third example (or when a reference picture is resized in inter-prediction), the inverse resizing process may not be performed in the following step.

In an embodiment of the present invention, the image resizing process may be performed solely or along with the inverse process. The following example description will focus on the resizing process. In this case, since the inverse resizing process is an inverse process for the resizing process, a description of the inverse resizing process will be omitted in order to prevent redundant descriptions. However, it is obvious that those skilled in the art can recognize the same things as described literally.

Figure 6:
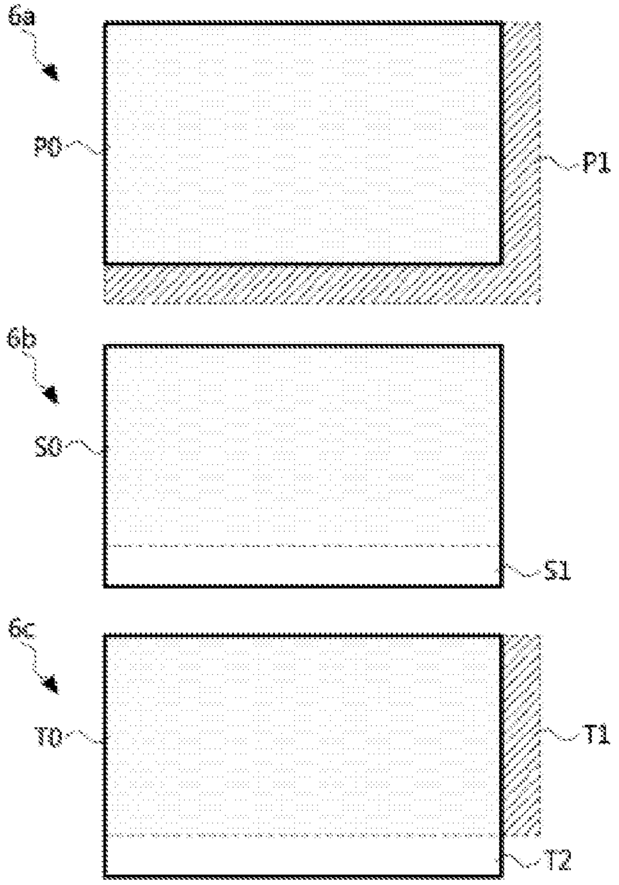
FIG. 6 is an example diagram of a general image resizing method.

FIG. 6 is an example diagram of a general image resizing method.

Referring to Section 6A, an expanded image $P_0+P_1$ may be acquired by adding a specific region $P_1$ to an initial image $P_0$ (or an image before resizing; which is indicated by a thick solid line).

Referring to Section 6B, a reduced image $S_0$ may be acquired by removing a specific region $S_1$ from an initial image $S_0+S_1$.

Referring to Section 6C, a resized image $T_0+T_1$ may be acquired by adding a specific region $T_1$ to an initial image $T_0+T_2$ and removing a specific region $T_2$ from the entire image.

According to the present invention, the following description focuses on a resizing process for expansion and a resizing process for reduction. However, the present invention is not limited thereto, and it should be understood to include a case in which expansion and reduction are applied in combination, as shown in Section 6C.

Figure 7:
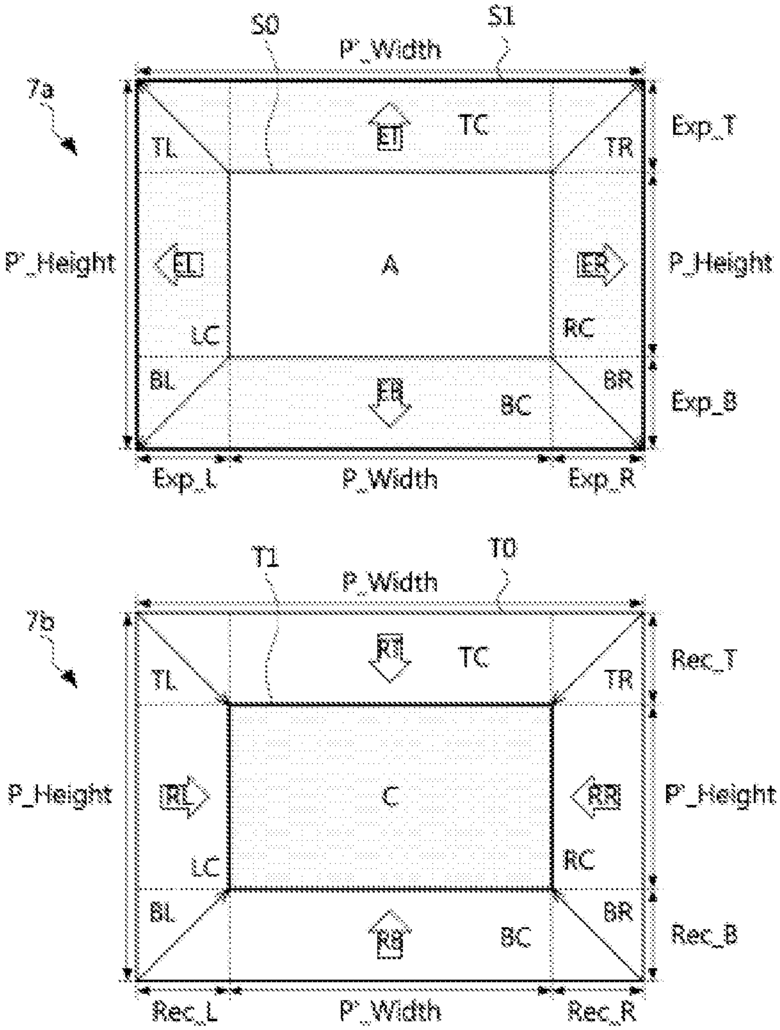
FIG. 7 is an example diagram of image resizing according to an embodiment of the present invention.

FIG. 7 is an example diagram of image resizing according to an embodiment of the present invention.

During the resizing process, an image expansion method will be described with reference to Section 7A, and an image reduction method will be described with reference to Section 7B.

In Section 7A, an image before resizing is S0, and an image after resizing is S1. In Section 7B, an image before resizing is T0, and an image after resizing is T1.

When an image is expanded as shown in Section 7A, the image may be expanded in an "up" direction ET, a "down" direction EL, a "left" direction EB, or a "right" direction ER. When an image is reduced as shown in Section 7B, the image may be reduced in an "up" direction RT, a "down" direction RL, a "left" direction RB, or a "right" direction RR.

Comparing the image expansion and the image reduction, the "up" direction, the "down" direction, the "left" direction, and the "right" direction of the expansion may correspond to the "down" direction, the "up" direction, the "right" direction, and the "left" direction of the reduction. Thus, the following description focuses on the image expansion, but it should be understood that a description of the image reduction is included.

In the following description, the image expansion or reduction is performed in the "up" direction, the "down" direction, the "left" direction, and the "right" direction. However, it should be also understood that the resizing may be performed in an "up and left" direction, an "up and right" direction, a "down and left" direction, or a "down and right" direction.

In this case, when the expansion is performed in the "down and right" direction, regions RC and BC are acquired, and a region BR may or may not be acquired according to encoding/decoding settings. That is, regions TL, TR, BL, and BR may or may not be acquired, but for convenience of description, corner regions (i.e., the regions TL, TR, BL, and BR) will be described as capable of being acquired.

The image resizing process according to an embodiment of the present invention may be performed in at least one direction. For example, the image resizing process may be performed in all directions such as up, down, left, and right, may be performed in two or more directions selected from up, down, left, and right (left+right, up+down, up+left, up+right, down+left, down+right, up+left+right, down+left+ right, up+down+left, up+down+right, etc.), or may be performed in only one direction selected from up, down, left, and right.

For example, the resizing may be performed in a "left+right" direction, an "up+down" direction, a "left and up+right and down" direction, and a "left and down+right and up" direction, which are symmetrically expandable to both ends with respect to the center of an image, may be performed in a "left+right" direction, a "left and up+right up" direction, and a "left and down+right and down" direction, which are vertically symmetrically expandable with respect to the image, and may be performed in an "up+down" direction, a "left and up+left and down" direction, and a "right and up+right and down" direction, which are horizontally symmetrically expandable with respect to the image. Other resizing may be performed.

In Sections 7A and 7B, the size of the image before resizing S0 or T0 is defined as P_Width×P_Height, and the size of the image after resizing S1 or T1 is defined as P'_Width×P'_Height. Here, when resizing values in the "left" direction, the "right" direction, the "up" direction, and the "down" direction are defined as Var_L, Var_R, Var_T, and Var_B (or collectively defined as Var_x), the size of the image after resizing may be expressed as (P_Width+Var_L+Var_R)×(P_Height+Var_T+Var_B). In this case, Var_L, Var_R, Var_T, and Var_B, which are the resizing values in the "left" direction, the "right" direction, the "up" direction, and the "down" direction, may be Exp_L, Exp_R, Exp_T, and Exp_B (here, Exp_x is positive) for the image expansion (in Section 7A) and may be −Rec_L, −Rec_R, −Rec_T, and −Rec_B for the image reduction (which is represented as negative values for the image reduction when Rec_L, Rec_R, Rec_T, and Rec_B are defined as positive values). Also, upper left-hand coordinates, upper right-hand coordinates, lower left-hand coordinates, and lower right-hand coordinates of the image before resizing may be (0,0), (P_Width−1,0), (0,P_Height−1), and (P_Width−1, P_Height−1), and the upper left-hand coordinates, upper right-hand coordinates, lower left-hand coordinates, and lower right-hand coordinates of the image after resizing may be represented as (0,0), (P'_Width−1,0), (0,P'_Height−1), and (P'_Width−1,P'_Height−1). The size of the region (here, TL to BR; i is an index for identifying TL to BR) that is changed (or acquired or removed) through the resizing may be M[i]×N[i] and may be represented as Var_X×Var_Y (this example assumes that X is L or R and Y is T or B). M and N may have various values and may have the same settings irrespective of i or may have individual settings according to i. The various examples will be described below.

Referring to Section 7A, S1 may be configured to include some or all of the regions TL to BR (upper left to lower right), which are to be generated through expansion on S0 in several directions. Referring to Section 7B, T1 may be configured to exclude, from TO, all or some of the regions TL to BR, which are to be removed through reduction in several directions.

In Section 7A, when an existing image S0 is expanded in an "up" direction, a "down" direction, a "left" direction, and a "right" direction, the image may include the regions TC, BC, LC, and RC acquired through the resizing processes and may further include the regions TL, TR, BL, and BR.

As an example, when the expansion is performed in the "up" direction ET, the image may be constructed by adding the region TC to the existing image S0 and may include the region TL or TR along with expansion in at least one different direction EL or ER.

As an example, when the expansion is performed in the "down" direction EB, the image may be constructed by adding the region BC to the existing image S0 and may include the region BL or BR along with expansion in at least one different direction EL or ER.

As an example, when the expansion is performed in the "left" direction EL, the image may be constructed by adding the region LC to the existing image S0 and may include the region TL or BL along with expansion in at least one different direction ET or EB.

As an example, when the expansion is performed in the "right" direction ER, the image may be constructed by adding the region RC to the existing image S0 and may include the region TR or BR along with expansion in at least one different direction ET or EB.

According to an embodiment of the present invention, it is possible to provide settings (e.g., spa_ref_enabled_flag or tem_ref_enabled_flag) for spatially or temporally limiting referenceability of the resized region (this example assumes expansion).

That is, reference to data of the region that is spatially or temporally resized according to encoding/decoding settings may be allowed (e.g., spa_ref_enabled_flag=1 or tem_ref_enabled_flag=1) or limited (e.g., spa_ref_enabled_flag=0 or tem_ref_enabled_flag=0).

The encoding/decoding of the images S0 and T1 before resizing and the regions TC, BC, LC, RC, TL, TR, BL, and BR added or deleted during resizing may be performed as follows.

For example, when the image before resizing and the added or deleted region are encoded or decoded, the data regarding the image before resizing and the data regarding the added or deleted region (data after the encoding or decoding is complete; a pixel value or prediction-related information) may be spatially or temporally referenced to each other.

Alternatively, the image before resizing and the data regarding the added or deleted region may be spatially referenced while the data regarding the image before resizing may be temporally referenced and the data regarding the added or deleted region cannot be temporally referenced.

That is, it is possible to provide settings for limiting referenceability of the added or deleted region. The setting information regarding the referenceability of the added or deleted region may be explicitly generated or implicitly determined.

The image resizing process according to an embodiment of the present invention may include an image resizing indication step, an image resizing type identification step, and/or an image resizing performing step. Also, the image encoding apparatus and the image decoding apparatus may include an image resizing indication part, an image resizing type identification part, and an image resizing performing part, which are configured to perform the image resizing indication step, the image resizing type identification step, and the image resizing performing step, respectively. For the encoding, a related syntax element may be generated. For the decoding, a related syntax element may be parsed.

In the image resizing indication step, whether to perform image resizing may be determined. For example, when a signal indicating image resizing (e.g., img_resizing_enabled_flag) is confirmed, the resizing may be performed. When the signal indicating image resizing is not confirmed, the resizing may not be performed, or the resizing may be performed by confirming other encoding/decoding information. Also, although the signal indicating image resizing is not provided, the signal indicating image resizing may be implicitly activated or deactivated according to encoding/decoding settings (e.g., the characteristics, type, and the like of an image). When the resizing is performed, corresponding resizing-related information may be generated or may be implicitly determined.

When the signal indicating image resizing is provided, the corresponding signal is a signal for indicating whether to perform the image resizing. Whether to resize the corresponding image may be determined according to the signal.

For example, it is assumed that a signal indicating image resizing (e.g., img_resizing_enabled_flag) is confirmed. When the corresponding signal is activated (e.g., img_resizing_enabled_flag=1), the image resizing may be performed. When the corresponding signal is deactivated (e.g., img_resizing_enabled_flag=0), the image resizing may not be performed.

Also, when the signal indicating image resizing is not provided, the resizing may not be performed, or whether to resize a corresponding image may be determined by another signal.

For example, when an input image is partitioned in block units, the resizing may be performed according to whether the size (e.g., the width or height) of the image is a multiple of the size (e.g., the width or height) of the block (for expansion in this example, it is assumed that the resizing process is performed when the image size is not a multiple of the block size). That is, when the width of the image is not a multiple of the width of the block or when the height of the image is not a multiple of the height of the block, the resizing may be performed. In this case, the resizing information (e.g., a resizing direction, a resizing value, etc.) may be determined according to the encoding/decoding information (e.g., the size of the image, the size of the block, etc.). Alternatively, the resizing may be performed according to the characteristics, type (e.g., a 360-degree image), and the like of the image, and the resizing information may be explicitly generated or may be assigned as a predetermined value. The present invention is not limited to the above example, and modifications may be made thereto.

In the image resizing type identification step, an image resizing type may be identified. The image resizing type may be defined by a resizing method, resizing information, and the like. For example, scale factor-based resizing, offset factor-based resizing, and the like may be performed. The present invention is not limited to the above example, and the methods may be applied in combination. For convenience of description, the following description will focus on the scale factor-based resizing and the offset factor-based resizing.

For the scale factor, the resizing may be performed by multiplication or division based on the size of the image. Information regarding the resizing operations (e.g., expansion or reduction) may be explicitly generated, and the expansion or reduction process may be performed according to the corresponding information. Also, the resizing process may be performed as a predetermined operation (e.g., one of the expansion operation and the reduction operation) according to encoding/decoding settings. In this case, the information regarding the resizing operations will be omitted. For example, when the image resizing is activated in the image resizing indication step, the image resizing may be performed as a predetermined operation.

The resizing direction may be at least one direction selected from up, down, left, and right. At least one scale factor may be required depending on the resizing direction. That is, one scale factor (here, unidirectional) may be required for each direction, one scale factor (here, bidirectional) may be required for a lateral or longitudinal direction, and one scale factor (here, omnidirectional) may be required for all directions of the image. Also, the resizing direction is not limited to the above example, and modifications may be made thereto.

The scale factor may have a positive value and may have range information differing depending on encoding/decoding settings. For example, when information is generated by combining the resizing operation and the scale factor, the scale factor may be used as a multiplicand. The scale factor being greater than 0 or less than 1 may mean a reduction operation, the scale factor being greater than 1 may mean an expansion operation, and the scale factor being 1 may mean that the resizing is not performed. As another example, when scale factor information is generated irrespective of the resizing operation, the scale factor for the expansion operation may be used as a multiplicand, and the scale factor for the reduction operation may be used as a dividend.

A process of changing images before resizing S0 and T0 to images after resizing (here, S1 and T1) will be described with reference to Sections 7A and 7B of FIG. 7 again.

As an example, when one scale factor (referred to as sc) is used in all the directions of the image and the resizing direction is a "down+right" direction, the resizing directions are ER and EB (or RR and RB), the resizing values Var_L (Exp_L or Rec_L) and Var_T (Exp_T or Rec_T) are 0, and Var_R (Exp_R or Rec_R) and Var_B (Exp_B or Rec_B) may be expressed as P_Width×(sc−1) and P_Height×(sc−1). Accordingly, the image after resizing may be (P_Width×sc)×(P_Height×sc).

As an example, when respective scale factors (here, sc_w and sc_h) are used in a lateral direction or a longitudinal direction of the image and the resizing directions are a "left+right" direction and an "up+down" direction (up+down+left+right when two are operated), the resizing direction may be ET, EB, EL, and ER, the resizing values Var_T and Var_B may be P_Height×(sc_h−1)/2, and Var_L and Var_R may be P_Width×(sc_w−1)/2. Accordingly, the image after resizing may be (P_Width×sc_w)×(P_Height×sc_h).

For the offset factor, the resizing may be performed by addition or subtraction based on the size of the image. Alternatively, the resizing may be performed by addition or subtraction based on encoding/decoding information of the image. Alternatively, the resizing may be performed by independent addition or subtraction. That is, the resizing process may have dependent or independent settings.

Information regarding the resizing operations (e.g., expansion or reduction) may be explicitly generated, and the expansion or reduction process may be performed according to the corresponding information. Also, the resizing operations may be performed as a predetermined operation (e.g., one of the expansion operation and the reduction operation) according to encoding/decoding settings. In this case, the information regarding the resizing operations may be omitted. For example, when the image resizing is activated in the image resizing indication step, the image resizing may be performed as a predetermined operation.

The resizing direction may be at least one direction selected from up, down, left, and right. At least one offset factor may be required depending on the resizing direction. That is, one offset factor (here, unidirectional) may be required for each direction, one offset factor (here, symmetrically bidirectional) may be required for a lateral direction or longitudinal direction, one offset factor (here, asymmetrically bidirectional) may be required according to a partial combination of the directions, and one offset factor (here, omnidirectional) may be required for all directions of the image. Also, the resizing direction is not limited to the above example, and modifications may be made thereto.

The offset factor may have a positive value or have both a positive value and a negative value, and may have range information differing depending on encoding/decoding settings. For example, when information is generated in combination of the resizing operation and the offset factor (here, it is assumed that the offset factor has both a positive value and a negative value), the offset factor may be used as a value to be added or subtracted depending on sign information of the offset factor. The offset factor being greater than 0 may mean an expansion operation, the offset factor being less than 0 may mean a reduction operation, and the offset factor being 0 may mean that the resizing is not performed. As another example, when offset factor information is generated separately from the resizing operation (here, it is assumed that the offset factor has a positive value), the offset factor may be used as a value to be added or subtracted depending on the resizing operation. The offset factor being greater than 0 may mean that the expansion or reduction operation may be performed depending on the resizing operation, and the offset factor being 0 may mean that the resizing is not performed.

A method of changing images before resizing S0 and T0 to images after resizing S1 and T1 using an offset factor will be described with reference to Sections 7A and 7B of FIG. 7 again.

As an example, when one offset factor (referred to as os) is used in all the directions of the image and the resizing direction is an "up+down+left+right" direction, the resizing directions may be ET, EB, EL, and ER (or RT, RB, RL, and RR), and the resizing values Var_T, Var_B, Var_L, and Var_R may be os. The size of the image after resizing may be (P_Width+os)×(P_Height+os).

As an example, when an offset factor os_w or os_h is used in a lateral or longitudinal direction of the image and the resizing directions are a "left+right" direction and an "up+down" direction (an "up+down+left+right" direction when two are operated), the resizing directions may be ET, EB, EL, and ER (or RT, RB, RL, and RR), the resizing values Var_T and Var_B may be os_h, and the resizing values Var_L and Var_R may be os_w. The size of the image after resizing may be {P_Width+(os_w×2)}×{P_Height+(os_h×2)}.

As an example, when the resizing directions are a "down" direction and a "right" direction (a "down+right" direction when being operated together) and an offset factor os_b or os_r is used depending on the resizing direction, the resizing directions may be EB and ER (or RB and RR), the resizing value Var_B may be os_b, and the resizing value Var_R may be os_r. The size of the image after resizing may be (P_Width+os_r)×(P_Height+os_b).

As an example, when the offset factor os_t, os_b, os_l, or os_r is used depending on the direction of the image and the resizing directions are an "up" direction, a "down" direction, a "left" direction, and a "right" direction (an "up+down+left+right" direction when all are operated), the resizing directions may be ET, EB, EL, and ER (or RT, RB, RL, and RR), the resizing value Var_T may be os_t, the resizing value Var_B may be os_b, the resizing value Var_L may be os_l, and the resizing value Var_R may be os_r. The size of the image after resizing may be (P_Width+os_l+os_r)×(P_Height+os_t+os_b).

The above example indicates a case in which the offset factor is used as a resizing value Var_T, Var_B, Var_L, or Var_R during the resizing process. That is, this means that the offset factor is used as the resizing value without any change, which may be an example of the resizing that is independently performed. Alternatively, the offset factor may be used as an input variable of the resizing value. In detail, the offset factor may be assigned as an input variable, and the resizing value may be acquired through a series of processes according to encoding/decoding settings, which may be an example of the resizing that is performed on the basis of predetermined information (e.g., an image size, encoding/decoding information, etc.) or an example of the resizing that is dependently performed.

For example, the offset factor may be a multiple (e.g., 1, 2, 4, 6, 8, and 16) or an exponent (e.g., exponents of 2, such as 1, 2, 4, 8, 16, 32, 64, 128, and 256) of a predetermined value (here, an integer). Alternatively, the offset factor may be a multiple or an exponent of a value acquired based on encoding/decoding settings (e.g., a value that is set based on a motion search range of inter-prediction). Alternatively, the offset factor may be a multiple or an integer of a unit (here, assuming A×B) that is acquired from the picture partitioning part. Alternatively, the offset factor may be a multiple of a unit (here, assuming E×F such as a tile) that is acquired from the picture partitioning part.

Alternatively, the offset factor may be a value that is less than or equal to the width and height of the unit acquired from the picture partitioning part. In the above example, the multiple or the exponent may have a value of 1. However, the present invention is not limited to the above example, and modifications may be made thereto. For example, when the offset factor is n, Var_x may be 2×n or $2^n$.

Also, individual offset factors may be supported according to color components. Offset factors for some color components may be supported, and thus offset factor information for other color components may be derived. For example, when an offset factor A for the luminance component (here, assuming that a composition ratio of the luminance component with respect to the chrominance component is 2:1) is explicitly generated, an offset factor A/2 for the chrominance component may be implicitly acquired. Alternatively, when the offset factor A for the chrominance component is explicitly generated, the offset factor 2A for the luminance component may be implicitly acquired.

Information regarding the resizing direction and the resizing value may be explicitly generated, and the resizing process may be performed according to the corresponding information. Also, the information may be implicitly determined according to encoding/decoding settings, and the resizing process may be performed according to the determined information. At least one predetermined direction or resizing value may be assigned, and in this case, the related information may be omitted. In this case, the encoding/decoding settings may be determined on the basis of the characteristics, type, encoding information, and the like of an image. For example, at least one resizing direction may be predetermined according to at least one resizing operation, at least one resizing value may be predetermined according to at least one resizing operation, and at least one resizing value may be predetermined according to at least one resizing direction. Also, the resizing direction, the resizing value, and the like during the inverse resizing process may be derived from the resizing direction, the resizing value, and the like which are applied during the resizing process. In this case, the resizing value that is implicitly determined may be one of the above examples (examples in which the resizing value is variously acquired).

Also, the multiplication or division has been described in the above example, but a shift operation may be used depending on the implementation of the encoder/decoder. The multiplication may be implemented through a left shift operation, and the division may be implemented through a right shift operation. This description is not limited to the above example and may be applied in common to the present invention.

In the image resizing performing step, image resizing may be performed on the basis of identified resizing information. That is, the image resizing may be performed on the basis of information regarding a resizing type, a resizing operation, a resizing direction, a resizing value, and the like, and encoding/decoding may be performed on the basis of an acquired image after resizing.

Also, in the image resizing performing step, the resizing may be performed using at least one data processing method. In detail, the resizing may be performed on a region to be resized according to the resizing type and the resizing operation by using at least one data processing method. For example, depending on the resizing type, how to fill data may be determined when the resizing is for expansion, and how to remove data may be determined when the resizing is for reduction.

In summary, in the image resizing performing step, the image resizing may be performed on the basis of identified resizing information. Alternatively, in the image resizing performing step, the image resizing may be performed on the basis of the resizing information and a data processing method. The above two cases may differ from each other in that only the size of an image to be encoded or decoded is adjusted or in that even data processing for the image size and for the region to be resized is considered. In the image resizing performing step, whether to perform the data processing method may be determined depending on a step, a position, and the like in which the resizing process is applied. The following description focuses on an example in which the resizing is performed on the basis of the data processing method, but the present invention is not limited thereto.

When the offset factor-based resizing is performed, the resizing for the expansion and the resizing for the reduction may be performed using various methods. For the expansion, the resizing may be performed using at least one data filling method. For the reduction, the resizing may be performed using at least one data removal method. In this case, when the offset factor-based resizing is performed, the resized region (expansion) may be filled with new data or original image data directly or after modification, and the resized region (reduction) may be removed simply or through a series of processes.

When the scale factor-based resizing is performed, in some cases (e.g., hierarchical encoding), the resizing for the expansion may be performed by applying up-sampling, and the resizing for the reduction may be performed by applying down-sampling. For example, at least one up-sampling filter may be used for the expansion, and at least one down-sampling filter may be used for the reduction. A horizontally applied filter may be the same as or different from a vertically applied filter. In this case, when the scale factor-based resizing is performed, new data is neither generated in nor removed from the resized region, but original image data may be rearranged using a method such as interpolation. A data processing method associated with the resizing may be classified according to a filter used for the sampling. Also, in some cases (e.g., a case similar to that of the offset factor), the resizing for the expansion may be performed using a method of filling at least one piece of data, and the resizing for the reduction may be performed using a method of removing at least one piece of data. According to the present invention, the following description focuses on the data processing method corresponding to when the offset factor-based resizing is performed.

Generally, a predetermined data processing method may be used in the region to be resized, but at least one data processing method may be used in the region to be resized as in the following example. Selection information for the data processing method may be generated. The former may mean that the resizing is performed through a fixed data processing method, and the latter may mean that the resizing is performed through an adaptive data processing method.

Also, a data processing method may be applied to all (TL, TC, TR, . . . , BR in Sections 7A and 7B) or some (e.g., each or a combination of TL to BR in Sections 7A and 7B) of the regions to be added or deleted during the resizing.

Figure 8:
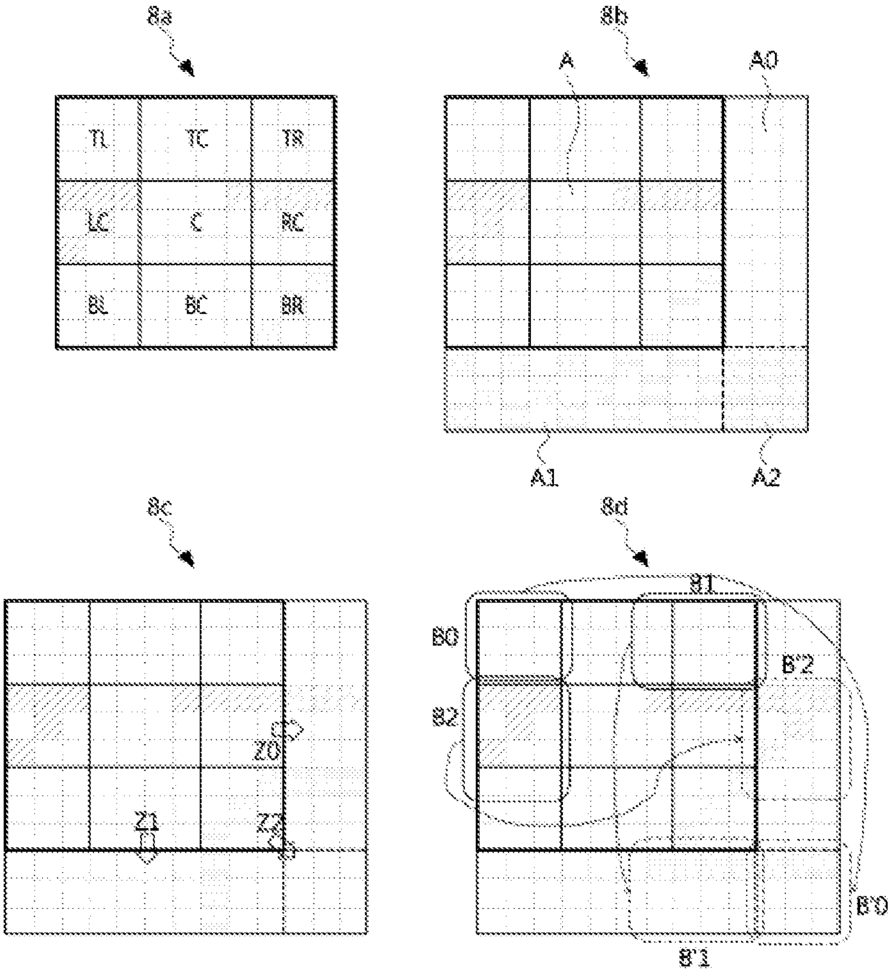
FIG. 8 is an example diagram of a method of constructing a region generated through expansion in the image resizing method according to an embodiment of the present invention.

FIG. 8 is an example diagram of a method of constructing a region generated through expansion in the image resizing method according to an embodiment of the present invention.

Referring to Section 8A, for convenience of description, an image may be partitioned into regions TL, TC, TR, LC, C, RC, BL, BC, and BR, which correspond to an upper left position, an upper position, an upper right position, a left position, a center position, a right position, a lower left position, a lower position, and a lower right position of the image. In the following description, the image is expanded in a "down+right" direction, but it should be understood that the description may be applied to the other expansion directions.

A region added according to the expansion of the image may be constructed using various methods. For example, the region may be filled with an arbitrary value or may be filled with reference to some data of the image.

Referring to Section 8B, generated regions $A_0$ and $A_2$ may be filled with an arbitrary pixel value. The arbitrary pixel value may be determined using various methods.

As an example, the arbitrary pixel value may be one pixel in a pixel value range (e.g., from 0 to 1<<(bit_depth)−1) which may be expressed using a bit depth. For example, the arbitrary pixel value may be a minimum, a maximum, a median (e.g., 1<<(bit_depth−1), etc.), or the like in the pixel value range (here, bit_depth indicates a bit depth).

As an example, the arbitrary pixel value may be one pixel in the pixel value range (e.g., from $min_P$ to $max^P$; $min^P$ and $max^P$ indicate a minimum value and a maximum value among the pixels belonging to the image; $min^P$ is greater than or equal to 0; $max^P$ is smaller than or equal to 1<<(bit_depth)−1) of the pixels belonging to the image. For example, the arbitrary pixel value may be a minimum, a maximum, a median, an average (of at least two pixels), a weighted sum, etc. of the pixel value range.

As an example, the arbitrary pixel value may be a value that is determined in a pixel value range belonging to the specific region included in the image. For example, when A is constructed, the specific region may be TR+RC+BR. Also, the specific region may be provided as a region corresponding to 3×9 of TR, RC, and BR or a region corresponding to 1×9<which is assumed as the rightmost line>. This may depend on encoding/decoding settings. In this case, the specific region may be a unit to be partitioned by the picture partitioning part. In detail, the arbitrary pixel value may be a minimum, a maximum, a median, an average (of at least two pixels), a weighted sum, etc. of the pixel value range.

Referring to Section 8B again, a region $A_1$ to be added along with image expansion may be filled with pattern information (e.g., the pattern is assumed as using a plurality of pixels; there is no need to follow certain rules) which is generated using a plurality of pixel values. In this case, the pattern information may be defined according to encoding/decoding settings or related information may be generated. The generated region may be filled with at least one piece of pattern information.

Referring to Section 8C, a region added along with the image expansion may be constructed with reference to pixels of the specific region included in the image. In detail, the added region may be constructed by copying or padding pixels (hereinafter referred to as reference pixels) in a region adjacent to the added region. In this case, the pixels in the region adjacent to the added region may be a pixel before encoding or a pixel after encoding (or decoding). For example, the reference pixel may refer to a pixel of an input image when the resizing is performed in a pre-encoding step, and the reference pixel may refer to a pixel of a restored image when the resizing is performed in an intra-prediction reference pixel generation step, a reference picture generation step, a filtering step, and the like. In this example, it is assumed that the nearest pixel is used in the added region, but the present invention is not limited thereto.

A region $A_0$, which is generated when the image is expanded leftward or rightward in association with lateral image resizing, may be constructed by horizontally padding (Z0) outer pixels adjacent to the generated region $A^0$, and a region $A_1$, which is generated when the image is expanded upward or downward in association with longitudinal image resizing, may be constructed by vertically padding (Z1) outer pixels adjacent to the generated region $A_1$. Also, a region $A_2$, which is generated when the image is expanded downward and rightward, may be constructed by diagonally padding (Z2) outer pixels adjacent to the generated region $A_2$.

Referring to Section 8D, generated regions B'0 to B'2 may be constructed with reference to data of specific regions B0 to B2 included in the image. In Section 8D, unlike Section 8C, a region that is not adjacent to the generated region may be referenced.

For example, when a region having high correlation with the generated region is present in the image, the generated region may be filled with reference to pixels of the region having high correlation. In this case, the location information, size information, etc. of the region having high correlation may be generated. Alternatively, when the region having high correlation is present through encoding/decoding information of the characteristics, type, and the like of the image, and the location information, the size information, and the like of the region having high correlation may be implicitly checked (e.g., as for a 360-degree image), the generated region may be filled with data of the corresponding region. In this case, the location information, size information, etc. of the corresponding region may be omitted.

As an example, a region B'2, which is generated when the image is expanded leftward or rightward in association with lateral image resizing, may be filled with reference to pixels in a region B2 opposite to the region generated when the image is expanded leftward or rightward in association with the lateral resizing.

As an example, a region B'1, which is generated when the image is expanded upward or downward in association with longitudinal image resizing, may be filled with reference to pixels in a region B1 opposite to the region generated when the image is expanded upward or downward in association with the longitudinal resizing.

As an example, a region B'0, which is generated when the image is expanded through some image resizing (here, diagonally with respect to the image center), may be filled with reference to pixels in a region B0 or TL opposite to the generated region.

An example in which continuity is present at a boundary between both ends of the image and in which data of a region symmetric with respect to the resizing direction is acquired has been described. However, the present invention is not limited thereto, and data of other regions TL to BR may be acquired.

When the generated region is filled with data of a specific region of the image, the data of the corresponding region may be copied and used to fill the generated region as it is, or the data of the corresponding region may be transformed on the basis of the characteristics, type, and the like of the image and used to fill the generated region. In this case, copying the data as it is may mean that the pixel value of the corresponding region is used without any change, and performing the transformation process may mean that the pixel value of the corresponding region is not used without any change. That is, at least one pixel value of the corresponding region may be changed through the transformation process. The generated region may be filled with the changed pixel value, or at least one of locations at which some pixels are acquired may differ from the other locations. That is, in order to fill the generated region of A×B, C×D data other than A×B data, of the corresponding region may be used. In other words, at least one of motion vectors applied to the pixels with which the generated region is filled may differ from the other pixels. In the above example, when a 360-degree image is composed of a plurality of faces according to a projection format, the generated region may be filled with data of the other faces. A data processing method for filling a region generated when the image is expanded through image resizing is not limited to the above example. The data processing method may be improved or changed, or an additional data processing method may be used.

A plurality of candidate groups for the data processing method may be supported according to encoding/decoding settings, and information regarding selection of a data processing method from among the plurality of candidate groups may be generated and added to a bitstream. For example, one data processing method may be selected from among a filling method by using a predetermined pixel value, a filling method by copying outer pixels, a filling method by copying a specific region of an image, a filling method by transforming a specific region of an image, and the like, and related selection information may be generated. Also, the data processing method may be implicitly determined.

For example, a data processing method applied to all the regions (here, the regions TL to BR in Section 7A), which are to be generated along with expansion through image resizing, may be one of the a filling method by using a predetermined pixel value, the filling method by copying outer pixels, the filling method by copying a specific region of an image, the filling method by transforming a specific region of an image, and the like, and related selection information may be generated. Also, one predetermined data processing method applied to the entire region may be determined.

Alternatively, a data processing method applied to the regions (here, each of or two or more of the regions TL to BR in Section 7A of FIG. 7), which are to be generated along with expansion through image resizing, may be one of the filling method by using a predetermined pixel value, the filling method by copying outer pixels, the filling method by copying a specific region of an image, the filling method by transforming a specific region of an image, and the like, and related selection information may be generated. Also, one predetermined data processing method applied to at least one region may be determined.

Figure 9:
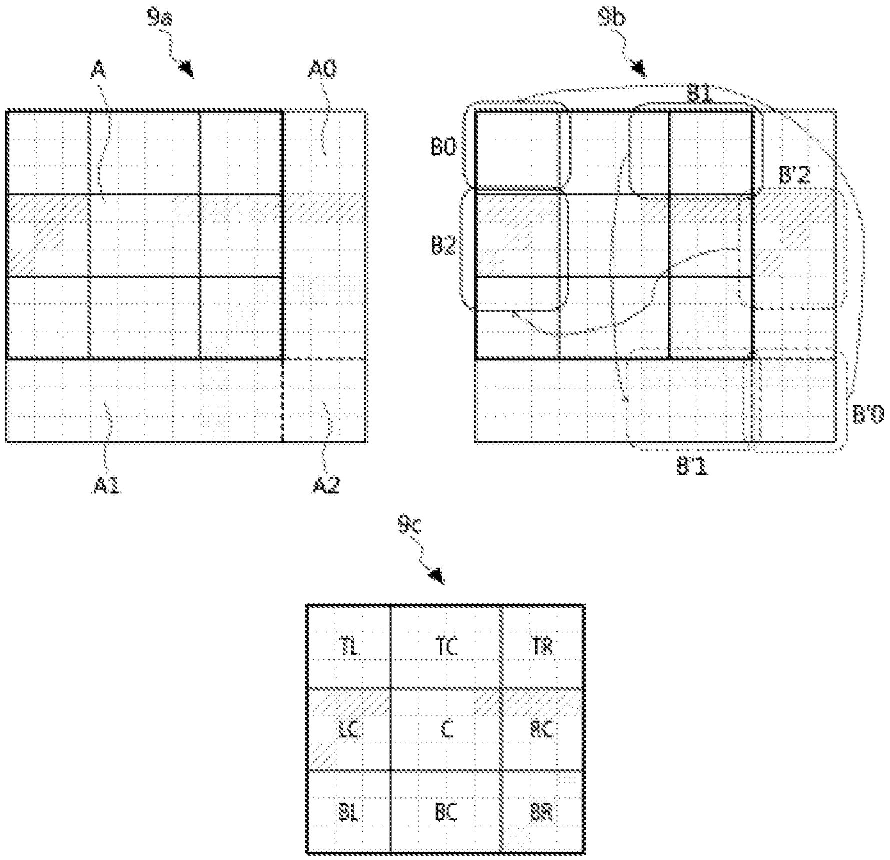
FIG. 9 is an example diagram of a method of constructing a region to be deleted and a region to be generated in the image resizing method according to an embodiment of the present invention.

FIG. 9 is an example diagram of a method of constructing a region to be deleted through reduction and a region to be generated in the image resizing method according to an embodiment of the present invention.

The region to be deleted in the image reduction process may be removed not only simply but also after a series of application processes.

Referring to Section 9A, during the image reduction process, specific regions $A_0$, $A_1$, and $A_2$ may be simply removed without an additional application process. In this case, an image A may be partitioned into regions TL to BR, as shown in Section 8A.

Referring to Section 9B, the regions $A_0$ to $A_2$ may be removed and may be utilized as reference information when the image A is encoded or decoded. For example, the deleted regions $A_0$ to $A_2$ may be utilized during a process of restoring or correcting specific regions of the image A that are deleted through reduction. During the restoration or correction process, a weighted sum, an average, and the like of two regions (a deleted region and a generated region) may be used. Also, the restoration or correction process may be a process that may be applied when the two regions have high correlation.

As an example, a region B'2, which is deleted when the image is reduced leftward or rightward in association with lateral image resizing, may be used to restore or correct pixels in a region B2, LC opposite to the region deleted when the image is reduced leftward or rightward in association with the lateral resizing, and then may be removed from the memory.

As an example, a region B'1, which is deleted when the image is reduced upward or downward in association with longitudinal image resizing, may be used for an encoding/decoding process (a restoration or correction process) of a region B1, TR opposite to the region deleted when the image is reduced upward or downward in association with the longitudinal resizing, and then may be removed from the memory.

As an example, a region B'0, which is deleted when the image is reduced through some image resizing (here, diagonally with respect to the image center), may be used for an encoding/decoding process (a restoration or correction process) of a region B0 or TL opposite to the deleted region, and then may be removed from the memory.

An example in which continuity is present at a boundary between both ends of the image and in which data of a region symmetric with respect to the resizing direction is used for the restoration or correction has been described. However, the present invention is not limited thereto, and data of regions TL to BR other than the symmetric region may be used for the restoration or correction and then may be removed from the memory.

A data processing method for removing a region to be deleted is not limited to the above example. The data processing method may be improved or changed, or an additional data processing method may be used.

A plurality of candidate groups for the data processing method may be supported according to encoding/decoding settings, and related selection information may be generated and added to a bitstream. For example, one data processing method may be selected from among a method of simply removing a region to be deleted, a method of removing a region to be deleted after using the region in a series of processes, and the like, and related selection information may be generated. Also, the data processing method may be implicitly determined.

For example, a data processing method applied to all the regions (here, the regions TL to BR in Section 7B of FIG. 7), which are to be deleted along with reduction through image resizing, may be one of the method of simply removing a region to be deleted, the method of removing a region to be deleted after using the region in a series of processes, and the like, and related selection information may be generated. Also, the data processing method may be implicitly determined.

Alternatively, a data processing method applied to each of the regions (here, each of the regions TL to BR in Section 7B of FIG. 7), which is to be deleted along with reduction through image resizing, may be one of the method of simply removing a region to be deleted, the method of removing a region to be deleted after using the region in a series of processes, and the like, and related selection information may be generated. Also, the data processing method may be implicitly determined.

An example in which the resizing is performed according to a resizing (expansion or reduction) operation has been described. In some cases, the description may be applied to an example in which a resizing operation (here, expansion) is performed and then an inverse resizing operation (here, reduction) is performed.

For example, a method of filling a region generated along with expansion with some data of the image may be selected, and then a method of removing a region to be deleted along with reduction in the inverse process after using the region in a process of restoring or correcting some data of the image may be selected. Alternatively, a method of filling a region generated along with expansion by copying outer pixels may be selected, and then a method of simply removing a region to be deleted along with reduction in the inverse process may be selected. That is, based on the data processing method selected in the image resizing process, the data processing method in the inverse process may be determined.

Unlike the above example, the data processing method of the image resizing process and the data processing method of the inverse process may have an independent relationship. That is, irrespective of the data processing method selected in the image resizing process, the data processing method in the inverse process may be selected. For example, a method of filling a region generated along with expansion by using some data of the image may be selected, and then a method of simply removing a region to be deleted along with reduction in the inverse process may be selected.

According to the present invention, the data processing method during the image resizing process may be implicitly determined according to encoding/decoding settings, and the data processing method during the inverse process may be implicitly determined according to encoding/decoding settings. Alternatively, the data processing method during the image resizing process may be explicitly generated, and the data processing method during the inverse process may be explicitly generated. Alternatively, the data processing method during the image resizing process may be explicitly generated, and based on the data processing method, the data processing method during the inverse process may be implicitly determined.

Next, an example in which image resizing is performed in the encoding/decoding apparatus according to an embodiment of the present invention will be described. In the following description, as an example, the resizing process indicates expansion, and the inverse resizing process indicates reduction. Also, a difference between an image before resizing and an image after resizing may refer to an image size, and resizing-related information may have some pieces explicitly generated and other pieces implicitly determined depending on encoding/decoding settings. Also, the resizing-related information may include information regarding a resizing process and an inverse resizing process.

As a first example, a process of resizing an input image may be performed before encoding is started. The input image may be resized using resizing information (e.g., a resizing operation, a resizing direction, a resizing value, a data processing method, etc.; the data processing method is used during the resizing process) and then may be encoded. The image encoding data (here, an image after resizing) may be stored in the memory after the encoding is complete, and may be added to a bitstream and then transmitted.

A resizing process may be performed before decoding is started. The image decoding data may be resized using resizing information (e.g., a resizing operation, a resizing direction, a resizing value, etc.), and then may be parsed to be decoded. The output image may be stored in the memory after the decoding is complete, and may be changed into the image before resizing by performing the inverse resizing process (here, a data processing method or the like is used; this is used in the inverse resizing process).

As a second example, a process of resizing a reference picture may be performed before encoding is started. The reference picture may be resized using resizing information (e.g., a resizing operation, a resizing direction, a resizing value, a data processing method, etc.; the data processing method is used during the resizing process) and then may be stored in the memory (here, the resized reference picture). An image may be encoded using the resized reference picture. After the encoding is complete, image encoding data (here, data acquired though encoding using the reference picture) may be added to a bitstream and then transmitted. Also, when the encoded image is stored in the memory as a reference picture, the above resizing process may be performed.

Before decoding is started, a resizing process for the reference picture may be performed. The reference picture may be resized using resizing information (e.g., a resizing operation, a resizing direction, a resizing value, a data processing method, etc.; the data processing method is used during the resizing process) and then may be stored in the memory (here, the resized reference picture). Image decoding data (here, which is encoded by the encoder using the reference picture) may be parsed to be decoded. After the decoding is complete, an output image may be generated. When the decoded image is stored in the memory as a reference picture, the above resizing process may be performed.

As a third example, the resizing process may be performed on an image before filtering of the image (here, a deblocking filter is assumed) and after encoding (in detail, after encoding, excluding a filtering process, is compete). The image may be resized using resizing information (e.g., a resizing operation, a resizing direction, a resizing value, a data processing method, etc.; the data processing method is used during the resizing), and then the image after resizing may be generated and then filtered. After the filtering is complete, the inverse resizing process is performed so that the image after resizing may be changed into the image before resizing.

After decoding is complete (in detail, after decoding, excluding a filtering process, is complete), and before the filtering, the resizing process may be performed on the image. The image may be resized using resizing information (e.g., a resizing operation, a resizing direction, a resizing value, a data processing method, etc.; the data processing method is used during the resizing), and then the image after resizing may be generated and then filtered. After the filtering is complete, the inverse resizing process is performed so that the image after resizing may be changed into the image before resizing.

In some cases (the first example and the third example), the resizing process and the inverse resizing process may be performed. In other cases (the second example), only the resizing process may be performed.

Also, in some cases (the second example and the third example), the same resizing process may be applied to the encoder and decoder. In other cases (the first example), the same or different resizing processes may be applied to the encoder and decoder. Here, the resizing processes of the encoder and the decoder may differ in terms of the resizing performing step. For example, in some cases (here, the encoder), the resizing performing step considering image resizing and data processing for a resized region may be included. In other cases (here, the decoder), the resizing performing step considering image resizing may be included. Here, the former data processing may correspond to the latter data processing during the inverse resizing process.

Also, in some cases (the third example), the resizing process may be applied to only a corresponding step, and a resized region may not be stored in the memory. For example, in order to use a resized region in a filtering process, the resized region may be stored in a temporary memory, filtered, and then removed through the inverse resizing process. In this case, there is no change in size of the image due to resizing. The present invention is not limited to the above example, and modifications may be made thereto.

The size of the image may be changed through the resizing process, and thus the coordinates of some pixels of the image may be changed through the resizing process. This may affect the operation of the picture partitioning part. According to the present invention, through the process, block-based partitioning may be performed on the basis of an image before resizing or an image after resizing. Also, unit (e.g., tile, slice, etc.)-based partitioning may be performed on the basis of an image before resizing or an image after resizing, which may be determined according to encoding/decoding settings. According to the present invention, the following description focuses on a case in which the picture partitioning part operates on the basis of the image after resizing (e.g., the image partitioning process after the resizing process), but other modifications may be made. The above example will be described in a plurality of image settings to be described below.

The encoder may add the information generated during the above process to a bitstream in units of at least one of sequences, pictures, slices, tiles, and the like, and the decoder may parse related information from the bitstream. Also, the information may be included in the bitstream in the form of SEI or metadata.

Generally, an input image may be encoded or decoded as it is or after image reconstruction. For example, the image reconstruction may be performed in order to enhance image encoding efficiency, the image reconstruction may be performed in order to consider network and user environments, and the image reconstruction may be performed according to the type, characteristics, and the like of an image.

According to the present invention, the image reconstruction process may include a reconstruction process solely or in combination with an inverse reconstruction process. The following example description will focus on the reconstruction process, but the inverse reconstruction process may be inversely derived from the reconstruction process.

Figure 10:
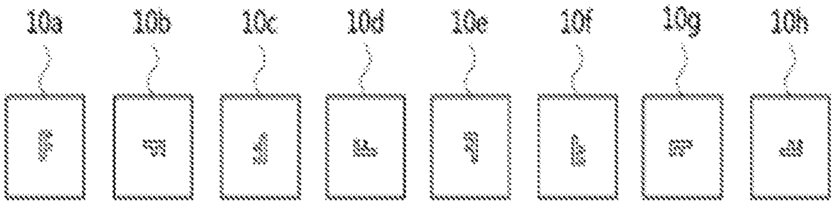
FIG. 10 is an example diagram of image reconstruction according to an embodiment of the present invention.

FIG. 10 is an example diagram of image reconstruction according to an embodiment of the present invention.

It is assumed that Section 10A shows an initial input image. Sections 10A to 10D are example diagrams in which an image rotates a predetermined angle including 0 degrees (e.g., a candidate group may be generated by sampling 360-degrees into k sections; k may have a value of 2, 4, 8, or the like; in this example, it is assumed that k is 4). Sections 10E to 10H are example diagrams having an inverse (or symmetric) relationship with respect to Sections 10A or with respect to Sections 10B to 10D.

The start position or scan order of an image may be changed depending on image reconstruction, but the start position and the scan order may be predetermined irrespective of the reconstruction, which may be determined according to encoding/decoding settings. The following embodiment assumes that the start position (e.g., an upper left position of the image) and the scan order (e.g., raster scan) are predetermined irrespective of image reconstruction.

The image encoding method and the image decoding method according to an embodiment of the present invention may include the following image reconstruction steps. In this case, the image reconstruction process may include an image reconstruction indication step, an image reconstruction type identification step, and an image reconstruction performing step. Also, the image encoding apparatus and the image decoding apparatus may be configured to include an image reconstruction indication part, an image reconstruction type identification part, and an image reconstruction performing part, which perform the image reconstruction indication step, the image reconstruction type identification step, and the image reconstruction performing step, respectively. For the encoding, a related syntax element may be generated. For the decoding, a related syntax element may be parsed.

In the image reconstruction indication step, whether to perform image reconstruction may be determined. For example, when a signal indicating image reconstruction (e.g., convert_enabled_flag) is confirmed, the reconstruction may be performed. When the signal indicating image reconstruction is not confirmed, the reconstruction may not be performed, or the reconstruction may be performed by confirming other encoding/decoding information. Also, although the signal indicating image reconstruction is not provided, the signal indicating image reconstruction may be implicitly activated or deactivated according to encoding/decoding settings (e.g., the characteristics, type, and the like of an image). When the reconstruction is performed, corresponding reconstruction-related information may be generated or may be implicitly determined.

When the signal indicating image reconstruction is provided, the corresponding signal is a signal for indicating whether to perform the image reconstruction. Whether to reconstruct a corresponding image may be determined according to the signal. For example, it is assumed that the signal indicating image reconstruction (e.g., convert_enabled_flag) is confirmed. When the corresponding signal is activated (e.g., convert_enabled_flag=1), the reconstruction may be performed. When the corresponding signal is deactivated (e.g., convert_enabled_flag=0), the reconstruction may not be performed.

Also, when the signal indicating image reconstruction is not provided, the reconstruction may not be performed, or whether to reconstruct the corresponding image may be determined by another signal. For example, the reconstruction may be performed according to the characteristics, type, and the like of an image (e.g., a 360-degree image), and reconstruction information may be explicitly generated or may be assigned as a predetermined value. The present invention is not limited to the above example, and modifications may be made thereto.

In the image reconstruction type identification step, an image reconstruction type may be identified. The image reconstruction type may be defined by a reconstruction method, reconstruction mode information, and the like. The reconstruction method (e.g., convert_type_flag) may include flipping, rotation, and the like, and the reconstruction mode information may include a mode of the reconstruction method (e.g., convert_mode). In this case, the reconstruction-related information may be composed of a reconstruction method and mode information. That is, the reconstruction-related information may be composed of at least one syntax element. In this case, the number of candidate groups for the mode information may be the same or different depending on the reconstruction method.

As an example, the rotation may include candidates having regular intervals (here, 90 degrees) as shown in Sections 10A to 10D. Section 10A shows a 0-degree rotation, Section 10B shows a 90-degree rotation, Section 10C shows a 180-degree rotation, and Section 10D shows a 270-degree rotation (here, which are measured clockwise).

As an example, the flipping may include candidates as shown in Sections 10A, 10E, and 10F. When Section 10A shows no flipping, Sections 10E and 10F show a horizontal flipping and a vertical flipping, respectively.

In the above example, settings for rotations having regular intervals and settings for flippings have been described. However, this is merely an example of the image reconstruction, and the present invention is not limited thereto and may include another interval difference, another flipping operation, and the like, which may be determined according to encoding/decoding settings.

Alternatively, integrated information (e.g., convert_com_flag) which is generated by mixing the reconstruction method and corresponding mode information may be included. In this case, the reconstruction-related information may be mixedly composed of a reconstruction method and mode information.

For example, the integrated information may include the candidates as shown in Sections 10A to 10F, which may be examples of a 0-degree rotation, a 90-degree rotation, a 180-degree rotation, a 270-degree rotation, a horizontal flipping, and a vertical flipping with respect to Section 10A.

Alternatively, the integrated information may include the candidates as shown in Sections 10A to 10H, which may be examples of a 0-degree rotation, a 90-degree rotation, a 180-degree rotation, a 270-degree rotation, a horizontal flipping, a vertical flipping, a 90-degree rotation and then horizontal flipping (or a horizontal flipping and then 90-degree rotation), and a 90-degree rotation and then vertical flipping (or a vertical flipping and then 90-degree rotation) or examples of a 0-degree rotation, a 90-degree rotation, a 180-degree rotation, a 270-degree rotation, a horizontal flipping, a 180-degree rotation and then horizontal flipping (or a horizontal flipping and then 180-degree rotation), a 90-degree rotation and then horizontal flipping (or a horizontal flipping and then 90-degree rotation), and a 270-degree rotation and then horizontal flipping (or a horizontal flipping and then 270-degree rotation).

The candidate group may be configured to include a rotation mode, a flipping mode, and a combination mode of rotation and flipping. The combination mode may simply include mode information in the reconstruction method and may include a mode generated by mixing mode information in each method. In this case, the combination mode may include a mode generated by mixing at least one mode of some methods (e.g., rotation) and at least one mode of other methods (e.g., flipping). In the above example, the combination mode includes a case generated by combining one mode of some methods with a plurality of modes of some methods (here, a 90-degree rotation+multiple flippings/horizontal flipping+multiple rotations). The mixedly constructed information may include a case in which reconstruction is not applied (here, Section 10A) as a candidate group, and the case in which reconstruction is not applied may be included as a first candidate group (e.g., #0 is assigned as an index).

Alternatively, the mixedly constructed information may include mode information corresponding to a predetermined reconstruction method. In this case, the reconstruction-related information may be composed of mode information corresponding to a predetermined reconstruction method. That is, information regarding the reconstruction method may be omitted, and the reconstruction-related information may be composed of one syntax element associated with the mode information.

For example, the reconstruction-related information may be configured to include rotation-specific candidates as shown in Sections 10A to 10D. Alternatively, the reconstruction-related information may be configured to include flipping-specific candidates as shown in Sections 10A, 10E, and 10F.

An image before the image reconstruction process and an image after the image reconstruction process may have the same size or at least one different length, which may be determined according to encoding/decoding settings. The image reconstruction process may be a process of rearranging pixels in an image (here, an inverse pixel rearrangement process is performed during an inverse image reconstruction process; this can be inversely derived from the pixel rearrangement process), and thus the location of at least one pixel may be changed. The pixel rearrangement may be performed according to a rule based on the image reconstruction type information.

In this case, the pixel rearrangement process may be affected by the size and shape (e.g., square or rectangle) of an image. In detail, the width and height of an image before the reconstruction process and the width and height of an image after the reconstruction process may act as variables during the pixel rearrangement process.

For example, ration information regarding at least one of a ratio of the width of the image before the reconstruction process to the width of the image after the reconstruction process, a ratio of the width of the image before the reconstruction process to the height of the image after the reconstruction process, a ratio of the height of the image before the reconstruction process to the width of the image after the reconstruction process, and a ratio of the height of the image before the reconstruction process to the height of the image after the reconstruction process (e.g., the former/the latter or the latter/the former) may act as variables during the pixel rearrangement process.

In the example, when the image before the reconstruction process and the image after the reconstruction process have the same size, a ratio of the width of the image to the height of the image may act as a variable during the pixel rearrangement process. Also, when the image is in the shape of a square, a ratio of the length of the image before the reconstruction process to the length of the image after the reconstruction process may act as a variable during the pixel rearrangement process.

In the image reconstruction performing step, image reconstruction may be performed on the basis of identified reconstruction information. That is, the image reconstruction may be performed on the basis of information regarding a reconstruction type, a reconstruction mode, and the like, and encoding/decoding may be performed on the basis of the acquired reconstructed image.

Next, an example in which image reconstruction is performed in the encoding/decoding apparatus according to an embodiment of the present invention will be described.

A process of reconstructing an input image may be performed before encoding is started. The reconstruction may be performed using reconstruction information (e.g., an image reconstruction type, a reconstruction mode, etc.), and the reconstructed image may be encoded. The image encoding data may be stored in the memory after the encoding is complete, and may be added to a bitstream and then transmitted.

A reconstruction process may be performed before decoding is started. The reconstruction may be performed using reconstruction information (e.g., an image reconstruction type, a reconstruction mode, etc.), and the image decoding data may be parsed to be decoded. The image may be stored in the memory after the decoding is complete and may be changed to the image before the reconstruction by performing an inverse reconstruction process and then output.

The encoder may add the information generated during the above process to a bitstream in units of at least one of sequences, pictures, slices, tiles, and the like, and the decoder may parse related information from the bitstream. Also, the information may be included in the bitstream in the form of SEI or metadata.

TABLE 1

```
Tile information( )
{
  tiles_enabled_flag
  if(tiles_enabled_flag)
  {
    num_tile_columns
    num_tile_rows
    uniform_spacing_flag
    if(!uniform_spacing_flag)
    {
      for(i=0; i<num_tile_columns; i+ +)
        columns_width_tile[i]
      for(i=0; i<num_tile_rows; i+ +)
        rows_height_tile[i]
    }
    tile_header_enabled_flag
    if(tile_header_enabled_flag)
    {
```

TABLE 1-continued

```
        for(i=0; i< num_tile_columns × num_tiles_rows; i+ +)
        {
          tile_coded_flag[i]
          if(!tile_coded_flag[i])
          {
            tile_header( )
          }
        }
      }
    }
}
```

Table 1 represents example syntax elements associated with partitioning among image settings. The following description will focus on an additional syntax element. Also, in the following example, a syntax element is not limited to any specific unit and may be supported in various units such as a sequence, a picture, a slice, and a tile. Alternatively, the syntax element may be included in SEI, metadata, and the like. Also, the type, order, condition, and the like of the supported syntax element in the following example are limited to only the example and thus may be changed and determined according to encoding/decoding settings.

In Table 1, tile_header_enabled_flag denotes a syntax element indicating whether to support encoding/decoding settings for a tile. When the syntax element is activated (tile_header_enabled_flag=1), encoding/decoding settings in a tile unit may be provided. When the syntax element is deactivated (tile_header_enabled_flag=0), the encoding/decoding settings in a tile unit cannot be provided, and encoding/decoding settings in an upper unit may be assigned.

Also, tile_coded_flag denotes a syntax element indicating whether to encode or decode a tile. When the syntax element is activated (tile_coded_flag=1), a corresponding tile may be encoded or decoded. When the syntax element is deactivated (tile_coded_flag=0), the corresponding tile cannot be encoded or decoded. Here, encoding not being performed may mean that encoding data is not generated for a corresponding tile (here, it is assumed that a corresponding region is processed by a predetermined rule and the like; applicable to a meaningless region in some projection formats of a 360-degree image). Decoding not being performed means that the decoding data in the corresponding tile is no longer parsed (here, it is assumed that the corresponding region is processed by a predetermined rule). Also, decoding data being no longer parsed may mean that encoding data is not present in a corresponding unit and thus parsing is no longer performed and may also mean that even through encoding data is present, parsing is no longer performed by the flag. Header information of a tile unit may be supported according to whether to encode or decode a tile.

The above example focused on a tile. However, the present invention is not limited to the tile, and the above description may be modified and then applied to other partitioning units of the present invention. Also, an example of the tile partitioning settings is not limited to the above case, and modifications may be made thereto.

TABLE 2

```
Converting information
{
  convert_enabled_flag
  if(convert_enabled_flag)
    convert_type_flag
}
```

Table 2 represents example syntax elements associated with reconstruction among image settings.

Referring to Table 2, convert_enabled_flag denotes a syntax element indicating whether to perform reconstruction. When the syntax element is activated (convert_enabled_flag=1), a reconstructed image is encoded or decoded, and additional reconstruction-related information may be checked. When the syntax element is deactivated (convert_enabled_flag=0), an original image is encoded or decoded.

Also, convert_type_flag denotes mixed information regarding a reconstruction method and mode information. One method may be determined from a plurality of candidate groups for a rotation-applied method, a flipping-applied method, and a rotation-and-flipping-applied method.

TABLE 3

```
Resizing information( )
{
  pic_width_in_samples
  pic_height_in_samples
  img_resizing_enabled_flag
  if(img_resizing_enabled_flag)
  {
    resizing_met_flag
    resizing_mov_flag
    if(!resizing_met_flag)
    {
      width_scale
      height_scale
    }
    else
    {
      top_height_offset
      bottom_height_offset
      left_width_offset
      right_width_offset
    }
    resizing_type_flag
  }
}
```

Table 3 represents example syntax elements associated with resizing among image settings.

Referring to Table 3, pic_width_in_samples and pic_height_in_samples denote syntax elements indicating the width and the height of an image. The size of an image may be checked through the syntax elements.

Also, img_resizing_enabled_flag denotes a syntax element indicating whether to perform image resizing. When the syntax element is activated (img_resizing_enabled_flag=1), an image is encoded or decoded after resizing, and additional resizing-related information may be checked. When the syntax element is deactivated (img_resizing_enabled_flag=0), an original image is encoded or decoded. Also, the syntax element may indicate resizing for intra-prediction.

Also, resizing_met_flag indicates a resizing method. One resizing method may be determined from a candidate group such as a scale factor-based resizing method (resizing_met_flag=0), an offset factor-based resizing method (resizing_met_flag=1), and the like.

Also, resizing_mov_flag denotes a syntax element for a resizing operation. For example, one of expansion and reduction may be determined.

Also, width_scale and height_scale denote scale factors associated with horizontal resizing and vertical resizing of the scale factor-based resizing.

Also, top_height_offset and bottom_height_offset denote an offset factor for an "up" direction and an offset factor for a "down" direction, which are associated with horizontal resizing of the offset factor-based resizing, and left_width_offset and right_width_offset denote an offset factor for a "left" direction and an offset factor for a "right" direction, which are associated with vertical resizing of the offset factor-based resizing.

The size of an image after resizing may be updated through the resizing-related information and image size information.

Also, resizing_type_flag denotes a syntax element indicating a data processing method for a resized region. The number of candidate groups for the data processing method may be the same or different depending on the resizing method and the resizing operation.

The image setting processes applied to the above-described image encoding/decoding apparatus may be performed individually or in combination. The following example description will focus on an example in which the plurality of image setting processes are performed in combination.

Figure 11:
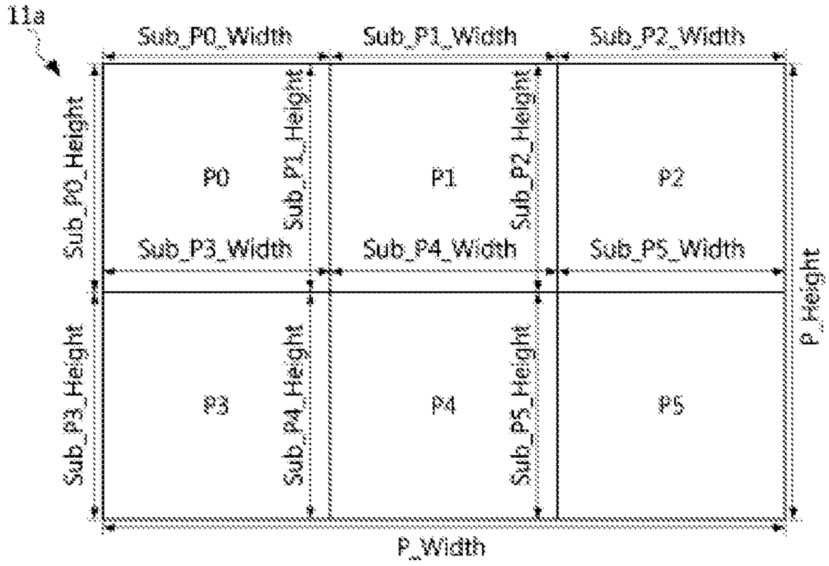
FIG. 11 is an example diagram showing images before and after an image setting process according to an embodiment of the present invention.
Figure 11:
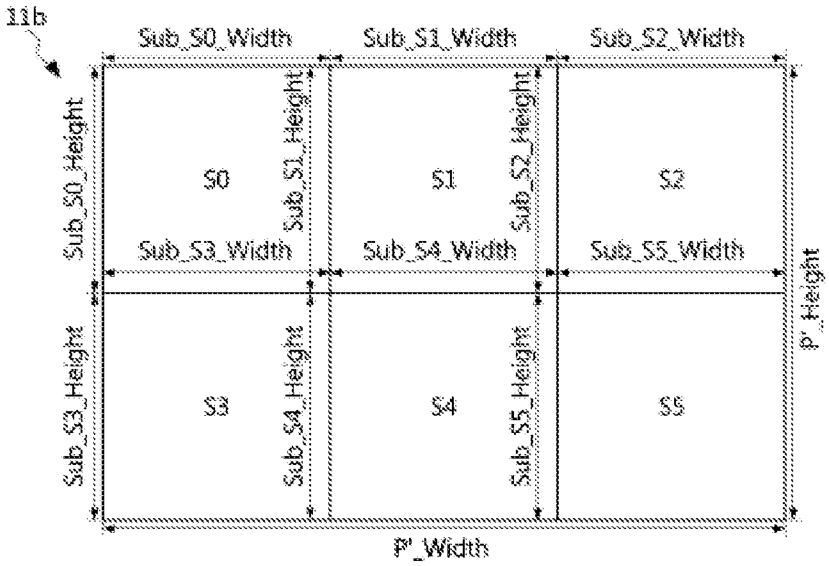

FIG. 11 is an example diagram showing images before and after an image setting process according to an embodiment of the present invention. In detail, Section 11A shows an example before image reconstruction is performed on a partitioned image (e.g., an image projected during 360-degree image encoding, and Section 11B shows an image after image reconstruction is performed on a partitioned image (e.g., an image packed during 360-degree image encoding. That is, it can be understood that Section 11A is an example diagram before an image setting process is performed and Section 11B is an example diagram after an image setting process is performed.

In this example, image partitioning (here, a tile is assumed) and image reconstruction will be described as the image setting process.

In the following example, the image reconstruction is performed after the image partitioning is performed. However, according to encoding/decoding settings, the image partitioning may be performed after the image reconstruction is performed, and modifications may be made thereto. Also, the above-described image reconstruction process (including the inverse process) may be applied identically or similarly to the reconstruction process in the partitioning units in the image in this embodiment.

The image reconstruction may or may not be performed in all partitioning units in the image and may be performed in some partitioning units. Accordingly, a partitioning unit before reconstruction (e.g., some of P0 to P5) may or may not be the same as a partitioning unit after reconstruction (e.g., some of S0 to S5). Through the following example, various image reconstruction cases will be described. Also, for convenience of description, it is assumed that the unit of an image is a picture, the unit of a partitioned image is a tile, and a partitioning unit is in the shape of a rectangle.

As an example, whether to perform image reconstruction may be determined in some units (e.g., sps_convert_enabled_flag or SEI or metadata, etc.). Alternatively, whether to perform image reconstruction may be determined in some units (e.g., pps_convert_enabled_flag). This may be allowed when occurring in a corresponding unit (here, a picture) for the first time or when being activated in an upper unit (e.g., sps_convert_enabled_flag=1). Alternatively, whether to perform image reconstruction may be determined in some units (e.g., tile_convert_flag[i]; i is a partitioning unit index). This may be allowed when occurring in a corresponding unit (here, a tile) for the first time or when being activated in an upper unit (e.g., pps_convert_enabled_flag=1). Also, partially, whether to perform image reconstruction may be implicitly determined according to encoding/decoding settings, and thus related information may be omitted.

As an example, whether to reconstruct partitioning units in an image may be determined according to a signal indicating image reconstruction (e.g., pps_convert_enabled_flag). In detail, whether to reconstruct all of the partitioning units in the image may be determined according to the signal. In this case, a single signal indicating image reconstruction may be generated in the image.

As an example, whether to reconstruct partitioning units in an image may be determined according to a signal indicating image reconstruction (e.g., tile_convert_flag[i]). In detail, whether to reconstruct some of the partitioning units in the image may be determined according to the signal. In this case, at least one signal indicating image reconstruction (e.g., a number of signals equal to the number of partitioning units) may be generated.

As an example, whether to reconstruct an image may be determined according to a signal indicating image reconstruction (e.g., pps_convert_enabled_flag[i]), and whether to reconstruct partitioning units in an image may be determined according to a signal indicating image reconstruction (e.g., tile_convert_flag[i]). In detail, when any signal is activated (e.g., pps_convert_enabled_flag=1), any other signal (e.g., tile_convert_flag[i]) may be additionally checked, and whether to reconstruct some of the partitioning units in the image may be determined according to the signal (here, tile_convert_flag[i]). In this case, a plurality of signals indicating image reconstruction may be generated.

When the signal indicating image reconstruction is activated, image reconstruction-related information may be generated. In the following example, a variety of image reconstruction-related information will be described.

As an example, reconstruction information applied to an image may be generated. In detail, one piece of reconstruction information may be used as reconstruction information for all the partitioning units in the image.

As an example, reconstruction information applied to partitioning units in an image may be generated. In detail, at least one piece of reconstruction information may be used as reconstruction information for some of the partitioning units in the image. That is, one piece of reconstruction information may be used as reconstruction information for one partitioning unit or one pierce of reconstruction information may be used as reconstruction information for a plurality of partitioning units.

The following example will be described in combination with an example in which image reconstruction is performed.

For example, when the signal indicating image reconstruction (e.g., pps_convert_enabled_flag) is activated, reconstruction information applied in common to partitioning units in an image may be generated. Alternatively, when the signal indicating image reconstruction (e.g., pps_convert_enabled_flag) is activated, reconstruction information applied individually to the partitioning units in the image may be generated. Alternatively, when the signal indicating image reconstruction (e.g., tile_convert_flag[i]) is activated, reconstruction information applied individually to the partitioning units in the image may be generated. Alternatively, when the signal indicating image reconstruction (e.g., tile_convert_flag[i]) is activated, reconstruction information applied in common to the partitioning units in the image may be generated.

The reconstruction information may be implicitly or explicitly processed depending on encoding/decoding settings. For the implicit processing, the reconstruction information may be assigned as a predetermined value depending on the characteristics, type, and the like of the image.

P0 to P5 in Section 11A may correspond to S0 to S5 in Section 11B, and the reconstruction process may be performed on partitioning units. For example, P0 may not be reconstructed and then may be assigned to S0. P1 may be rotated by 90 degrees and then may be assigned to S1. P2 may be rotated by 180 degrees and then may be assigned to S2. P3 may be horizontally flipped and then may be assigned to S3. P4 may be rotated by 90 degrees and horizontally flipped and then may be assigned to S4. P5 may be rotated by 180 degrees and horizontally flipped and then may be assigned to S5.

However, the present invention is not limited to the above example, and various modifications may be made thereto. Like the above example, the partitioning units in the image may not be reconstructed, or at least one of reconstruction using rotation, reconstruction using flipping, and reconstruction using rotation and flipping in combination may be performed.

When image reconstruction is applied to partitioning units, an additional reconstruction process such as partitioning unit rearrangement may be performed. That is, the image reconstruction process according to the present invention may be configured to include rearrangement of partitioning units in an image as well as rearrangement of pixels in an image and may be represented using some syntax elements in Table 4 (e.g., part_top, part_left, part_width, part_height, and the like). This means that the image partitioning process and the image reconstruction process may be understood in combination. In the above example, it has been described that an image is partitioned into a plurality of units.

P0 to P5 in Section 11A may correspond to S0 to S5 in Section 11B, and the reconstruction process may be performed on partitioning units. For example, P0 may not be reconstructed and then may be assigned to S0. P1 may not be reconstructed and then may be assigned to S2. P2 may be rotated by 90 degrees and then may be assigned to S1. P3 may be horizontally flipped and then may be assigned to S4. P4 may be rotated by 90 degrees and horizontally flipped and then may be assigned to S5. P5 may be horizontally flipped and then rotated by 180 degrees and then may be assigned to S3. The present invention is not limited thereto, and also various modifications may be made thereto.

Also, P_Width and P_Height of FIG. 7 may correspond to P_Width and P_Height of FIG. 11, and P'_Width and P'_Height of FIG. 7 may correspond to P'_Width and P'_Height of FIG. 11. The size of the image after resizing in FIG. 7, which is P'_Width×P'_Height, may be expressed as (P_Width+Exp_L+Exp_R)×(P_Height+Exp_T+Exp_B), and the size of the image after resizing in FIG. 11, which is P'_Width×P' Height, may be expressed as (P_Width+Var0_L+Var1_L+Var2_L+Var0_R+Var1_R+Var2_R)×(P_Height+Var0_T+Var1_T+Var0_B+Var1_B) or (Sub_P0_Width+Sub_P1_Width+Sub_P2_Width+Var0_L+Var1_L+Var2_L+Var0_R+Var1_R+Var2_R)×(Sub_P0_Height+Sub_P1_Height+Var0_T+Var1_T+Var0_B+Var1_B).

Like the above example, for the image reconstruction, rearrangement of pixels in partitioning units of an image may be performed, rearrangement of partitioning units in an image may be performed, and both of the rearrangement of pixels in partitioning units of an image and the rearrangement of partitioning unit in an image may be performed. In this case, the rearrangement of partitioning units in an image may be performed after the rearrangement of pixels in partitioning units is performed, or the rearrangement of pixels in partitioning units may be performed after the rearrangement of partitioning units in an image is performed.

Whether to perform the rearrangement of partitioning units in an image may be determined according to a signal indicating image reconstruction. Alternatively, a signal for the rearrangement of the partitioning units in the image may be generated. In detail, when a signal indicating image reconstruction is activated, the signal may be generated. Alternatively, the signal may be implicitly or explicitly processed depending on encoding/decoding settings. For the implicit processing, the signal may be determined depending on the characteristics, type, and the like of the image.

Also, information regarding the rearrangement of partitioning units in an image may be implicitly or explicitly performed depending on encoding/decoding settings and may be determined according to the characteristics, type, and the like of the image. That is, each of the partitioning units may be arranged according to arrangement information predetermined for the partitioning units.

Next, an example in which partitioning units in an image are reconstructed in the encoding/decoding apparatus according to an embodiment of the present invention will be described.

A partitioning process may be performed on an input image using partitioning information before encoding is started. A reconstruction process may be performed on partitioning units using reconstruction information, and an image reconstructed for each partitioning unit may be encoded. The image encoding data may be stored in the memory after the encoding is complete, and may be added to a bitstream and then transmitted.

A partitioning process may be performed using partitioning information before decoding is started. A reconstruction process may be performed on partitioning units using reconstruction information, and the image decoding data may be parsed to be decoded in the reconstructed partitioning units. The image decoding data may be stored in the memory after the decoding is complete, and a plurality of partitioning units are merged into a single unit after an inverse reconstruction process in the partitioning units is performed, and thus an image may be output.

Figure 12:
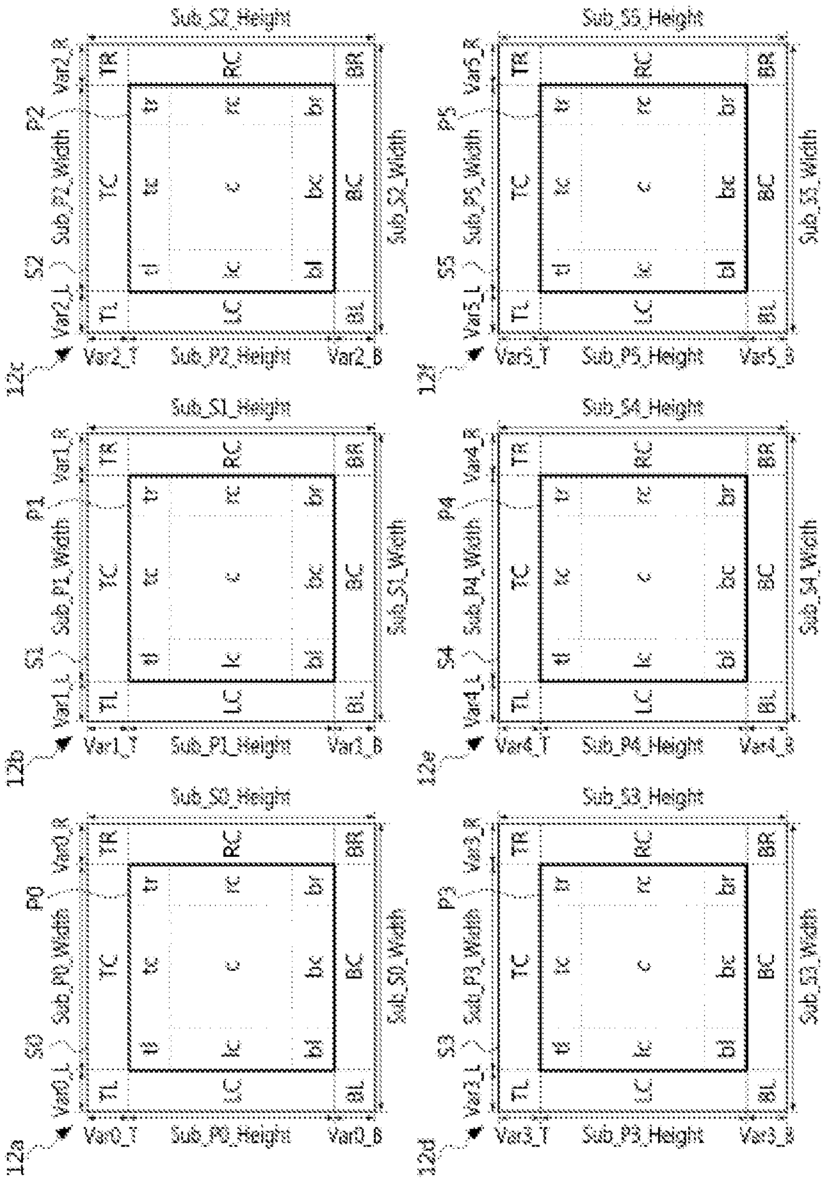
FIG. 12 is an example diagram of resizing each partitioning unit of an image according to an embodiment of the present invention.

FIG. 12 is an example diagram of resizing each partitioning unit of an image according to an embodiment of the present invention. P0 to P5 of FIG. 12 correspond to P0 to P5 of FIG. 11, and S0 to S5 of FIG. 12 correspond to S0 to S5 of FIG. 11.

In the following example, the description will focus on a case in which image resizing is performed after image partitioning is performed. However, image partitioning may be performed after image resizing is performed, depending on encoding/decoding settings, and modifications may be made thereto. Also, the above-described image resizing process (including the inverse process) may be applied identically or similarly to the image partitioning unit resizing process in this embodiment.

For example, TL to BR of FIG. 7 may correspond to TL to BR of partitioning units SX (S0 to S5) of FIG. 12. S0 and S1 of FIG. 7 may correspond to PX and SX of FIG. 12. P_Width and P_Height of FIG. 7 may correspond to Sub_PX_Width and Sub_PX_Height of FIG. 12. P'_Width and P'_Height of FIG. 7 may correspond to Sub_SX_Width and Sub_SX_Height of FIG. 12. Exp_L, Exp_R, Exp_T, and Exp_B of FIG. 7 may correspond to VarX_L, VarX_R, VarX_T, and VarX_B of FIG. 12, and other factors may correspond.

The process of resizing partitioning units in the image in sections 12A to 12F may differ from image expansion or reduction in Sections 7A and 7B of FIG. 7 in that settings for the image expansion or reduction may be present in proportion to the number of partitioning units. Also, the process of resizing partitioning units in the image may differ from the image expansion or reduction in terms of having settings applied in common or individually to the partitioning units in the image. In the following example, various resizing cases will be described, and the resizing process may be performed in consideration of the above-description.

According to the present invention, the image resizing may or may not be performed on all partitioning units in the image and may be performed on some partitioning units. Through the following example, various image resizing cases will be described. Also, for convenience of description, it is assumed that the resizing operation is for expansion, the resizing operation is based on an offset factor, the resizing direction is an "up" direction, a "down" direction, a "left" direction, and a "right" direction, the resizing direction is set to operate by the resizing information, the unit of an image is a picture, and the unit of a partitioned image is a tile.

As an example, whether to perform image resizing may be determined in some units (e.g., sps_img_resizing_enabled_flag or SEI or metadata, etc.). Alternatively, whether to perform image resizing may be determined in some units (e.g., pps_img_resizing_enabled_flag). This may be allowed when occurring in a corresponding unit (here, a picture) for the first time or when being activated in an upper unit (e.g., sps_img_resizing_enabled_flag=1). Alternatively, whether to perform image resizing may be determined in some units (e.g., tile_resizing_flag[i]; i is a partitioning unit index). This may be allowed when occurring in a corresponding unit (here, a tile) for the first time or when being activated in an upper unit. Also, partially, whether to perform image resizing may be implicitly determined according to encoding/decoding settings, and thus related information may be omitted.

As an example, whether to resize partitioning units in an image may be determined according to a signal indicating image resizing (e.g., pps_img_resizing_enabled_flag). In detail, whether to resize all partitioning units in an image may be determined according to the signal. In this case, a single signal indicating image resizing may be generated.

As an example, whether to resize partitioning units in an image may be determined according to a signal indicating image resizing (e.g., tile_resizing_flag[i]). In detail, whether to resize some partitioning units in an image may be determined according to the signal. In this case, at least one signal indicating image resizing (e.g., a number of signals equal to the number of partitioning units) may be generated.

As an example, whether to resize an image may be determined according to a signal indicating image resizing (e.g., pps_img_resizing_enabled_flag), and whether to resize partitioning units in an image may be determined according to a signal indicating image resizing (e.g., tile_resizing_flag[i]). In detail, when any signal is activated (e.g., pps_img_resizing_enabled_flag=1), any other signal (e.g., tile_resizing_flag[i]) may be additionally checked, and whether to resizing some partitioning units in an image may be performed according to the signal (here, tile_resizing_flag[i]). In this case, a plurality of signals indicating image resizing may be generated.

When the signal indicating image resizing is activated, image resizing-related information may be generated. In the following example, a variety of image resizing-related information will be described.

As an example, resizing information applied to an image may be generated. In detail, one piece of resizing information or a set of pieces of resizing information may be used as resizing information for all partitioning units in an image. For example, one piece of resizing information applied in common to an "up" direction, a "down" direction, a "left" direction, and a "right" direction of partitioning units in an image (or a resizing value applied to all the resizing directions supported or allowed in partitioning units; in this example, one piece of information) or a set of pieces of resizing information applied individually to the "up" direction, the "down" direction, the "left" direction, and the "right" direction (or a number of pieces of resizing information equal to the number of resizing directions allowed or supported by the partitioning unit; in this example, up to four pieces of information) may be generated.

As an example, resizing information applied to partitioning units in an image may be generated. In detail, at least one piece of resizing information or a set of pieces of resizing information may be used as resizing information for all partitioning units in an image. That is, one piece of resizing information or a set of pieces of resizing information may be used as resizing information for one partitioning unit or as resizing information for a plurality of partitioning units. For example, a piece of resizing information applied in common to an "up" direction, a "down" direction, a "left" direction, and a "right" direction of one partitioning unit in an image may be generated, or a set of pieces of resizing information individually applied to the "up" direction, the "down" direction, the "left" direction, and the "right" direction may be generated. Alternatively, a piece of resizing information applied in common to an "up" direction, a "down" direction, a "left" direction, and a "right" direction of a plurality of partitioning units in an image may be generated, or a set of pieces of resizing information individually applied to the "up" direction, the "down" direction, the "left" direction, and the "right" direction may be generated. The configuration of the resizing set means resizing value information regarding at least one resizing direction.

In summary, resizing information applied in common to partitioning units in an image may be generated. Alternatively, resizing information applied individually to partitioning units in an image may be generated. The following example will be described in combination with an example in which image resizing is performed.

For example, when the signal indicating image resizing (e.g., pps_img_resizing_enabled_flag) is activated, resizing information applied in common to partitioning units in an image may be generated. Alternatively, when the signal indicating image resizing (e.g., pps_img_resizing_enabled_flag) is activated, resizing information applied individually to partitioning units in an image may be generated. Alternatively, when the signal indicating image resizing (e.g., tile_resizing_flag[i]) is activated, resizing information applied individually to partitioning units in an image may be generated. Alternatively, when the signal indicating image resizing (e.g., tile_resizing_flag[i]) is activated, resizing information applied in common to partitioning units in an image may be generated.

The resizing direction, the resizing information, and the like of the image may be implicitly or explicitly processed depending on encoding/decoding settings. For the implicit processing, the resizing information may be assigned as a predetermined value depending on the characteristics, type, and the like of the image.

It has been described that the resizing direction in the resizing process of the present invention may be at least one of the "up" direction, the "down" direction, the "left" direction, and the "right" direction and the resizing direction and the resizing information may be processed explicitly or implicitly. That is, a resizing value (including 0; this means no resizing) may be implicitly predetermined for some directions, and a resizing value (including 0; this means no resizing) may be explicitly assigned for other directions.

In even a partitioning unit in an image, the resizing direction and the resizing information may be set to be implicitly or explicitly processed, and this may be applied to the partitioning unit in the image. For example, a setting applied to one partitioning unit in an image may occur (here, a number of settings equal to the number of partitioning units may occur), a setting applied to a plurality of partitioning units in an image may occur, or a setting applied to all partitioning units in an image may occur (here, one setting may occur), and at last one setting may occur in an image (e.g., one to a number of settings equal to the number of partitioning units may occur). The setting information applied to partitioning units in an image may be collected, and a single set of settings may be defined.

Figure 13:
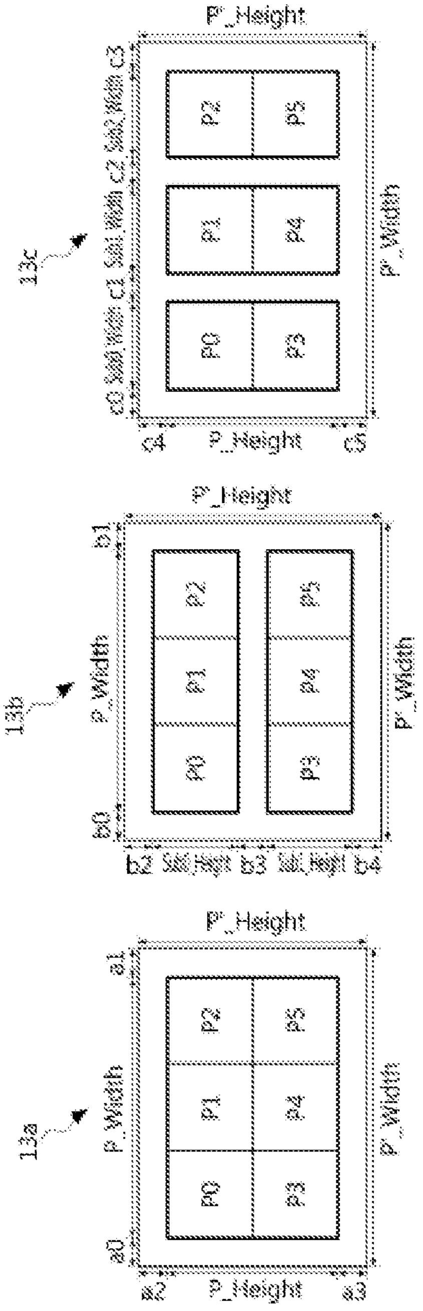
FIG. 13 is an example diagram of a set of resizing or setting of a partitioning unit in an image.

FIG. 13 is an example diagram of a set of resizing or setting of a partitioning unit in an image.

In detail, FIG. 13 illustrates various examples of implicitly or explicitly processing a resizing direction and resizing information for partitioning units in an image. In the following example, for convenience of description, the implicit processing assumes that resizing values of some resizing directions are 0.

As shown in Section 13A, the resizing may be explicitly processed when the boundary of a partitioning unit matches the boundary of an image (here, a thick solid line), and the resizing may be implicitly processed when the boundary of a partitioning unit does not match the boundary of an image (a thin solid line). For example, P0 may be resized in an "up" direction and a "left" direction (a2 and a0), P1 may be resized in an "up" direction (a2), P2 may be resized in an "up" direction and a "right" direction (a2 and a1), P3 may be resized in a "down" direction and a "left" direction (a3 and a0), P4 may be resized in a "down" direction (a3), and P5 may be resized in a "down" direction and a "right" direction (a3 and a1). In this case, the resizing may not be allowed in the other directions.

As shown in Section 13B, some directions (here, up and down) of a partitioning unit may allow the resizing to be explicitly processed, and some directions (here, left and right) of a partitioning unit may allow the resizing to be explicitly processed (here, a thick solid line) when the boundary of the partitioning unit matches the boundary of the image and may allow the resizing to be implicitly processed (here, a thin solid line) when the boundary of the partitioning unit does not match the boundary of the image. For example, P0 may be resized in an "up" direction, a "down" direction, and a "left" direction (b2, b3, and b0), P1 may be resized in an "up" direction and a "down" direction (b2 and b3), P2 may be resized in an "up" direction, a "down" direction, and a "right" direction (b2, b3, and b1), P3 may be resized in an "up" direction, a "down" direction, and a "left" direction (b3, b4, and b0), P4 may be resized in an "up" direction and a "down" direction (b3 and b4), and P5 may be resized in an "up" direction, a "down" direction, and a "right" direction (b3, b4, and b1). In this case, the resizing may not be allowed in the other directions.

As shown in Section 13C, some directions (here, left and right) of a partitioning unit may allow the resizing to be explicitly processed, and some directions (here, up and down) of a partitioning unit may allow the resizing to be explicitly processed (here, a thick solid line) when the boundary of the partitioning unit matches the boundary of the image and may allow the resizing to be implicitly processed (here, a thin solid line) when the boundary of the partitioning unit does not match the boundary of the image. For example, P0 may be resized in an "up" direction, a "left" direction, and a "right" direction (c4, c0, and c1), P1 may be resized in an "up" direction, a "left" direction, and a "right" direction (c4, c1, and c2), P2 may be resized in an "up" direction, a "left" direction, and a "right" direction (c4, c2, and c3), P3 may be resized in a "down" direction, a "left" direction, and a "right" direction (c5, c0, and c1), P4 may be resized in a "down" direction, a "left" direction, and a "right" direction (c5, c1, and c2), and P5 may be resized in a "down" direction, a "left" direction, and a "right" direction (c5, c2, and c3). In this case, the resizing may not be allowed in the other directions.

Settings related to image resizing like the above example may have various cases. A plurality of sets of settings are supported so that setting set selection information may be explicitly generated, or a predetermined setting set may be implicitly determined according to encoding/decoding settings (e.g., the characteristics, type, and the like of the image).

Figure 14:
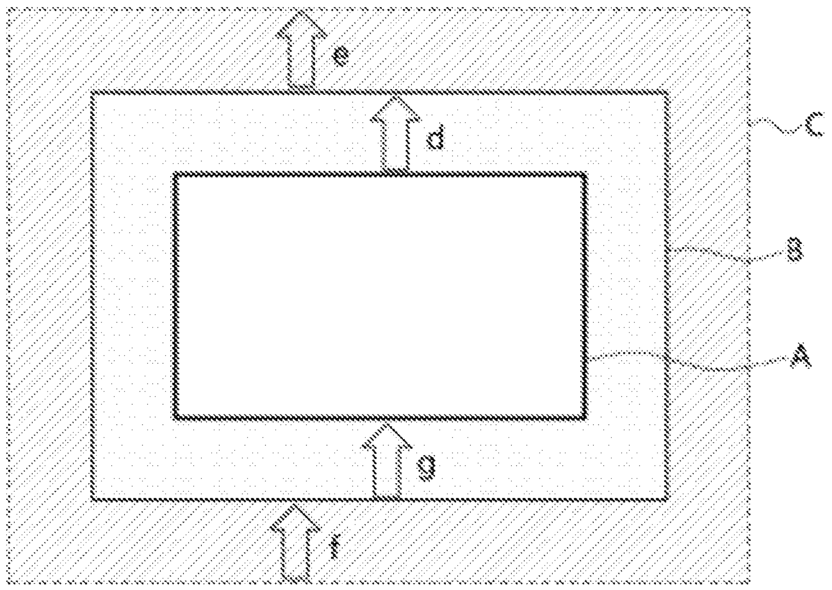
FIG. 14 is an example diagram in which both of a process of resizing an image and a process of resizing partitioning units in an image are represented.

FIG. 14 is an example diagram in which both of a process of resizing an image and a process of resizing partitioning units in an image are represented.

Referring to FIG. 14, the process of resizing an image and the inverse process may proceed in directions e and f, and the process of resizing partitioning units in an image and the inverse process may proceed in directions d and g. That is, a resizing process may be performed on an image, and then a resizing process may be performed on partitioning units in an image. The resizing order may not be fixed. This means that a plurality of resizing processes may be possible.

In summary, the image resizing process may be classified into resizing of an image (or resizing an image before partitioning) and resizing of partitioning units in an image (or resizing an image after partitioning). Neither, either, or both of the resizing of an image and the resizing of partitioning units in an image may be performed, which may be determined according to encoding/decoding settings (e.g., the characteristics, type, and the like of the image).

When in the example, a plurality of resizing processes are performed, the resizing of an image may be performed in at least one of the "up" direction, the "down" direction, the "left" direction, and the "right" direction of the image, and at least one of the partitioning units in the image may be resized. In this case, the resizing may be performed in at least one of an "up" direction, a "down" direction, a "left" direction, and a "right" direction of the partitioning unit to be resized.

Referring to FIG. 14, the size of an image before resizing (A) may be defined as P_Width×P_Height, the size of an image after primary resizing (or an image before secondary resizing; B) may be defined as P'_Width×P'_Height, and the size of an image after secondary resizing (or an image after final resizing; C) may be defined as P"_Width×P"_Height. The image before resizing (A) denotes an image on which no resizing is performed, the image after primary resizing (B) denotes an image on which some resizing is performed, and the image after secondary resizing (C) denotes an image on which all resizing is performed. For example, the image after primary resizing (B) may denote an image in which resizing is performed in partitioning units of the image as shown in Sections 13A to 13C, and the image after secondary resizing (C) may denote an image acquired by entirely resizing the image after primary resizing (B) as shown in Section 7A of FIG. 7. The opposite case is also possible. However, the present invention is not limited to the above example, and various modifications may be made thereto.

In the size of the image after primary resizing (B), P'_Width may be acquired through P_Width and at least one horizontal resizing value that is laterally resized, and P' Height may be acquired through P_Height and at least one vertical resizing value that is longitudinally resized. In this case, the resizing value may be a resizing value generated in partitioning units.

In the size of the image after secondary resizing (C), P"_Width may be acquired through P'_Width and at least one horizontal resizing value that is laterally resized, and P"_Height may be acquired through P'_Height and at least one vertical resizing value that is longitudinally resized. In this case, the resizing value may be a resizing value generated in the image.

In summary, the size of the image after resizing may be acquired through at least one resizing value and the size of the image before resizing.

In a resized region of the image, information regarding a data processing method may be generated. Through the following example, various data processing methods will be described. A data processing method generated during the inverse resizing process may be applied identically or similarly to that of the resizing process. The data processing methods in the resizing process and the inverse resizing process will be described through various combinations to be described below.

As an example, a data processing method applied to an image may be generated. In detail, one data processing method or a set of data processing methods may be used as a data processing method for all partitioning units in the image (here, it is assumed that all the partitioning units are to be resized). For example, one data processing method applied in common to an "up" direction, a "down" direction, a "left" direction, and a "right" direction of a partitioning unit in an image (or a data processing method or the like applied to all resizing directions supported or allowed in partitioning units; in this example, one piece of information) or a set of data processing methods applied to the "up" direction, the "down" direction, the "left" direction, and the "right" direction (or a number of data processing methods equal to the number of resizing directions supported or allowed in partitioning units; in this example, up to four pieces of information) may be generated.

As an example, a data processing method applied to partitioning units in an image may be generated. In detail, at least one data processing method or a set of data processing methods may be used as a data processing method for some partitioning units in the image (here, it is assumed that the partitioning units are to be resized). That is, one data processing method or a set of data processing methods may be used as a data processing method for one partitioning unit or a data processing method for a plurality of partitioning units. For example, one data processing method applied in common to an "up" direction, a "down" direction, a "left" direction, and a "right" direction of one partitioning unit in an image may be generated, or a set of data processing methods individually applied to the "up" direction, the "down" direction, the "left" direction, and the "right" direction may be generated. Alternatively, one data processing method applied in common to an "up" direction, a "down" direction, a "left" direction, and a "right" direction of a plurality of partitioning units in an image may be generated, or a set of data processing methods individually applied to the "up" direction, the "down" direction, the "left" direction, and the "right" direction may be generated. The configuration of the set of data processing methods means a data processing method for at least one resizing direction.

In summary, a data processing method applied in common to partitioning units in an image may be used. Alternatively, a data processing method applied individually to partitioning units in an image may be used. The data processing method may use a predetermined method. The predetermined data processing method may be provided as at least one method. This corresponds to an implicit process, and selection information for the data processing method may be explicitly generated, which may be determined according to encoding/decoding settings (e.g., the characteristics, type, and the like of the image).

That is, a data processing method applied in common to partitioning units in an image may be used. A predetermined method may be used, or one of a plurality of data processing methods may be selected. Alternatively, a data processing method applied individually to partitioning units in an image may be used. Depending on the partitioning units, a predetermined method may be used, or one of a plurality of data processing methods may be selected.

In the following example, some cases in which partitioning units in an image are resized (here, it is assumed that the resizing is for expansion) will be described (here, a resized region is filled with some data of the image).

Specific regions TL to BR of some units (e.g., S0 to S5 in Sections 12A to 12F) may be resized using data of specific regions tl to br of some units P0 to P5 (in Sections 12A to 12F). In this case, the some units may be the same as (e.g., S0 and P0) or different from (e.g., S0 and P1) one another. That is, the regions TL to BR to be resized may be filled with some data tl to br of a corresponding partitioning unit and may be filled with some data of a partitioning unit other than the corresponding partitioning unit.

As an example, the regions TL to BR of which the current partitioning unit is resized may be resized using data tl to br of the current partitioning unit. For example, TL of S0 may be filled with data tl of P0, RC of S1 may be filled with data tr+rc+br of P1, BL+BC of S2 may be filled with data bl+bc+br of P2, and TL+LC+BL of S3 may be filled with data tl+lc+b1 of P3.

As an example, the regions TL to BR of which the current partitioning unit is resized may be resized using data tl to br of a partitioning unit that is spatially adjacent to the current partitioning unit. For example, TL+TC+TR of S4 may be filled with data bl+bc+br of P1 in the "up" direction, BL+BC of S2 may be filled with data tl+tc+tr of P5 in the "down" direction, LC+BL of S2 may be filled with data tl+rc+bl of P1 in the "left" direction, RC of S3 may be filled with data tl+lc+b1 of P4 in the "right" direction, and BR of S0 may be filled with data tl of P4 in a "down+left" direction.

As an example, the regions TL to BR of which the current partitioning unit is resized may be resized using data tl to br of a partitioning unit that is not spatially adjacent to the current partitioning unit. For example, data in a (e.g., horizontal, vertical, etc.) boundary region between both ends of an image may be acquired. LC of S3 may be acquired using data tr+rc+br of S5, RC of S2 may be acquired using data tl+lc of S0, BC of S4 may be acquired using data tc+tr of S1, and TC of S1 may be acquired using data bc of S4.

Alternatively, data of specific regions (a region that is not spatially adjacent to but determined to have high correlation with a resized region) of the image may be acquired. BC of S1 may be acquired using data tl+lc+bl of S3, RC of S3 may be acquired using data tl+tc of S1, and RC of S5 may be acquired using data bc of S0.

Also, some cases in which a partitioning unit in an image is resized (here, it is assumed that the resizing is for reduction) are as follows (here, removal is performed through restoration or correction using some data of an image).

Specific regions TL to BR of some units (e.g., S0 to S5 in Sections 12A to 12F) may be used in a restoration or correction process for specific regions tl to br of some units P0 to P5. In this case, the some units may be the same as (e.g., S0 and P0) or different from (e.g., S0 and P2) one another. That is, the region to be resized may be used to restore some data of a corresponding partitioning unit and then removed, and the region to be resized may be used to restore some data of a partitioning unit other than the corresponding partitioning unit and then removed. The detailed example may be inversely derived from the expansion process, and thus will be omitted.

The example may be applied to a case in which data with high correlation is present in a region to be resized, and information regarding locations referenced for the resizing may be explicitly generated or implicitly acquired according to a predetermined rule. Alternatively, related information may be checked in combination. This may be an example that may be applied when data is acquired from another region with continuity in encoding of a 360-degree image.

Next, an example in which partitioning units in an image are resized in the encoding/decoding apparatus according to an embodiment of the present invention will be described.

A partitioning process may be performed on an input image before encoding is started. A resizing process may be performed on a partitioning unit using resizing information, and the image may be encoded after the partitioning unit is resized. The image encoding data may be stored in the memory after the encoding is complete, and may be added to a bitstream and then transmitted.

A partitioning process may be performed using partitioning information before decoding is started. A resizing process may be performed on partitioning units using resizing information, and the image decoding data may be parsed to be decoded in the resized partitioning units. The image decoding data may be stored in the memory after the decoding is complete, and the plurality of partitioning units are merged into a single unit after an inverse resizing process for the partitioning units is performed, and thus an image may be output.

Another example of the above-described image resizing process may be applied. The present invention is not limited thereto, and modifications may be made thereto.

In the image setting process, the image resizing and the image reconstruction may be allowed to be combined. The image reconstruction may be performed after the image resizing is performed. Alternatively, the image resizing may be performed after the image reconstruction is performed. Also, the image partitioning, the image reconstruction, and the image resizing may be allowed to be combined. The image resizing and the image reconstruction may be performed after the image partitioning is performed. The order of image settings is not fixed and may be changed, which may be determined according to encoding/decoding settings. In this example, the image setting process will be described as the image reconstruction and the image resizing being performed after the image partitioning is performed. However, depending on encoding/decoding settings, another order is possible, and also modifications may be made thereto.

For example, the image setting process may be performed in the following order: partitioning→reconstruction; reconstruction→partitioning; partitioning→resizing; resizing→partitioning; resizing→reconstruction; reconstruction→resizing; partitioning→reconstruction→resizing; partitioning→resizing→reconstruction; resizing→partitioning→reconstruction; resizing→reconstruction→partitioning; reconstruction→partitioning→resizing; and reconstruction→resizing→partitioning, and a combination with additional image settings may be possible. As described above, the image setting process may be sequentially performed, but some or all of the setting process may be simultaneously performed. Also, as some of the image setting process, a plurality of processes may be performed according to encoding/decoding settings (e.g., the characteristics, type, and the like of an image). The following example indicates various combinations of the image setting process.

As an example, P0 to P5 in Section 11A may correspond to S0 to S5 in Section 11B, and the reconstruction process (here, rearrangement of pixels) and the resizing process (here, resizing of partitioning units to have the same size) may be performed in partitioning units. For example, P0 to P5 may be resized based on offset and may be assigned to S0 to S5. Also, P0 may not be reconstructed and then may be assigned to S0. P1 may be rotated by 90 degrees and then may be assigned to S1. P2 may be rotated by 180 degrees and then may be assigned to S2. P3 may be rotated by 270 degrees and then may be assigned to S3. P4 may be horizontally flipped and then may be assigned to S4. P5 may be vertically flipped and then may be assigned to S5.

As an example, P0 to P5 in Section 11A may correspond to positions that are the same as or different from S0 to S5 in Section 11B, and the reconstruction process (here, rearrangement of pixels and partitioning units) and the resizing process (here, resizing of partitioning units to have the same size) may be performed in partitioning units. For example, P0 to P5 may be resized based on scale and may be assigned to S0 to S5. Also, P0 may not be reconstructed and then may be assigned to S0. P1 may not be reconstructed and then may be assigned to S2. P2 may be rotated by 90 degrees and then may be assigned to S1. P3 may be horizontally flipped and then may be assigned to S4. P4 may be rotated by 90 degrees and horizontally flipped and then may be assigned to S5. P5 may be horizontally flipped and then rotated by 180 degrees and then may be assigned to S3.

As an example, P0 to P5 in Section 11A may correspond to E0 to E5 in Section 5E, and the reconstruction process (here, rearrangement of pixels and partitioning units) and the resizing process (here, resizing of partitioning units to have the different sizes) may be performed in partitioning units. For example, P0 may not be resized and reconstructed and then may be assigned to E0, P1 may be resized based on scale but is not reconstructed and then may be assigned to E1, P2 may not be resized but reconstructed and then may be assigned to E2, P3 may be resized based on offset but is not reconstructed and then may be assigned to E4, P4 may not be resized but reconstructed and may be assigned to E5, and P5 may be resized based on offset and reconstructed and then may be assigned to E3.

Like the above example, the absolute position or the relative position of the partitioning units before and after the image setting process in the image may be maintained or changed, which may be determined according to encoding/decoding settings (e.g., the characteristics, type, and the like of the image). Also, various combinations of the image setting processes may be possible. The present invention is not limited thereto, and thus various modifications may be made thereto.

The encoder may add the information generated during the above process to a bitstream in units of at least one of sequences, pictures, slices, tiles, and the like, and the decoder may parse related information from the bitstream. Also, the information may be included in the bitstream in the form of SEI or metadata.

TABLE 4

```
Partition information( )
{
  parts_enabled_flag
  if(parts_enabled_flag)
  {
    num_partitons
    for(i=0; i<num_partitions; i+ +)
    {
      part_top[i]
      part_left[i]
      part_width[i]
      part_height[i]
    }
    part_header_enabled_flag
    if(part_header_enabled_flag)
      partition_header( )
  }
}
```

Table 4 represents example syntax elements associated with a plurality of image settings. The following description will focus on an additional syntax element. Also, in the following example, a syntax element is not limited to any specific unit and may be supported in various units such as a sequence, a picture, a slice, and a tile. Alternatively, the syntax element may be included in SEI, metadata, and the like.

Referring to Table 4, parts_enabled_flag denotes a syntax element indicating whether to partition some units. When the syntax element is activated (parts_enabled_flag=1), an image may be partitioned into a plurality of units, and the plurality of units may be encoded or decoded. Also, additional partitioning information may be checked. When the syntax element is deactivated (parts_enabled_flag=0), an original image is encoded or decoded. In this example, the description will focus on a rectangular partitioning unit such as a tile, and different settings for the existing tile and partitioning information may be provided.

Here, num_partitions refers to a syntax element indicating the number of partitioning units, and num_partitions plus 1 is equal to the number of partitioning units.

Also, part_top[i] and part_left[i] refer to syntax elements indicating location information of the partitioning units and denote horizontal start positions and vertical start positions of the partitioning units (e.g., upper left positions of the partitioning units). Also, part_width[i] and part_height[i] refer to syntax elements indicating size information of the partitioning units and denote the widths and the heights of the partitioning units. In this case, the start positions and the size information may be set in pixel units or in block units. Also, the syntax element may be a syntax element that may be generated during the image reconstruction process or a syntax element that may be generated when the image partitioning process and the image reconstruction process are constructed in combination.

Also, part_header_enabled_flag denotes a syntax element indicating whether to support encoding/decoding settings for a partitioning unit. When the syntax element is activated (part_header_enabled_flag=1), encoding/decoding settings for a partitioning unit may be provided. When the syntax element is deactivated (part_header_enabled_flag=0), the encoding/decoding settings cannot be provided, and encoding/decoding settings for an upper unit may be assigned.

The above example is not limited to an example of syntax elements associated with resizing and reconstruction in a partitioning unit among image settings, and modifications may be made thereto as other partitioning units and settings of the present invention. This example has been described under the assumption that the resizing and the reconstruction are performed after the partitioning is performed, but the present invention is not limited thereto, and modifications may be made thereto in another image setting order or the like. Also, the type, order, condition, and the like of the supported syntax element in the following example are limited to only the example and thus may be changed and determined according to encoding/decoding settings.

TABLE 5

```
Converting information
{
  convert_enabled_flag
  if(convert_enabled_flag)
  {
    for(i=0; i<num_partitions; i+ +)
    {
      part_convert_flag[i]
      if(part_convert_flag[i])
        convert_type_flag[i]
    }
  }
}
```

Table 5 represents example syntax elements associated with reconstruction in a partitioning unit among image settings.

Referring to Table 5, part_convert_flag[i] denotes a syntax element indicating whether to reconstruct a partitioning unit. The syntax element may be generated for each partitioning unit. When the syntax element is activated (part_convert_flag[i]=1), the reconstructed partitioning unit may be encoded or decoded, and additional reconstruction-related information may be checked. When the syntax element is deactivated (part_convert_flag[i]=0), an original partitioning unit is encoded or decoded. Here, convert_type_flag[i] refers to mode information regarding reconstruction of a partitioning unit and may be information regarding pixel rearrangement.

Also, a syntax element indicating additional reconstruction such as partitioning unit rearrangement may be generated. In this example, the partitioning unit rearrangement may be performed through part_top and part_left, which are syntax element indicating the above image partitioning, or a syntax element (e.g., index information) associated with the partitioning unit rearrangement may be generated.

TABLE 6

```
Resizing information
{
  img_resizing_enabled_flag
  if(img_resizing_enabled_flag)
  {
    resizing_met_flag
    resizing_mov_flag
    for(i=0; i<num_partitions; i+ +)
    {
      part_resizing_flag[i]
      if(part_resizing_flag[i])
      {
        if(!resizing_met_flag)
        {
          width_scale[i]
          height_scale[i]
        }
        else
        {
          top_height_offset[i]
          bottom_height_offset[i]
          left_width_offset[i]
          right_width_offset[i]
        }
        for(j=0; j<num_offset; j+ +)
          resizing_type_flag[i][j]
      }
    }
  }
}
```

Table 6 represents example syntax elements associated with resizing in a partitioning unit among image settings.

Referring to Table 6, part_resizing_flag[i] denotes a syntax element indicating whether to resize a partitioning unit in an image. The syntax element may be generated for each partitioning unit. When the syntax element is activated (part_resizing_flag[i]=1), the resized partitioning unit may be encoded or decoded after resizing, and additional resizing-related information may be checked. When the syntax element is deactivated (part_resiznig_flag[i]=0), an original partitioning unit is encoded or decoded.

Also, width_scale[i] and height_scale[i] denote scale factors associated with horizontal resizing and vertical resizing of the scale factor-based resizing in a partitioning unit.

Also, top_height_offset[i] and bottom_height_offset[i] denote an offset factor for an "up" direction and an offset factor for a "down" direction, which are associated with the offset factor-based resizing in a partitioning unit, and left_width_offset[i] and right_width_offset[i] denote an offset factor for a "left" direction and an offset factor for a "right" direction, which are associated with the offset factor-based resizing in a partitioning unit.

Also, resizing_type_flag[i][j] denotes a syntax element indicating a data processing method for a resized region in a partitioning unit. The syntax element denotes an individual data processing method for a resizing direction. For example, a syntax element indicating an individual data processing method for a resized region in an "up" direction, a "down" direction, a "left" direction, and a "right" direction may be generated. The syntax element may be generated on the basis of resizing information (e.g., which may be generated only when resizing is performed in some directions).

The above-described image setting process may be a process that is applied according to the characteristics, type, and the like of the image. In the following example, the above-described image setting process may be applied without or with any change, even without special mention. In the following example, the description will focus on a case of an addition to or a change in the above example.

For example, a 360-degree image or an omnidirectional image generated through a 360-degree camera has different characteristics from those of an image acquired through a general camera and has a different encoding environment from that of compression of a normal image.

Unlike a normal image, a 360-degree image may have no boundary part with discontinuity, and data of all regions of the 360-degree image may have continuity. Also, an apparatus such as an HMD may require a high-definition image because an image should be replayed in front of eyes through a lens. When an image is acquired through a stereoscopic camera, the amount of image data processed may increase. Various image setting processes considering a 360-degree image may be performed to provide efficient encoding environments including the above example.

The 360-degree camera may be a plurality of cameras or a camera having a plurality of lenses and sensors. The camera or lens may cover all directions around any center point captured by the camera.

The 360-degree image may be encoded using various methods. For example, the 360-degree image may be encoded using various image processing algorithms in a 3D space, and may be converted into a 2D space and encoded using various image processing algorithms. According to the present invention, the following description will focus on a method of converting a 360-degree image into a 2D space and encoding or decoding the converted image.

A 360-degree image encoding apparatus according to an embodiment of the present invention may include some or all of the elements shown in FIG. 1, and may further include a pre-processing unit configured to pre-process an input image (Stitching, Projection, Region-wise Packing). Meanwhile, a 360-degree image decoding apparatus according to an embodiment of the present invention may include some or all of the elements shown in FIG. 2, and may further include a post-processing unit configured to post-process an encoded image before decoding the encoded image to reproduce an output image.

In other words, the encoder may pre-process an input image, encode the pre-processed image, and transmit a bitstream including the image, and the decoder may parse, decode, and post-process the transmitted bitstream to generate an output image. In this case, the transmitted bitstream may include information generated during the pre-processing process and information generated during the encoding process, and the bitstream may be parsed and used during the decoding process and the post-processing process.

Subsequently, an operation method for a 360-degree image encoder will be described in more detail, and an operation method for a 360-degree image decoder may be easily derived by those skilled in the art because the operation method for the 360-degree image decoder is opposite to the operation method for the 360-degree image encoder, and thus a detailed description thereof will be omitted.

The input image may be subject to performing a stitching and projection process on a sphere-based 3D projection structure, and image data on the 3D projection structure may be projected into a 2D image through the process.

The projected image may be configured to include some or all of 360-degree content according to encoding settings. In this case, location information of a region (or a pixel) to be placed at the center of the projected image may be implicitly generated as a predetermined value or may be explicitly generated. Also, when the projected image includes specific regions of the 360-degree content, the range information and location information of the included regions may be generated. Also, range information (e.g., the width and the height) and location information (e.g., which is measured on the basis of an upper left end of an image) of a region of interest (ROI) may be generated from the projected image. In this case, a specific region with high importance in the 360-degree content may be set as an ROI. The 360-degree image may allow all content in an "up" direction, a "down" direction, a "left" direction, and a "right" direction to be viewed, but a user's gaze may be limited to a portion of the image, which may be set as an ROI in consideration of the limitation. For the purpose of efficient encoding, an ROI may be set to have good quality and high resolution, and the other regions may be set to have lower quality and lower resolution than the ROI.

Among a plurality of 360-degree image transmission schemes, a single stream transmission scheme may allow a full image or a viewport image to be transmitted in an individual single bitstream for a user. A multi-stream transmission scheme may allow several full images with different image qualities to be transmitted in multiple bitstreams, and thus an image quality may be selected according to user environments and communication conditions. A tiled-stream transmission scheme may allow a tile unit-based partial image that is individually encoded to be transmitted in multiple bitstreams, and thus a tile may be selected according to user environments and communication conditions. Accordingly, the 360-degree image encoder may generate and transmit a bitstream having two or more qualities, and the 360-degree image decoder may set an ROI according to a user's view and may selectively decode the bitstream according to the ROI. That is, a place where a user's gaze is directed may be set as an ROI through a head tracking or eye tracking system, and only the necessary part may be rendered.

The projected image may be converted into a packed image obtained by performing a region-wise packing process. The region-wise packing process may include a step of partitioning a projected image into a plurality of regions, and the partitioned regions may be arranged (or rearranged) in the image packed according to the region-wise packing settings. The region-wise packing may be performed to increase spatial continuity when a 360-degree image is converted into a 2D image (or a projected image). Thus, it is possible to reduce the size of the image through the region-wise packing. Also, the region-wise packing may be performed to reduce deterioration in image quality caused during rendering, enable a viewport-based projection, and provide other types of projection formats. The region-wise packing may or may not be performed depending on encoding settings, which may be determined on the basis of a signal indicating whether to perform the region-wise packing (e.g., regionwise_packing_flag; only when regionwise_packing_flag is activated, information regarding the region-wise packing may be generated).

When the region-wise packing is performed, setting information (or mapping information) in which specific regions of the projected image are assigned (or arranged) to specific regions of the packed image may be displayed (or generated). When the region-wise packing is not performed, the projected image and the packed image may be the same image.

In the above-description, a stitching process, a projection process, and a region-wise packing process are defined as individual processes, but some (e.g., stitching+projection, projection+ region-wise packing) or all (e.g., stitching+ projection+ region-wise packing) of the processes may be defined as a single process.

At least one packed image may be generated from the same input image according to settings for the stitching process, the projection process, and the region-wise packing process. Also, according to the settings for the region-wise packing process, at least one piece of encoding data for the same projected image may be generated.

The packed image may be partitioned by performing a tiling process. In this case, the tiling, which is a process in which an image is partitioned into a plurality of regions and then transmitted, may be an example of the 360-degree image transmission schemes. As described above, the tiling may be performed for the purpose of partial decoding in consideration of user environments and may also be performed for the purpose of efficient processing of vast data of 360-degree images. For example, when an image is composed of one unit, the entire image may be decoded to decode an ROI. On the other hand, when an image is composed of a plurality of unit regions, it may be efficient to decode only an ROI. In this case, the partitioning may be performed in tile units, which are partitioning units according to a conventional encoding scheme, or may be performed in various partitioning units (e.g., a quadrilateral partitioning block, etc.) that have been described according to the present invention. Also, the partitioning unit may be a unit for performing independent encoding/decoding. The tiling may be performed independently or on the basis of the projected image or the packed image. That is, the partitioning may be performed on the basis of a face boundary of the projected image, a face boundary of the packed image, packing settings, etc., and may be independently performed for each partitioning unit. This may affect generation of partitioning information during the tiling process.

Next, the projected image or the packed image may be encoded. Encoding data and information generated during the pre-processing process may be added to a bitstream, and the bitstream may be transmitted to the 360-degree image decoder. The information generated during the pre-processing process may be added to the bitstream in the form of SEI or metadata. In this case, the bitstream may contain at least one piece of encoding data having partially different settings for the encoding process and at least one piece of pre-processing information having partially different settings for the pre-processing process. This is to construct a decoded image in combination of a plurality of pieces of encoding data (encoding data+pre-processing information) according to user environments. In detail, the decoded image may be constructed by selectively combining the plurality of pieces of encoding data. Also, the process may be performed while being separated into two parts to apply to a binocular system, and the process may be performed on an additional depth image.

Figure 15:
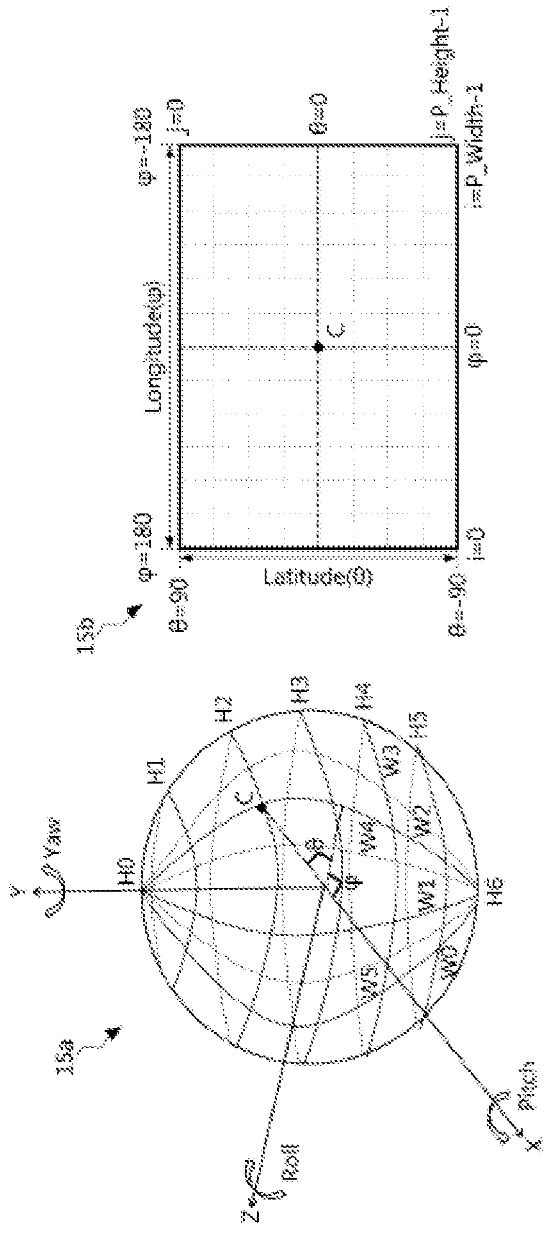
FIG. 15 is an example diagram showing a two-dimensional (2D) planar space and a three-dimensional (3D) space showing a 3D image.

FIG. 15 is an example diagram showing a 2D planar space and a 3D space showing a 3D image.

Generally, for the purpose of a 360-degree 3D virtual space, three degrees of freedom (3DoF) may be needed, and three rotations may be supported with respect to an X axis (Pitch), a Y axis (Yaw), and a Z axis (Roll). The DoF refers to the degree of freedom in space, 3DoF refers to the degree of freedom that includes rotations around the X axis, Y axis, and Z axis, as shown in Section 15A, and 6DoF refers to the degree of freedom that additionally allows movements along the X axis, Y axis, and Z axis as well as 3DoF. The following description will focus on the image encoding apparatus and the image decoding apparatus of the present invention having 3DoF. When 3DoF or greater (3DoF+) is supported, the image encoding apparatus and the image decoding apparatus may be modified or combined with an additional process or apparatus that is not shown.

Referring to Section 15A, Yaw may have a range from −π (−180 degrees) to π (180 degrees), Pitch may have a range from −π/2 rad (or −90 degrees) to π/2 rad (or 90 degrees), and Roll may have a range from −π/2 rad (or −90 degrees) to π/2 rad (or 90 degrees). In this case, when it is assumed that ϕ and θ are longitude and latitude in the map representation of the earth, 3D space coordinates (x, y, z) may be transformed from 2D space coordinates (ϕ, θ). For example, 3D space coordinates may be derived from 2D space coordinates according to transformation formulas x=cos (θ) cos (ϕ), y=sin (θ), and z=−cos (θ) sin (ϕ).

Also, (ϕ, θ) may be transformed into (x, y, z). For example, 2D space coordinates may be derived from 3D space coordinates according to transformation formulas ϕ=tan−1(−Z/X) and θ=sin−1 (Y/(X2+Y2+Z2)1/2).

When a pixel in the 3D space is accurately transformed into a pixel in the 2D space (e.g., an integer unit pixel in the 2D space), the pixel in the 3D space may be mapped to the pixel in the 2D space. When a pixel in the 3D space is not accurately transformed into a pixel in the 2D space (e.g., a decimal unit pixel in the 2D space), a pixel acquired through interpolation may be mapped to the 2D pixel. In this case, as the interpolation, nearest neighbor interpolation, bi-linear interpolation, B-spline interpolation, bi-cubic interpolation, or the like may be used. In this case, related information may be explicitly generated by selecting one of the plurality of interpolation candidates, or an interpolation method may be implicitly determined according to a predetermined rule. For example, a predetermined interpolation filter may be used according to a 3D model, a projection format, a color format, and a slice/tile type. Also, when the interpolation information is explicitly generated, information regarding filter information (e.g., a filter coefficient) may be included.

Section 15B shows an image in which a 3D space is transformed into a 2D space (a 2D planar coordinate system). (ϕ,θ) may be sampled (i,j) on the basis of the size (the width and height) of an image. Here, i may have a range from 0 to P_Width−1, and j may have a range from 0 to P_Height−1.

(ϕ,θ) may be a center point (or a reference point; a point depicted as C of FIG. 15; coordinates (ϕ,θ)=(0,0)) for arranging a 360-degree image with respect to the projected image. The setting for the center point may be designated in the 3D space, and location information for the center point may be explicitly generated or implicitly determined as a predetermined value. For example, center position information in Yaw, center position information in Pitch, center position information in Roll, and the like may be generated. When a value for the information is not specified separately, each value may be assumed to be zero.

An example in which the entire 360-degree image is transformed from the 3D space into the 2D space has been described above, but specific regions of the 360-degree image may be transformed, and location information (e.g., some locations belonging to the region; in this example, location information regarding the center point), range information, and the like for the specific regions may be explicitly generated or may implicitly follow predetermined location and range information. For example, center position information in Yaw, center position information in Pitch, center position information in Roll, range information in Yaw, range information in Pitch, range information in Roll, and the like may be generated, and specific regions may be at least one region. Thus, location information, range information, and the like of a plurality of regions may be processed. When a value for the information is not specified separately, the entire 360-degree image may be assumed.

H0 to H6 and W0 to W5 in Section 15A indicate some latitudes and longitudes in Section 15B, which may be expressed as coordinates (C, j) and (i, C) (C is a longitude or latitude component) in Section 15B. Unlike a general image, when a 360-degree image is converted into the 2D space, distortions may occur or warpage of content in an image may occur. This may depend on the region of the image, and different encoding/decoding settings may be applied to the location of the image or regions partitioned according to the location. When the encoding/decoding settings are adaptively applied on the basis of encoding/decoding information in the present invention, the location information (e.g., an x component, a y component, or a range defined by x and y) may be included as an example of the encoding/decoding information.

The description of the 3D space and the 2D space is defined to assist the description of the embodiments of the present invention. However, the present invention is not limited thereto, and the above description may be modified in terms of details or may be applied to other cases.

As described above, an image acquired through a 360-degree camera may be transformed into a 2D space. In this case, a 360-degree image may be mapped using a 3D model, and various 3D models such as a sphere, a cube, a cylinder, a pyramid, and a polyhedron may be used. When the 360-degree image mapped based on the model is transformed into the 2D space, a projection process may be performed according to a projection format based on the model.

FIGS. 16A to 16D are conceptual diagrams illustrating a projection format according to an embodiment of the present invention.

Figure 16A:
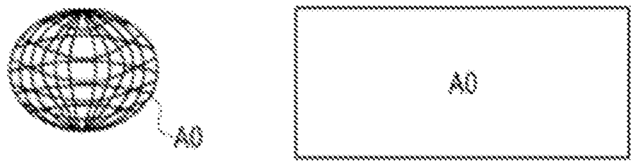
FIGS. 16A to 16D are conceptual diagrams illustrating a projection format according to an embodiment of the present invention.
Figure 16B:
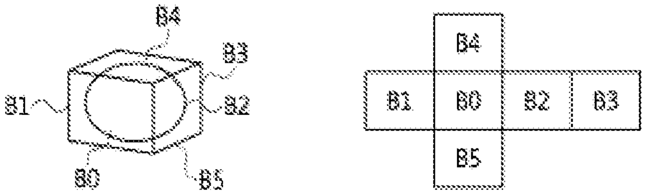
Figure 16C:
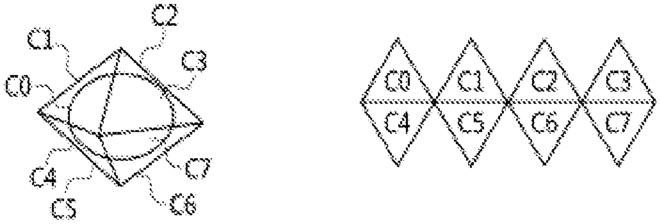
Figure 16D:
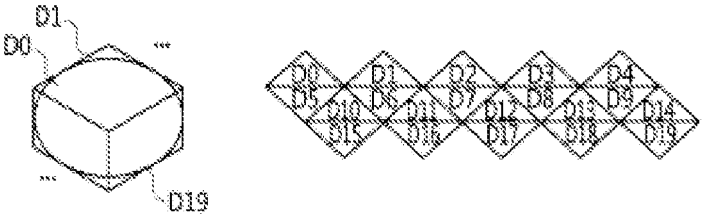

FIG. 16A illustrates an Equi-Rectangular Projection (ERP) format in which a 360-degree image is projected into a 2D plane. FIG. 16B illustrates a CubeMap Projection (CMP) format in which a 360-degree image is projected to a cube. FIG. 16C illustrates an OctaHedron Projection (OHP) format in which a 360-degree image is projected to an octahedron. FIG. 16D illustrates an IcoSahedral Projection (ISP) format in which a 360-degree image is projected to a polyhedron. However, the present invention is not limited thereto, and various projection formats may be used. In FIGS. 16A to 16D, the left sides show 3D modes, and the right sides show examples of transformation into the 2D space through the projection process. Various size and shapes may be provided according to the projection format. Each shape may be composed of surfaces or faces, and each face may be expressed as a circle, a triangle, a quadrangle, etc.

In the present invention, the projection format may be defined by a 3D mode, face settings (e.g., the number of faces, the shape of faces, the shape configuration of faces, etc.), projection process settings, etc. When at least one element is different in the definition, the projection format may be regarded as a different projection format. For example, the ERP is composed of a sphere model (the 3D model), one face (the number of faces), and a quadrangular face (the shape of faces). However, when some (e.g., a formula used during transformation from the 3D space into the 2D space; that is, an element that has the same remaining projection settings and makes a difference in at least one pixel of a projected image in the projection process) of the settings for the projection process are different, the format may be classified as a different format such as ERP1 and ERP2. As another example, the CMP is composed of a cube model, six faces, and a quadrangular face. When some (e.g., a sampling method applied during transformation from the 3D space into the 2D space) of the settings during the projection process are different, the format may be classified as a different format such as CMP1 and CMP2.

When a plurality of projection formats are used instead of one predetermined projection format, projection format identification information (or projection format information) may be explicitly generated. The projection format identification information may be configured through various methods.

As an example, a projection format may be identified by assigning index information (e.g., proj_format_flag) to a plurality of projection formats. For example, #0 may be assigned to ERP, #1 may be assigned to CMP, #2 may be assigned to OHP, #3 may be assigned to ISP, #4 may be assigned to ERP1, #5 may be assigned to CMP1, #6 may be assigned to OHP1, #7 may be assigned to ISP1, #8 may be assigned to CMP compact, #9 may be assigned to OHP compact, #10 may be assigned to ISP compact, and #11 or higher may be assigned to other formats.

As an example, the projection format may be identified using at least one piece of element information constituting the projection format. In this case, as the element information constituting the projection format, 3D model information (e.g., 3d_model_flag; #0 indicates a sphere, #1 indicates a cube, #2 indicates a cylinder, #3 indicates a pyramid, #4 indicates polyhedron 1, and #5 indicates polyhedron 2), face number information (e.g., num_face_flag; a method of increasing by 1, starting from 1; the number of faces generated in the projection format is assigned as index information, that is, #0 indicates one, #1 indicates three, #2 indicates six, #3 indicates eight, and #4 indicates twenty), face shape information (e.g., shape_face_flag; #0 indicates a quadrangle, #1 indicates a circle, #2 indicates a triangle, #3 indicates a quadrangle+a circle, and #4 indicates a quadrangle+a triangle), projection process setting information (e.g., 3d_2d_convert_idx), and the like may be included.

As an example, the projection format may be identified using projection format index information and element information constituting the projection format. For example, as the projection format index information, #0 may be assigned to ERP, #1 may be assigned to CMP, #2 may be assigned to OHP, #3 may be assigned to ISP, and #4 or greater may be assigned to other formats. The projection format (e.g., ERP, ERP1, CMP, CMP1, OHP, OHP1, ISP, and ISP1) may be identified along with the element information constituting the projection format (here, the projection process setting information). Alternatively, the projection format (e.g., ERP, CMP, CMP compact, OHP, OHP compact, ISP, and ISP compact) may be identified along with the element information constituting the projection format (here, region-wise packing).

In summary, the projection format may be identified using the projection format index information, may be identified using at least one piece of the projection format element information, and may be identified using the projection format index information and at least one of the projection format element information. This may be defined according to encoding/decoding settings. In the present invention, the following description assumes that the projection format is identified using the projection format index. In this example, the description will focus on a projection format that is expressed using faces with the same size and shape, but a configuration having different faces in size and shape may be possible. Also, the configuration of each face may be the same as or different from those shown in FIGS. 16A to 16D, the number of each face is used as a symbol for identifying a corresponding face, and there is no limitation on a specific order. For convenience of description, the following description assumes that, with respect to the projected image, ERP is a projection format including one face+a quadrangle, CMP is a projection format including six faces+a quadrangle, OHP is a projection format including eight faces+a triangle, ISP is a projection format including twenty faces+a triangle, and the faces have the same size and shape. However, the description may be identically or similarly applied even to different settings.

As shown in FIGS. 16A to 16D, the projection format may be classified as one face (e.g., ERP) or a plurality of faces (e.g., CMP, OHP, and ISP). Also, the shape of each face may be classified as a quadrangle, a triangle, or the like. The classification may be an example of the type, characteristics, and the like of the image according to the present invention, which may be applied when different encoding/decoding settings are provided depending on the projection format. For example, the type of an image may be a 360-degree image, and the characteristics of an image may be one of the classifications (e.g., each projection format, a projection format having one face or a plurality of faces, a projection format having a quadrangular face or a non-quadrangular face).

A 2D planar coordinate system (e.g., (l, j)) may be defined in each face of a 2D projected image, and the characteristics of the coordinate system may differ depending on the projection format, the location of each face, and the like. ERP may have one 2D planar coordinate system, and other projection formats may have a plurality of 2D planar coordinate systems depending on the number of faces. In this case, the coordinate system may be expressed as (k,i,j), and k may indicate index information for each face.

Figure 17:
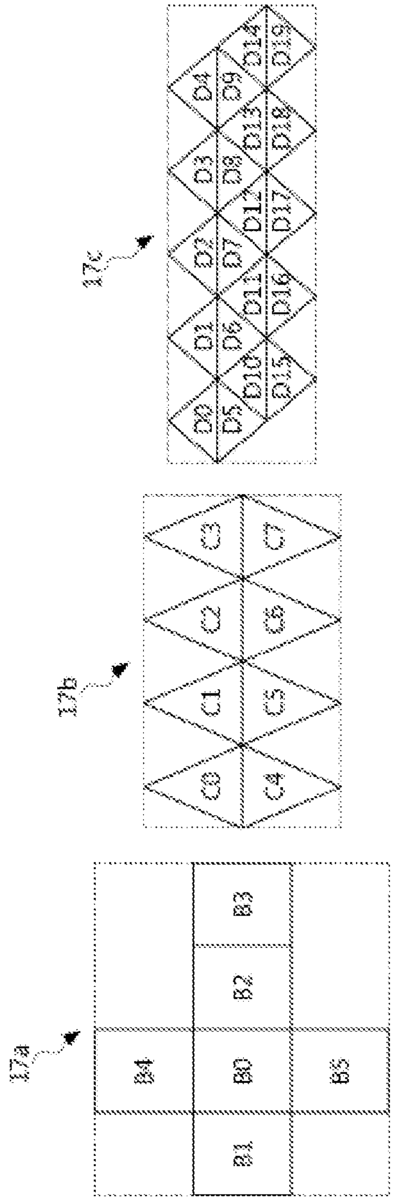
FIG. 17 is a conceptual diagram showing that a projection format is included in a rectangular image according to an embodiment of the present invention.

FIG. 17 is a conceptual diagram showing that a projection format is included in a rectangular image according to an embodiment of the present invention.

That is, it may be understood that Sections 17A to 17C show that the projection formats of FIGS. 16B to 16D are implemented as a rectangular image.

Referring to Sections 17A to 17C, each image format may be configured in a rectangular shape to encode or decode a 360-degree image. For ERP, a single coordinate system may be used as it is. However, for other projection formats, coordinate systems of faces may be integrated into a single coordinate system, and a detailed description thereof will be omitted.

Referring to Sections 17A to 17C, while a rectangular image is constructed, it may be confirmed that a region filled with meaningless data such as a void or background is generated. That is, the rectangular image may be composed of a region including actual data (here, a face; an active area) and a meaningless region added to construct the rectangular image (here, assuming that the region is filled with any pixel value; an inactive area). This may reduce performance due to an increase in encoding data, that is, an increase in image size caused by the meaningless region as well as encoding/decoding of actual image data.

Accordingly, a process for constructing an image by excluding the meaningless region and using the region including actual data may be additionally performed.

Figure 18:
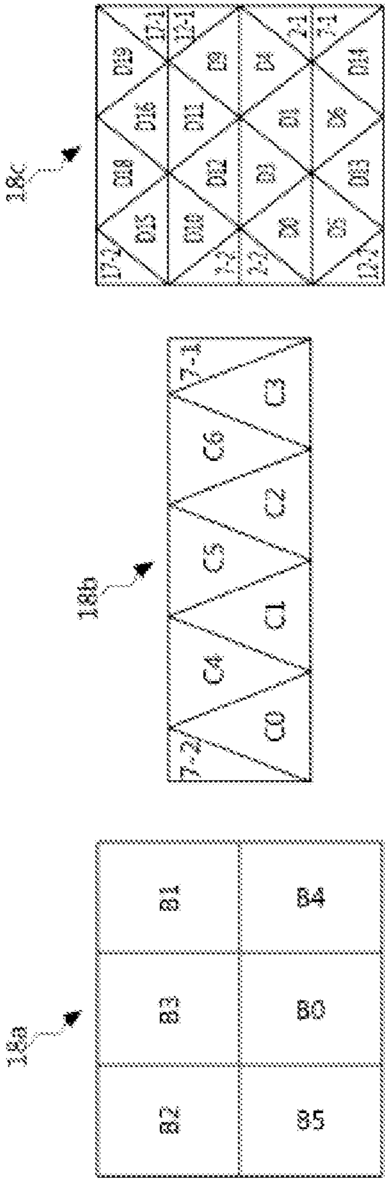
FIG. 18 is a conceptual diagram of a method of converting a projection format into a rectangular shape, that is, a method of performing rearrangement on a face to exclude a meaningless region according to an embodiment of the present invention.

FIG. 18 is a conceptual diagram of a method of converting a projection format into a rectangular shape, that is, a method of performing rearrangement on a face to exclude a meaningless region according to an embodiment of the present invention.

Referring to Sections 18A to 18C, an example for rearranging Sections 17A to 17C may be confirmed, and this process may be defined as a region-wise packing process (CMP compact, OHP compact, ISP compact, and the like). In this case, the face may be not only rearranged but also partitioned and then rearranged (OHP compact, ISP compact, and the like). This may be performed in order to remove the meaningless region as well as to improve encoding performance through efficient face arrangement. For example, when an image is continuously arranged between faces (e.g., B2-B3-B1, B5-B0-B4, etc. in Section 18A), prediction accuracy upon encoding is enhanced, and thus encoding performance may be enhanced. Here, the region-wise packing according to the projection format is merely an example, and the present invention is not limited thereto.

Figure 19:
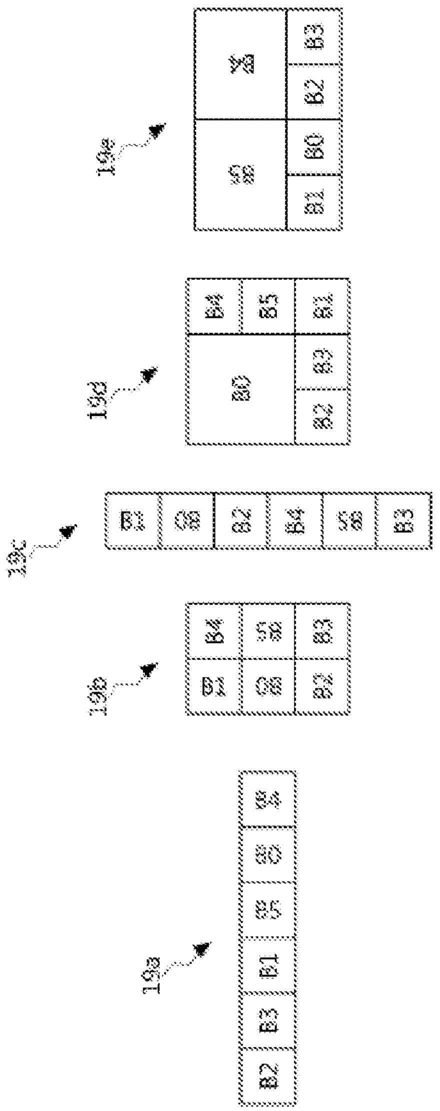
FIG. 19 is a conceptual diagram showing that a region-wise packing process is performed to convert a CMP projection format into a rectangular image according to an embodiment of the present invention.

FIG. 19 is a conceptual diagram showing that a regional packing process is performed to convert a CMP projection format into a rectangular image according to an embodiment of the present invention.

Referring to Sections 19A to 19C, a CMP projection format may be arranged as 6×1, 3×2, 2×3, and 1×6. Also, when some faces are resized, the arrangement may be made as shown in Sections 19D and 19E. In Sections 19A to 19E, CMP is applied as an example. However, the present invention is not limited thereto, and other projection formats may be applied. The arrangement of faces of an image acquired through the region-wise packing may follow a predetermined rule corresponding to the projection format or may explicitly generate information regarding the arrangement.

360-degree image encoding and decoding apparatuses according to an embodiment of the present invention may be configured to include some or all of the elements of the image encoding and decoding apparatuses shown in FIGS. 1 and 2. In particular, a format transformation part configured to transform a projection format and an inverse format transformation part configured to inversely transform a projection format may be further included in the image encoding apparatus and the image decoding apparatus, respectively. That is, an input image may be processed through the format transformation part and then encoded by the image encoding apparatus of FIG. 1, and a bitstream may be decoded and then processed through the inverse format transformation part by the image decoding apparatus of FIG. 2 to generate an output image. The following description will focus on the process performed by the encoder (here, input image, encoding, etc.), and the process performed by the decoder may be inversely derived from the encoder. Also, redundant description of the aforementioned will be omitted.

The following description assumes that the input image is the same as a packed image or a 2D projected image which is acquired by the 360-degree encoding apparatus performing the pre-processing process. That is, the input image may be an image acquired by performing the projection process according to some projection formats or the region-wise packing process. A projection formation pre-applied to the input image may be one of the various projection formats, which may be regarded as a common format and referred to as a first format.

The format transformation part may perform transformation into a projection format other than the first format. In this case, the projection format into which the transformation is to be performed may be referred to as a second format. For example, ERP may be set as the first format and may be transformed into the second format (e.g., ERP2, CMP, OHP, and ISP). In this case, ERP2 has a kind of EPR format having the same conditions, such as a 3D model and a face configuration, but some different settings. Alternatively, projection formats may be the same format having the same projection format settings (e.g., ERP=ERP2) and may have different image sizes or resolutions. Alternatively, some of the following image setting processes may be applied. For convenience of description, such an example has been mentioned, but each of the first format and the second format may be one of the various projection formats. However, the present invention is not limited thereto, and modifications may be made thereto.

During the format transformation process, a pixel of an image after transformation (an integer pixel) may be acquired from a decimal unit pixel, as well as an integer unit pixel, in an image before transformation due to different coordinate system characteristics, and thus interpolation may be performed. An interpolation filter used in this case may be the same as or similar to that described above. In this case, related information may be explicitly generated by selecting one of a plurality of interpolation filter candidates, or the interpolation filter may be implicitly determined according to a predetermined rule. For example, a predetermined interpolation filter may be used according to a projection format, a color format, and a slice/tile type. Also, when the interpolation filter is explicitly provided, information regarding filter information (e.g., a filter coefficient) may be included.

In the format transformation part, the projection format may be defined as including region-wise packing, etc. That is, projection and region-wise packing may be performed during the format transformation process. Alternatively, after the format transformation process, a process such as region-wise packing may be performed before encoding is performed.

The encoder may add the information generated during the above process to a bitstream in units of at least one of sequences, pictures, slices, tiles, and the like, and the decoder may parse related information from the bitstream. Also, the information may be included in the bitstream in the form of SEI or metadata.

Next, an image setting process applied to the 360-degree image encoding/decoding apparatus according to an embodiment of the present invention will be described. The image setting process according to the present invention may be applied to a pre-processing process, a post-processing process, a format transformation process, an inverse format transformation process, and the like of the 360-degree image encoding/decoding apparatus as well as general encoding/decoding processes. The following description of the image setting process will focus on the 360-degree image encoding apparatus and may contain the above-described image settings. Redundant description of the aforementioned image setting process will be omitted. Also, the following example will focus on the image setting process, and the inverse image setting process may be inversely derived from the image setting process. Some cases may be confirmed through the aforementioned various embodiment of the present invention.

The image setting process according to the present invention may be performed in the 360-degree image projection step, the region-wise packing step, the format transformation step, or other steps.

Figure 20:
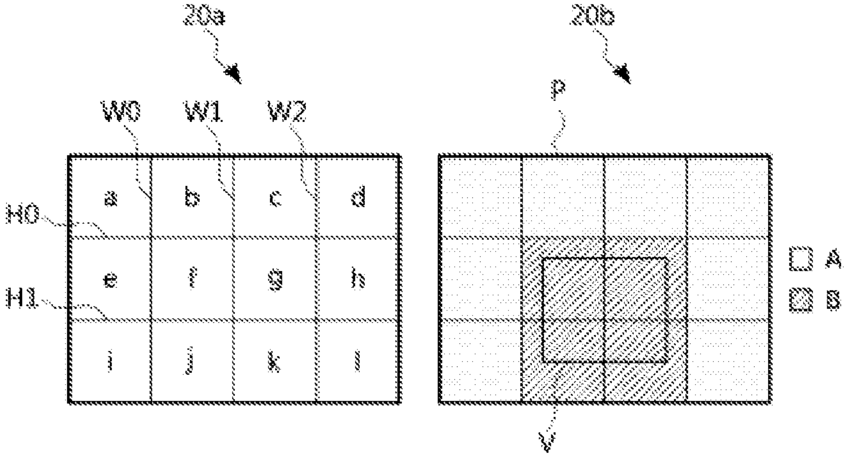
FIG. 20 is a conceptual diagram of 360-degree image partitioning according to an embodiment of the present invention.

FIG. 20 is a conceptual diagram of 360-degree image partitioning according to an embodiment of the present invention. In FIG. 20, it is assumed that an image is projected by ERP.

Section 20A illustrates an image projected by ERP, and the image may be partitioned using various methods. In the example, the description focuses on a slice or tile, and it is assumed that W0 to W2 and H0 and H1 are partitioning boundary lines for a slice or tile and follow a raster scan order. The following example focuses on a slice and a tile. However, the present invention is not limited thereto, and another partitioning method may be applied thereto.

For example, the partitioning may be performed in slice units, and H0 and H1 may be provided as partitioning boundaries. Alternatively, the partitioning may be performed in tile units, and W0 to W2, H0 and H1 may be provided as partitioning boundaries.

Section 20B illustrates an example in which an image projected by ERP is partitioned into tiles (it is assumed to have the same tile partitioning boundaries (W0 to W2, H0, and H1 are all activated) as shown in Section 20A). When it is assumed that a region P is the entire image and a region V is a region on which a user's gaze stays or a viewport, there may be various methods in order to provide an image corresponding to the viewport. For example, the region corresponding to the viewport may be acquired by decoding the entire image (e.g., tiles a to i). In this case, the entire image may be decoded, and the tile a to i (here, a region A+a region B) may be decoded when the image is partitioned. Alternatively, the region corresponding to the viewport may be acquired by decoding a region belonging to the viewport. In this case, when the image is partitioned, the region corresponding to the viewport may be acquired from an image restored by decoding tiles f, g, j, and k (here, the region B). The former case may be referred to as full decoding (or viewport independent coding), and the latter case may be referred to as partial decoding (or viewport dependent coding). The latter case may be an example that may occur in a 360-degree image with a large amount of data. The tile unit-based partitioning method may be more frequently used than the slice unit-based partitioning method in that a partitioned region may be flexibly acquired. For the partial decoding, referenceability of a partitioning unit may be spatially or temporarily limited (here, implicitly processed) because it is not possible to find where the viewpoint will occur, and the encoding/decoding may be performed in consideration the limitation. The following example will be described, focusing on the full decoding, but 360-degree image partitioning will be described, focusing on a tile (or a rectangular partitioning method of the present invention) in order to prepare for the partial decoding. However, the following description may be applied to other partitioning units in the same manner or in a modified manner.

Figure 21:
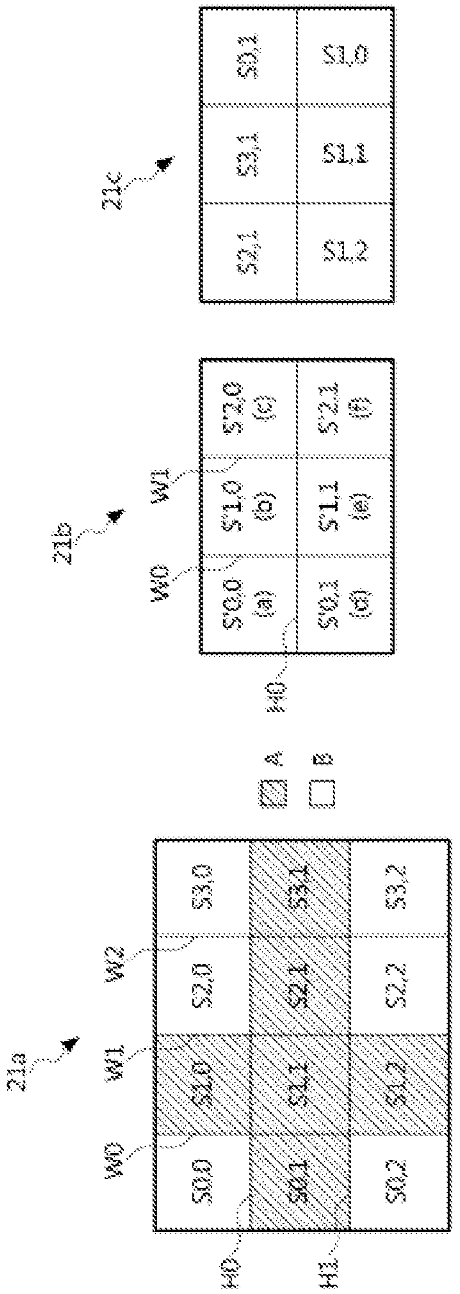
FIG. 21 is an example diagram of 360-degree image partitioning and image reconstruction according to an embodiment of the present invention.

FIG. 21 is an example diagram of 360-degree image partitioning and image reconstruction according to an embodiment of the present invention. In FIG. 21, it is assumed that an image is projected by CMP.

Section 21A illustrates an image projected by CMP, and the image may be partitioned using various methods. It is assumed that W0 to W2, H0, and H1 are partitioning boundary lines of a face, a slice, and a tile and follow a raster scan order.

For example, the partitioning may be performed in slice units, and H0 and H1 may be provided as partitioning boundaries. Alternatively, the partitioning may be performed in tile units, and W0 to W2, H0 and H1 may be provided as partitioning boundaries. Alternatively, the partitioning may be performed in face units, and W0 to W2, H0 and H1 may be provided as partitioning boundaries. In this example, it is assumed that the face is a part of the partitioning unit.

In this case, the face may be a partitioning unit (here, dependent encoding/decoding) which is performed to classify or distinguish regions having different properties (here, a plane coordinate system of each face) in the same image according to the characteristics, type (in the example, a 360-degree image and an projection format), and the like of the image while the slice or tile may be a partitioning unit (here, independent encoding/decoding) which is performed to partition an image according to user definitions. Also, the face may be a unit which is partitioned by a predetermined definition (or inducement from the projection format information) during a projection process according to the projection format while the slice or tile may be a unit which is partitioned by explicitly generating partitioning information according to user definitions. Also, the face may have a polygonal partitioning shape including a quadrangle according to the projection format, the slice may have any partitioning shape that cannot be defined as a quadrangle or a polygon, and the tile may have a quadrangular partitioning shape. The setting of the partitioning unit may be defined only for the description of this example.

In the example, it has been described that the face is a partitioning unit classified for a region distinction. However, the face may be a unit for performing independent encoding/decoding according to encoding/decoding settings as at least one face unit, and may have settings for performing independent encoding/decoding in combination with a tile, a slide, and the like. In this case, explicit information of the tile and the slice may be generated when the face is combined with a tile, a slice, and the like, or the tile and the slice may be implicitly combined on the basis of face information. Alternatively, the explicit information of the tile and the slice may be generated on the basis of the face information.

As a first example, one image partitioning process (here, a face) is performed, and image partitioning may implicitly omit partitioning information (which is acquired from projection format information). This example is for dependent encoding/decoding settings and may be an example corresponding to a case in which referenceability between face units is not limited.

As a second example, one image partitioning process (here, a face) is performed, and image partitioning may explicitly generate partitioning information. This example is for dependent encoding/decoding settings and may be an example corresponding to a case in which referenceability between face units is not limited.

As a third example, a plurality of image partitioning processes (here, a face and a tile) are performed, some image partitioning (here, a face) may implicitly omit or explicitly generate partitioning information, and other image partitioning (here, a tile) may explicitly generate partitioning information. In this example, one image partitioning process (here, a face) precedes the other image partitioning process (here, a tile).

As a fourth example, a plurality of image partitioning processes are performed, some image partitioning (here, a face) may implicitly omit or explicitly generate partitioning information, and other image partitioning (here, a tile) may explicitly generate partitioning information on the basis of the some image partitioning (here, a face). In this example, one image partitioning process (here, a face) precedes the other image partitioning process (here, a tile). In some cases (the second example is assumed) of this example, it may be the same that the partitioning information is explicitly generated, but there may be a difference in partitioning information configuration.

As a fifth example, a plurality of image partitioning processes are performed, some image partitioning (here, a face) may implicitly omit partitioning information, and other image partitioning (here, a tile) may omit implicitly partitioning information on the basis of the some image partitioning (here, a face). For example, a face unit may be individually set as a tile unit, or a plurality of face units (here, when adjacent faces have continuity, the face units are grouped; otherwise, the face units are not grouped; B2-B3-B1 and B4-B0-B5 in Section 18A) may be set as a tile unit. According to a predetermined rule, a face unit may be set as a tile unit. This example is for independent encoding/decoding settings and may be an example corresponding to a case in which referenceability between face units is limited. That is, in some cases (the first example is assumed), it may be the same that the partitioning information is implicitly processed, but there may be a difference in encoding/decoding settings.

The example may be a description of a case in which the partitioning process may be performed in the projection step, the region-wise packing step, the initial encoding/decoding step, and the like, and may be any other image partitioning process performed in the encoder/decoder.

In Section 21A, a rectangular image may be constructed by adding a region B, which does not include data, to a region A, which includes data. In this case, the location, size, shape, number, and the like of the region A and the region B may be information that may be checked through a projection format or the like or information that may be checked when information regarding a projected image is explicitly generated, and related information may be represented with the above-described image partitioning information, image reconstruction information, and the like. For example, information (e.g., part_top, part_left, part_width, part_height, and part_convert_flag) regarding specific regions of the projected image may be represented as shown in Table 4 and Table 5. However, the present invention is not limited thereto and may be applied to other cases (e.g., another projection format, other projection settings, etc.).

The region B and the region A may be constructed as a single image and then encoded or decoded. Alternatively, the partitioning may be performed in consideration of region-wise characteristics, and different encoding/decoding settings may be applied. For example, encoding or decoding may not be performed on the region B by using information regarding whether to perform encoding or decoding (e.g., tile_coded_flag when it is assumed that the partitioning unit is a tile). In this case, a corresponding region may be restored to certain data (here, any pixel value) according to a predetermined rule. Alternatively, in the above-described image partitioning process, the region B may have different encoding/decoding settings from the region A. Alternatively, a corresponding region may be removed by performing the region-wise packing process.

Section 21B shows an example in which an image packed by CMP is partitioned into tiles, slices, or faces. In this case, the packed image is an image on which a face rearrangement process or a region-wise packing process is performed and may be an image acquired by performing the image partitioning and image reconstruction according to the present invention.

In Section 21B, a rectangular shape may be constructed to include a region including data. In this case, the location, size, shape, number, and the like of the region may be information that may be checked through a predetermined setting or information that may be checked when information regarding the packed image is explicitly generated, and related information may be represented with the above-described image partitioning information, image reconstruction information, and the like. For example, information (e.g., part_top, part_left, part_width, part_height, and part_convert_flag) regarding a specific region of the packed image may be represented as shown in Table 4 and Table 5.

The packed image may be partitioned using various partitioning methods. For example, the partitioning may be performed in slice units, and H0 may be provided as a partitioning boundary. Alternatively, the partitioning may be performed in tile units, and W0, W1, and H0 may be provided as partitioning boundaries. Alternatively, the partitioning may be performed in face units, and W0, W1, and H0 may be provided as partitioning boundaries.

The image partitioning process and the image reconstruction process according to the present invention may be performed on a projected image. In this case, the reconstruction process may be used to rearrange faces in the image as well as pixels in the image. This may be a possible example when the image is partitioned into or constructed with a plurality of faces. The following example will be described, focusing on the case in which the image is partitioned into tiles on the basis of a face unit.

SX,Y (S0,0 to S3,2) in Section 21A may correspond to S'U,V (S'0,0 to S'2,1) in Section 21B (here, X and Y may be the same as or different from U and V), and the reconstruction process may be performed in face units. For example, S2,1, S3,1, S0,1, S1,2, S1,1, and S1,0 may be assigned to S'0,0, S'1,0, S'2,0, S'0,1, S'1,1, and S'2,1 (face rearrangement). Also, S2,1, S3,1, and S0,1 may not be reconstructed (pixel rearrangement), and S1,2, S1,1, and S1,0 may be rotated by 90 degrees and then reconstructed. This may be represented as shown in Section 21C. In Section 21C, horizontally laid symbols S1,0, S1,1, and S1,2 may be images that are horizontally laid in order to maintain continuity of an image.

The reconstruction of the faces may be implicitly or explicitly processed depending on encoding/decoding settings. The implicit processing may be performed according to a predetermined rule in consideration of the type (here, a 360-degree image) and characteristics (here, a projection format, etc.) of the image.

For example, for S'0,0 and S'1,0; S'1,0 and S'2,0; S'0,1 and S'1,1; and S'1,1 and S'2,1 in Section 21C, there is image continuity (or correlation) between both faces with respect to the face boundary, and Section 21C may be an example in which there is continuity between three upper faces and three lower faces. While the image is divided into a plurality of faces through a projection process from the 3D space to the 2D space and then packed for each region, the reconstruction may be performed in order to increase image continuity between faces to efficiently reconstruct the faces. Such reconstruction of the faces may be predetermined and processed.

Alternatively, the reconstruction process may be performed through explicit processing, and reconstruction information may be generated.

For example, when information (e.g., one of implicitly acquired information and explicitly generated information) regarding a M×N construction (e.g., 6×1, 3×2, 2×3, 1×6, and the like for CMP compact; in this example, a 3×2 configuration is assumed) is checked through the region-wise packing process, face reconstruction may be performed according to the M×N construction, and then information regarding the face reconstruction may be generated. For example, when faces are rearranged in an image, index information (or information regarding locations in the image) may be assigned to each face. When pixels are rearranged in a face, mode information for reconstruction may be assigned.

The index information may be pre-defined as shown in Sections 18A to 18C of FIG. 18. In Sections 21A to 21C, SX,Y or S'U,V represents each face using location information (e.g., S[i][j]) indicating a width and a height or using one piece of location information (e.g., S[i]; it is assumed that the location information is assigned in a raster scan order, starting from an upper left face of the image), and an index of each face may be assigned thereto.

For example, when an index is assigned using the location information indicating the width and the height, face index #2 may be assigned to S'0,0, face index #3 may be assigned to S'1,0, face index #1 may be assigned to S'2,0, face index #5 may be assigned to S'0,1, face index #0 may be assigned to S'1,1, and face index #4 may be assigned to S'2,1, as shown in Section 21C. Alternatively, when an index is assigned using one piece of location information, face index #2 may be assigned to S[0], face index #3 may be assigned to S[1], face index #1 may be assigned to S[2], face index #5 may be assigned to S[3], face index #0 may be assigned to S[4], and face index #4 may be assigned to S[5]. For convenience of description, in the following example, S'0,0 to S'2,1 may be referred to as a to f. Alternatively, each face may be represented using location information indicating the width and height of a pixel or block unit on the basis of an upper left corner of the image.

For the packed image acquired through the image reconstruction process (or the region-wise packing process), the face scan order is the same as or different from the image scan order depending on reconstruction settings. For example, when one scan order (e.g., raster scan) is applied to an image shown in Section 21A, a, b, and c may have the same scan order, and d, e, and f may have different scan orders. For example, when the scan order for Section 21A or the scan order for a, b, and c follows an order of (0,0)□(1, 0)□(0,1)□(1,1), the scan order for d, e, and f may follow an order of (1,0)□(0,0)□(0,1). This may be determined according to image reconstruction settings, and such setting may be applied even to other projection formats.

In the image partitioning process shown in Section 21B, a tile may be individually set as a face unit. For example, each of the faces a to f may be set as a tile unit. Alternatively, a plurality of face units may be set as a tile. For example, the faces a to c may be set as one tile, and the faces d to f may be set as one tile. The construction may be determined on the basis of face characteristics (e.g., continuity between faces, etc.), and unlike the above example, different tile settings for faces may be possible.

The following is an example of partitioning information according to a plurality of image partitioning processes. In this example, it is assumed that partitioning information for a face is omitted, a unit other than a face is a tile, and the partitioning information is variously processed.

As a first example, the image partitioning information may be acquired on the basis of face information and may be implicitly omitted. For example, a face may be individually set as a tile, or a plurality of faces may be set as a tile. In this case, when at least one face is set as a tile, this may be determined according to a predetermined rule on the basis of face information (e.g., continuity or correlation).

As a second example, the image partitioning information may be explicitly generated irrespective of the face information. For example, when the partitioning information is generated using the number of columns (here, num_tile_columns) and the number of rows (here, num_tile_rows) of the tile, the partitioning information may be generated in a method of the above-described image partitioning process. For example, the number of columns of the tile may range from 0 to the width of the image or the width of the block (here, a unit acquired from the picture partitioning part), and the number of rows of the tile may range from 0 to the height of the image or the height of the block. Also, additional partitioning information (e.g., uniform_spacing_flag) may be generated. In this case, the boundary of the face and the boundary of the partitioning unit may or may not match each other depending on the partitioning settings.

As a third example, the image partitioning information may be explicitly generated on the basis of the face information. For example, when the partitioning information is generated using the numbers of columns and rows of the tile, the partitioning information may be generated on the basis of the face information (here, the number of columns ranges from 0 to 2, and the number of rows ranges from 0 to 1; since the configuration of the faces in the image is 3×2). For example, the number of columns of the tile may range from 0 to 2, and the number of rows of the tile may range from 0 to 1. Also, additional partitioning information (e.g., uniform_spacing_flag) may not be generated. In this case, the boundary of the face and the boundary of the partitioning unit may match each other.

In some cases (the second example and the third example are assumed), an syntax element of the partitioning information may be differently defined, or syntax element settings (e.g., binarization settings; when the range of a candidate group of a syntax element is limited and small, other binarization may be used) may be differently applied even though the same syntax element is used. The above example has been described for some of various elements of the partitioning information. However, the present invention is not limited thereto, and it can be understood that other settings are possible according to whether the partitioning information is generated on the basis of the face information.

Figure 22:
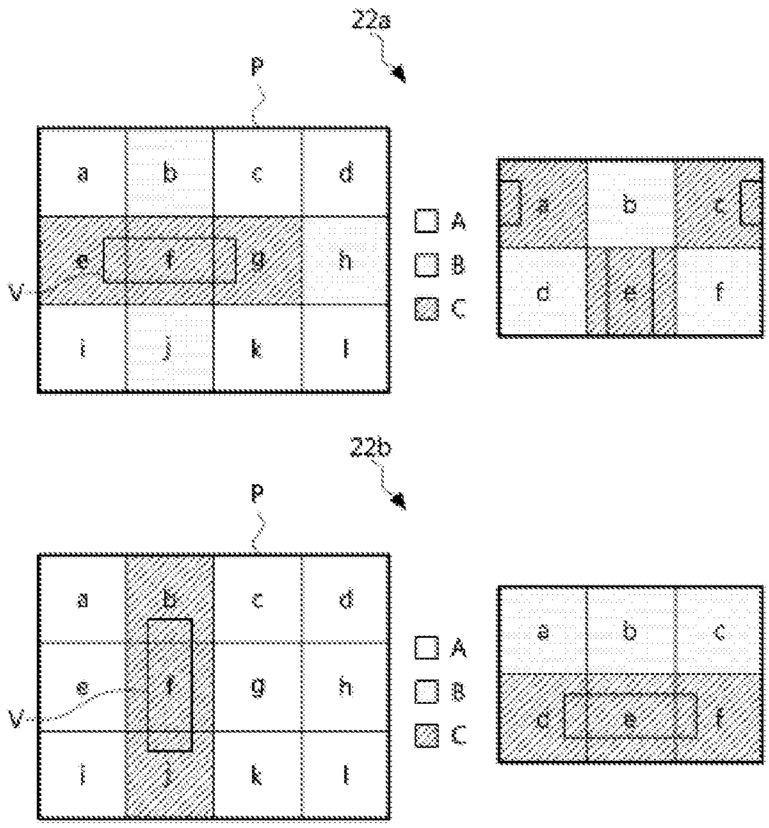
FIG. 22 is an example diagram in which an image packed or projected by CMP is partitioned into tiles.

FIG. 22 is an example diagram in which an image packed or projected by CMP is partitioned into tiles.

In this case, it is assumed to have the same tile partitioning boundaries (W0 to W2, H0, and H1 are all activated) as those shown in Section 21A of FIG. 21 and have the same tile partitioning boundaries (W0, W1, and H0 are all activated) as those shown in Section 21B of FIG. 21. When it is assumed that a region P indicates the entire image and a region V indicates a viewport, full decoding or partial decoding may be performed. This example will be described, focusing on partial decoding. In Section 22A, tiles e, f, and g may be decoded for CMP (a left side) and tiles of a, c, and e may be decoded for CMP compact (a right side) to acquire a region corresponding to the viewport. In Section 22B, tiles b, f, and i may be decoded for CMP and tiles of d, e, and f may be decoded for CMP compact to acquire a region corresponding to the viewport.

The above example has been described for a case in which the partitioning of a slice, a tile, or the like is performed on the basis of a face unit (or a face boundary). However, as shown in Section 20A of FIG. 20, the partitioning may be performed on the inside of a face (e.g., an image is composed of one face in ERP and composed of a plurality of faces in other projection format), or the partitioning may be performed on the boundary of the face as well as the inside.

Figure 23:
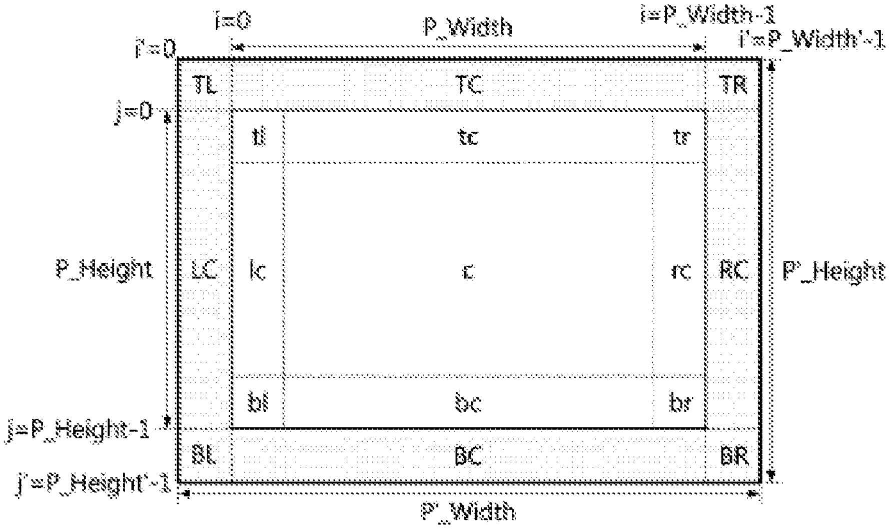
FIG. 23 is a conceptual diagram illustrating an example of resizing a 360-degree image according to an embodiment of the present invention.

FIG. 23 is a conceptual diagram illustrating an example of resizing a 360-degree image according to an embodiment of the present invention. In this case, it is assumed that an image is projected by ERP. Also, the following example will be described, focusing on the case of expansion.

The projected image may be resized through a scale factor or through an offset factor depending on an image resizing type. Here, an image before resizing may be P_Width×P_Height, and an image after resizing may be P'_Width×P'_Height.

For the scale factor, after the width and height of the image are resized through scale factors (here, a in width and b in height), the width (P_Width×a) and the height (P_Height×b) of the image may be acquired. For the offset factor, after the width and height of the image are resized through offset factors (here, L and R in width and T and B in height), the width (P_Width+L+R) and the height (P_Height+T+B) of the image may be acquired. The resizing may be performed using a predetermined method, or the resizing may be performed using one method selected from among a plurality of methods.

The data processing method in the following example will be described, focusing on the case of an offset factor. For the offset factor, as the data processing method, there may be a filling method by using a predetermined pixel value, a filling method by copying outer pixels, a filling method by copying a specific region of an image, a filling method by transforming a specific region of an image, and the like.

A 360-degree image may be resized in consideration of characteristics in which continuity is present at a boundary of the image. For ERP, an outer boundary is not present in the 3D space, but may be present when the 3D space is transformed into the 2D space through the projection process. Data in a boundary region includes data with outward continuity, but may have a boundary in terms of spatial characteristics. The resizing may be performed in consideration of such characteristics. In this case, the continuity may be checked according to the projection format or the like. For example, an ERP image may be an image having characteristics in which both end boundaries are continuous. This example will be described, assuming that left and right boundaries of the image are continuous with each other and upper and lower boundaries of the image are continuous with each other. The data processing method will be described, focusing on a filling method by copying a specific region of the image and a filling method by transforming a specific region of the image.

When the image is resized to the left, a resized region (here, LC or TL+LC+BL) may be filled with data of a right region (here, tr+rc+br) of the image having continuity with the left of the image. When the image is resized to the right, a resized region (here, RC or TR+RC+BR) may be filled with data of a left region (here, tl+lc+b1) of the image having continuity with the right of the image. When the image is resized upward, a resized region (here, TC or TL+TC+TR) may be filled with data of a lower region (here, bl+bc+br) of the image having continuity with the upper side. When the image is resized downward, a resized region (here, BC or BL+BC+BR) may be filed with data.

When the size or length of the resized region is m, the resized region may have a range from (−m,y) to (−1,y) (resizing to the left) or a range from (P_Width, y) to (P_Width+m−1,y) (resizing to the right) with respect to coordinates of the image before resizing (here, x ranges from 0 to P_Width−1). The location x' of the region for acquiring the data of the resized region may be derived from a formula x'=(x+P_Width) % P_Width. In this case, x denotes a coordinate of a resized region with respect to coordinates of an image before resizing, and x' denotes a coordinate of a region referenced to a resized region with respect to coordinates of an image before resizing. For example, when the image is resized to the left, m is 4, and the width of the image is 16, corresponding data of (−4,y) may be acquired from (12,y), corresponding data of (−3,y) may be acquired from (13,y), corresponding data of (−2,y) may be acquired from (14,y), and corresponding data of (−1,y) may be acquired from (15,y). Alternatively, when the image is resized to the right, m is 4, and the width of the image is 16, corresponding data of (16,y) may be acquired from (0,y), corresponding data of (17,y) may be acquired from (1,y), corresponding data of (18,y) may be acquired from (2,y), and corresponding data of (19,y) may be acquired from (3,y).

When the size or length of the resized region is n, the resized region may have a range from (x,−n) to (x,−1) (resizing upward) or a range from (x,P_Height) to (x,P_Height+n−1) (resizing downward) with respect to coordinates of the image before resizing (here, y ranges from 0 to P_Height−1). The location (y') of the region for acquiring data of the resized region may be derived from a formula y'=(y+P_Height) % P_Height. In this case, y denotes a coordinate of a resized region with respect to coordinates of an image before resizing, and y' denotes a coordinate of a region referenced to a resized region with respect to coordinates of an image before resizing. For example, when the image is resized upward, n is 4, and the height of the image is 16, corresponding data of (x,−4) may be acquired from (x,12), corresponding data of (x,−3) may be acquired from (x,13), corresponding data of (x,−2) may be acquired from (x,14), and corresponding data of (x,−1) may be acquired from (x,15). Alternatively, when the image is resized downward, n is 4, and the height of the image is 16, corresponding data of (x,16) may be acquired from (x,0), corresponding data of (x,17) may be acquired from (x,1), corresponding data of (x,18) may be acquired from (x,2), and corresponding data of (x,19) may be acquired from (x,3).

After the resized region is filled with data, the resizing may be performed with respect to the coordinates of the image after resizing (here, x ranges from 0 to P'_Width−1, and y ranges from 0 to P'_Height−1). The example may be applied to a coordinate system of latitude and longitude.

Various resizing combinations may be provided as follows.

As an example, the image may be resized to the left by m. Alternatively, the image may be resized to the right by n. Alternatively, the image may be resized upward by o. Alternatively, the image may be resized downward by p.

As an example, the image may be resized to the left by m and to the right by n. Alternatively, the image may be resized upward by o and downward by p.

As an example, the image may be resized to the left by m, to the right by n, and upward by o. Alternatively, the image may be resized to the left by m, to the right by n, and downward by p. Alternatively, the image may be resized to the left by m, upward by o, and downward by p. Alternatively, the image may be resized to the right by n, upward by o, and downward by p.

As an example, the image may be resized to the left by m, to the right by n, upward by o, and downward by p.

Like the above example, at least one resizing operation may be performed. Image resizing may be implicitly performed according to encoding/decoding settings, or resizing information may be implicitly generated and then image resizing may be performed on the basis of the generated resizing information. That is, m, n, o, and p of the above example may be determined as predetermined values or may be explicitly generated using the resizing information. Alternatively, some may be determined as predetermined values, and the others may be explicitly generated.

The above example has been described, focusing on the case of data being acquired from specific regions of the image, but other methods may also be applied. The data may be a pixel before encoding or a pixel after encoding and may be determined according to characteristics of a resizing step or an image to be resized. For example, the data may refer to an input pixel of a projected image, a packed image, or the like when the resizing is performed in a pre-processing process and a pre-encoding step, and the data may refer to a restored pixel when the resizing is performed in a post-processing process, an intra-prediction reference pixel generation step, a reference picture generation step, a filtering step, and the like. Also, the resizing may be performed by individually using a data processing method in each resized region.

Figure 24:
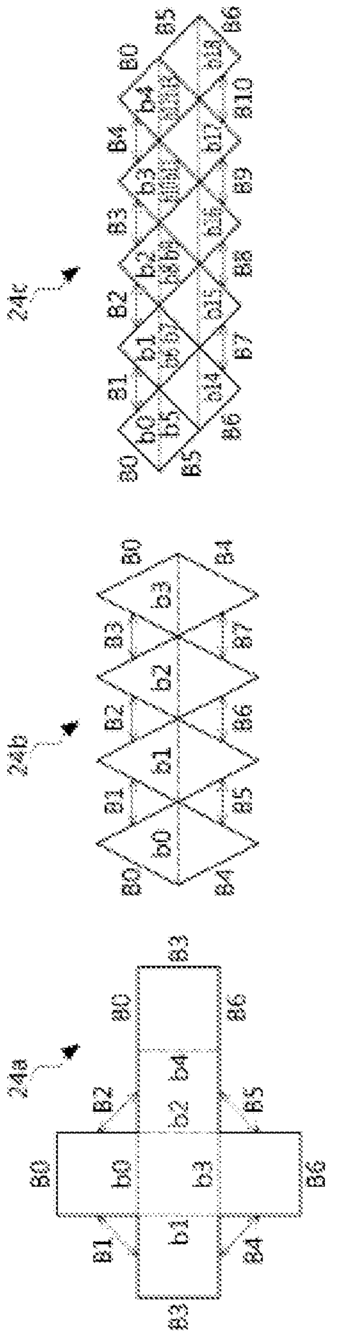
FIG. 24 is a conceptual diagram illustrating continuity between faces in a projection format (e.g., CHP, OHP, or ISP) according to an embodiment of the present invention.

FIG. 24 is a conceptual diagram illustrating continuity between faces in a projection format (e.g., CHP, OHP, or ISP) according to an embodiment of the present invention.

In detail, FIG. 24 may show an example of an image composed of a plurality of faces. The continuity may be a characteristic generated in adjacent regions in a 3D space. Sections 24A to 24C distinctly show a case A of having both of spatial adjacency and continuity when transformation is made to a 2D space through a projection process, a case B of having spatial adjacency but no continuity, a case C of having no spatial adjacency but continuity, and a case D of having neither of spatial adjacency and continuity. Unlike this, general images are classified into a case A of having both of spatial adjacency and continuity and a case D of having neither of spatial adjacency and continuity. In this case, the case of having continuity corresponds to some of the examples (A or C).

That is, referring to Sections 24A to 24C, the case of having both of spatial adjacency and continuity (here, which is described with reference to Section 24A) may be shown as b0 to b4, and the case having no spatial adjacency but continuity may be shown as B0 to B6. That is, the cases indicate regions being adjacent in the 3D space, and it is possible to enhance encoding performance by using characteristics in which b0 to b4 and B0 to B6 have continuity in an encoding process.

Figure 25:
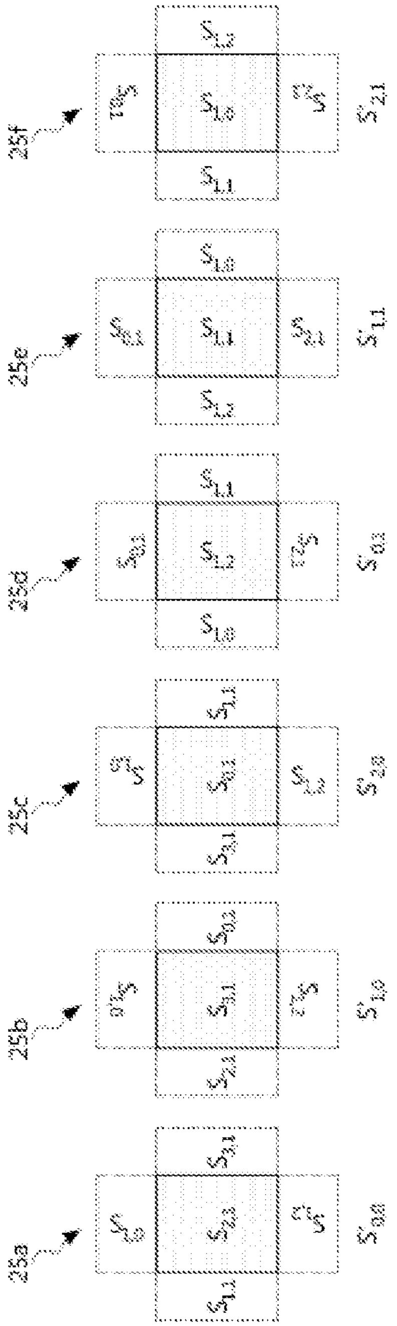
FIG. 25 is a conceptual diagram illustrating continuity of a face of Section 21C which is an image acquired through an image reconstruction process or a region-wise packing process in the CMP projection format.

FIG. 25 is a conceptual diagram illustrating face continuity in Section 21C which is an image acquired through an image reconstruction process or a region-wise packing process in the CMP projection format.

Here, Section 21C of FIG. 21 shows a rearrangement of a 360-degree image spread in the shape of a cube in Section 21A, and thus face continuity applied to Section 21A of FIG. 21 is maintained. That is, as shown in Section 25A, a face S2,1 may be horizontally continuous with faces S1, 1 and S3, 1 and may be vertically continuous with a face S1, P rotated by 90 degrees and a face S1, 2 rotated by −90 degrees.

In the same manner, the continuity of faces S3,1, S0, 1, S1,2, S1, 1, and S1,0 may be checked in Sections 25B to 25F.

Continuity between faces may be defined according to projection format settings or the like. However, the present invention is not limited thereto, and modifications may be made thereto. The following example will be described on the assumption that continuity is present as shown in FIGS. 24 and 25.

Figure 26:
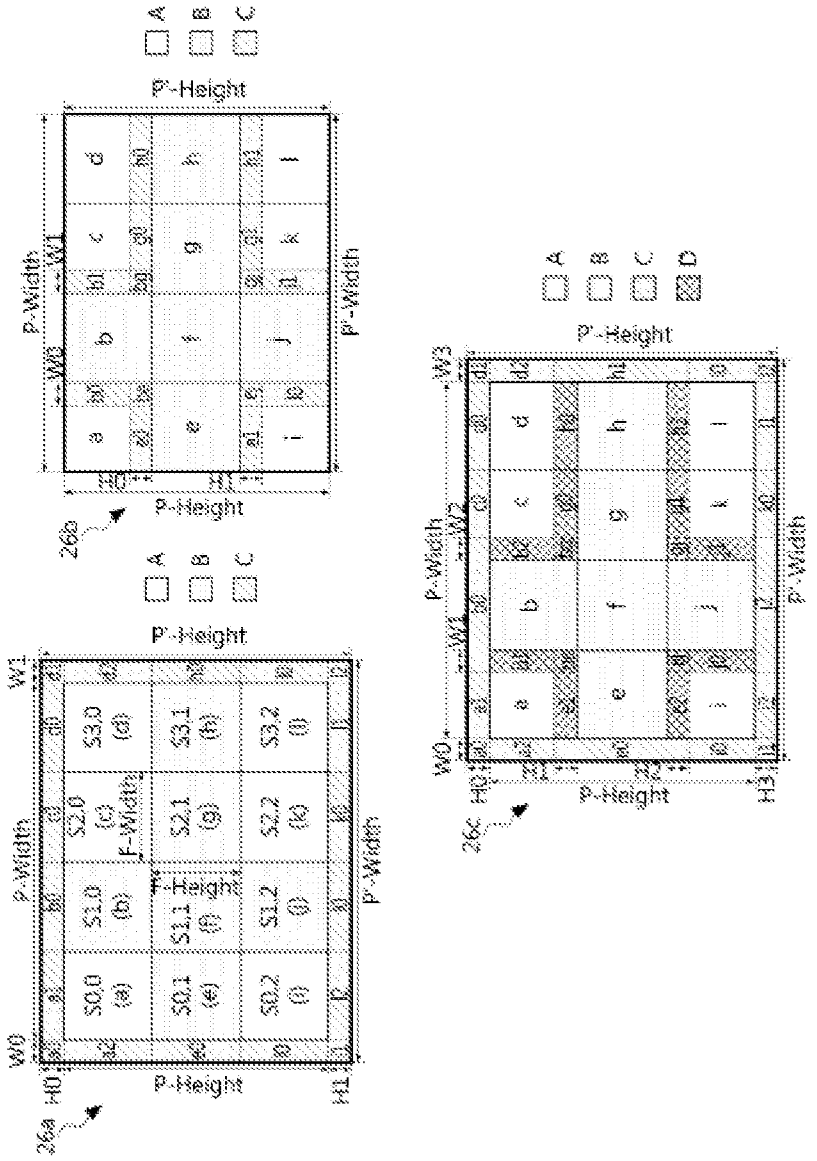
FIG. 26 is an example diagram illustrating image resizing in the CMP projection format according to an embodiment of the present invention.

FIG. 26 is an example diagram illustrating image resizing in the CMP projection format according to an embodiment of the present invention.

Section 26A shows an example of resizing an image, Section 26B shows an example of resizing a face unit (or a partitioning unit), and Section 26C shows an example of resizing an image and a face unit (or an example of performing multiple resizing).

The projected image may be resized through a scale factor or through an offset factor depending on an image resizing type. Here, an image before resizing may be P_Width×P_Height, an image after resizing may be P'_Width×P'_Height, and the size of a face may be F_Width×F_Height. The size may be the same or different depending on the face, and the width and height may be the same or different depending on the face. However, for convenience of description, this example will be described on the assumption that all faces in the image have the same size and the shape of a square. Also, the description assumes that resizing values (here, WX and HY) are the same. In the following example, a data processing method will be described, focusing on the case of an offset factor and also focusing on a filling method by copying a specific region of the image and a filling method by transforming a specific region of the image. The above settings may be applied even to the case shown in FIG. 27.

For Sections 26A to 26C, a boundary of a face may have continuity with a boundary of another face (here, it is assumed to have continuity corresponding to Section 24A of FIG. 24). Here, the continuity may be classified into a case of having spatial adjacency and image continuity in the 2D plane (a first example) and a case of having no spatial adjacency but image continuity in the 2D plane (a second example).

For example, when the continuity in Section 24A of FIG. 24 is assumed, upper, left, right, and lower regions of S1,1 may be spatially adjacent to, and have image continuity with, lower, right, left, and upper regions of S1,0, S0,1, S2,1, and S1,2 (the first example).

Alternatively, the left and right regions of S1,0 are not spatially adjacent to, but may have image continuity with, the upper regions of S0,1 and S2,1 (the second example). Also, the left region of S0,1 may not be spatially adjacent to, but have image continuity with, each other (the second example). Also, the left region and the right region of S1,2 may be continuous with the lower regions of S0,1 and S2,1 (the second example). This may be merely a limited example, and other configurations may be applied depending on the definition and settings of the projection format. For convenience of description, S0,0 to S3,2 in Section 26A are referred to as a to I.

Section 26A may be an example of a filling method using data of a region having continuity toward an outer boundary of an image. A range from a region A, which includes no data, to a resized region (here, a0 to a2, c0, d0 to d2, i0 to i2, k0, and l0 to l2) may be filled with any predetermined value or through outer pixel padding, and a range from a region B, which includes actual data, to a resized region (here, b0, e0, h0, and j0) may be filled with data of a region (or a face) having image continuity. For example, b0 may be filled with data of an upper side of the face h, e0 may be filled with data of a right side of the face h, h0 may be filled with data of a left side of the face e, and j0 may be filled with data of a lower side of the face h.

In detail, as an example, b0 may be filled with data of a lower side of a face acquired by rotating the face h by 180 degrees, and j0 may be filled with data of an upper side of a face acquired by rotating the face h by 180 degrees. However, this example (including the following example) may represent only the location of a reference face, and data acquired from the resized region may be acquired after a resizing process (e.g., rotation, etc.) that considers continuity between faces as shown in FIGS. 24 and 25.

Section 26B may be an example of a filling method using data of a region having continuity toward an inner boundary of an image. In this example, a different resizing operation may be performed for each face. A reduction process may be performed in the region A, and an expansion process may be performed in the region B. For example, the face a may be resized (here, reduced) to the right by w0, and the face b may be resized (here, expanded) to the left by w0. Alternatively, the face a may be resized (here, reduced) downward by h0, and the face e may be resized (here, expanded) upward by h0. In this example, when a change in width of the image is viewed through the faces a, b, c, and d, the face a is reduced by w0, the face b is expanded by w0 and w1, and the face c may be reduced by w1. Thus, the width of the image before resizing is the same as the width of the image after resizing. When a change in height of the image is viewed through the faces a, e, and i, the face a is reduced by h0, the face e is expanded by h0 and h1, and the face i may be reduced by h1. Thus, the height of the image before resizing is the same as the height of the image after resizing.

The resized regions (here, b0, e0, be, b1, bg, g0, h0, e1, ej, j0, g1, g1, j1, and h1) may be simply removed in consideration that the regions are reduced from the region A which does not include data, and may be filled with data of a region having continuity in consideration that the regions are expanded from the region B which includes actual data.

For example, b0 may be filled with data of an upper side of the face e; e0 may be filled with data of a left side of the face b; be may be filled with data of a left side of the face b, an upper side of the face e, or a weighted sum of a left side of the face b and an upper side of the face e; b1 may be filled with data of an upper side of the face g; bg may be filled with data of a left side of the face b, an upper side of the face g, or a weighted sum of a right side of the face b and an upper side of the face g; g0 may be filled with data of a right side of the face b; h0 may be filled with data of an upper side of the face b; e1 may be filled with data of a left side of the face j; ej may be filled with data of a lower side of the face e, a left side of the face j, or a weighed sum of a lower side of the face e and a left side of the face j; j0 may be filled with data of a lower side of the face e; gj may be filled with data of a lower side of the face g, a left side of the face j, or a weighted sum of a lower side of the face g and a right side of the face j; g1 may be filled with data of a right side of the face j; j1 may be filled with data of a lower side of the face g; and h1 may be filled with data of a lower side of the face j.

In the above example, when the resized region is filled with data of specific regions of the image, data of a corresponding region may be copied and then used to fill the resized region or may be transformed on the basis of the characteristics, type, and the like of the image and then used to fill the resized region. For example, when a 360-degree image may be transformed into the 2D space according to a projection format, a coordinate system (e.g., a 2D planar coordinate system) may be defined for each face. For convenience of description, it is assumed that (x, y, z) in the 3D space is transformed into (x,y,C), (x,C,z), or (C,y,z) for each face. The above example indicates a case in which, from a resized region of a face, data of a face other than the corresponding face is acquired. That is, when the resizing is performed on the current face, data of another face with different coordinate system characteristics may be copied as it is and then used. In this case, there is a possibility that the continuity is distorted based on the resizing boundary. To this end, data of another face acquired according to coordinate system characteristics of the current face may be transformed and used to fill a resized region. The transformation is also merely an example of the data processing method, and the present invention is not limited thereto.

When data of specific regions of the image is copied and used to fill a resized region, distorted continuity (or radically changing continuity) may be included in a boundary region between a resized region e and a resized region e0. For example, the continuity may change with respect to a boundary, and a straight line edge may be curved with respect to the boundary.

When data of specific regions of the image is transformed and used to fill a resized region, gradually changing continuity may be included in a boundary region between resized regions.

The above example may be an example of the data processing method of the present invention to transform data of specific regions of the image on the basis of the characteristics, type, and the like of the image and fill a resized region with the transformed data.

Section 26C may be an example of filling a resized region with data of a region having continuity toward boundaries (an inner boundary and an outer boundary) of the image in combination of the image resizing processes corresponding to Sections 26A and 26B. The resizing process of this example may be derived from those of Sections 26A and 26B, and a detailed description thereof will be omitted.

Section 26A may be an example of the process of resizing an image, and Section 26B may be an example of resizing a partitioning unit in an image. Section 26C may be an example of a plurality of resizing processes including the process of resizing an image and the process of resizing a partitioning unit in an image.

For example, an image (here, a first format) acquired through a projection process may be resized (here, a region C), and an image (here, a second format) acquired through a format transformation process may be resized (here, a region D). In this example, an image projected by ERP may be resized (here, a full image) and transformed into an image projected by CMP through a format transformation part, and the image projected by CMP may be resized (here, a face unit). The above example is an example in which a plurality of resizing operations are performed. However, the present invention is not limited thereto, and modifications may be made thereto.

Figure 27:
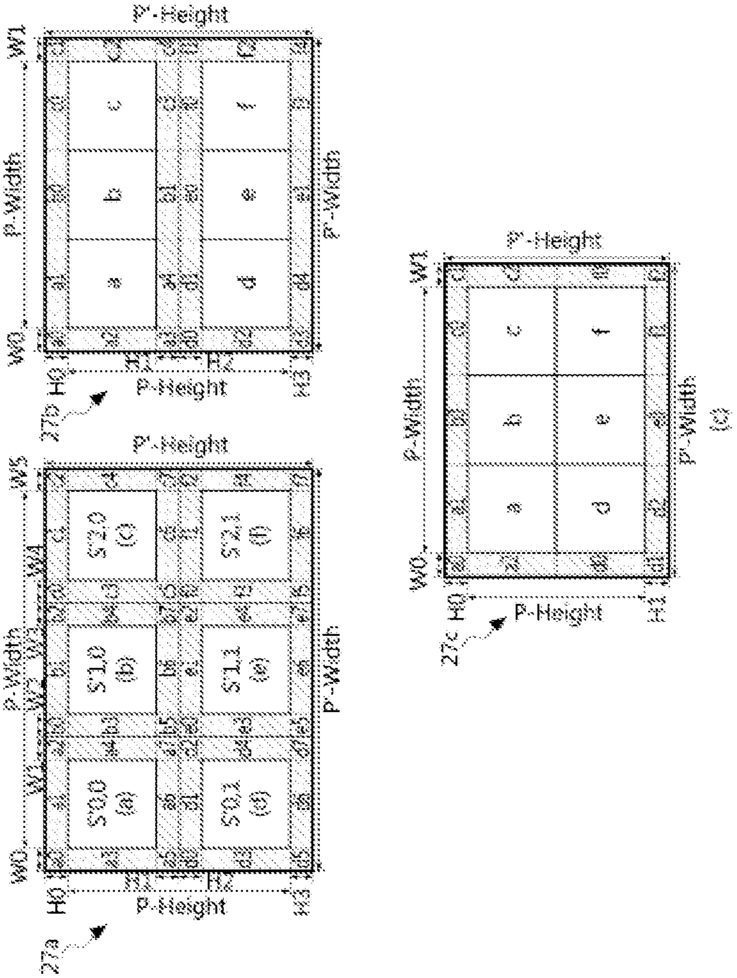
FIG. 27 is an example diagram illustrating resizing of an image transformed and packed in the CMP projection format according to an embodiment of the present invention.

FIG. 27 is an example diagram illustrating resizing of an image transformed and packed in the CMP projection format according to an embodiment of the present invention. FIG. 27 also assumes continuity between faces as shown in FIG. 25, and thus the boundary of a face may have continuity with the boundary of another face.

In this example, offset factors of W0 to W5 and H0 to H3 may have various values (here, it is assumed that the offset factors are used as resizing values). For example, the offset factors may be derived from a predetermined value, a motion search range of inter-prediction, a unit acquired from a picture partitioning part, and the like, and other cases are also possible. In this case, the unit acquired from the pixel partitioning unit may include a face. That is, the resizing values may be determined on the basis of F_Width and F_Height.

Section 27A is an example of individually resizing a single face (here, upward, downward, to the left, and to the right with respect to the face) and filling expanded regions with data of a region having continuity. For example, outer regions a0 to a6 of the face a may be filled with continuous data, and outer regions b0 to b6 of the face b may be filled with continuous data.

Section 27B is an example of resizing a plurality of faces (here, upward, downward, to the left, and to the right with respect to the plurality of faces) and filling expanded regions with data of a region having continuity. For example, the faces a, b, and c may be expanded to the outer regions a0 to a4, b0 and b1, and c0 to c4.

Section 27C may be an example of resizing a full image (here, upward, downward, to the left, and to the right with respect to the full image) and filling expanded regions with data of a region having continuity. For example, a full image composed of the faces a to f may be expanded to the outer regions a0 to a2, b0, c0 to c2, do to d2, and f0 to f2.

That is, the resizing may be performed in a single face unit, in a plurality of face units having continuity with one another, and in a full image unit.

In the above example, the resized regions (here, a0 to f7) may be filled with data of a region (or a face) having continuity, as shown in Section 24A. That is, the resized regions may be filled with data of upper sides, lower sides, left sides, and right sides of the faces a to f.

Figure 28:
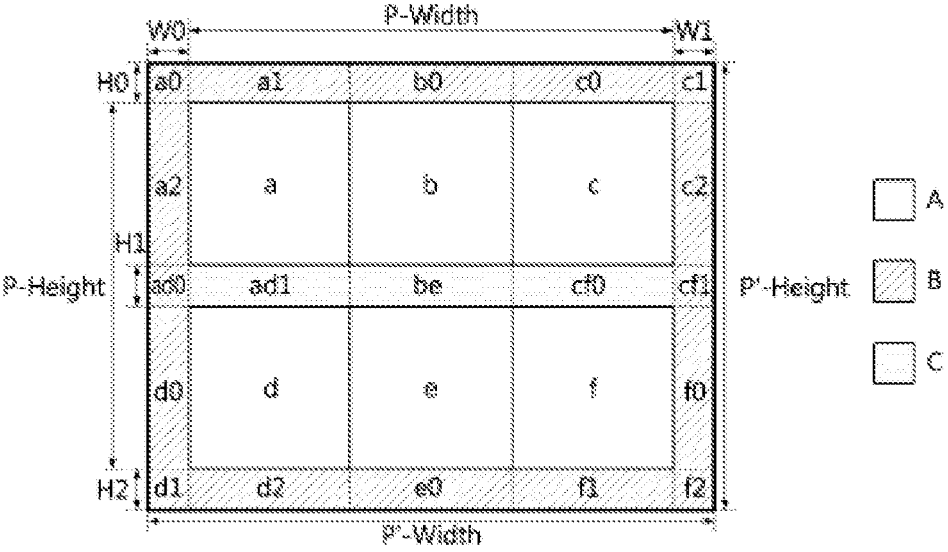
FIG. 28 is an example diagram illustrating a data processing method for resizing a 360-degree image according to an embodiment of the present invention.

FIG. 28 is an example diagram illustrating a data processing method for resizing a 360-degree image according to an embodiment of the present invention.

Referring to FIG. 28, a region B (a0 to a2, ad0, b0, c0 to c2, cf1, do to d2, e0, f0 to f2), which is a resized region, may be filled with data of a region having continuity among pixel data belonging to a to f. Also, a region C (ad1, be, cf0), which is another resized region), may be filled with data of a region to be resized and data of a region having spatial adjacency but no continuity in combination. Alternatively, since the resizing is performed between two regions (e.g., a and d, b and e, and c and f) selected from among a to f, the region C may be filled with pieces of data of the two regions in combination. For example, the face b and face e may be spatially adjacent to each other, but have no continuity with each other. A resized region be located between the face b and the face e may be resized using data of the face b and data of the face e. For example, the region be may be filled with a value acquired by averaging the data of the face b and the data of the face e or with a value acquired through a distance-based weighted sum. In this case, a pixel that is used for data to be used to fill a resized region in the face b and the face e may be a boundary pixel for each face or an internal pixel of each face.

In summary, a resized region between partitioning units of the image may be filled with data generated by using pieces of data of the two units in combination.

The data processing method may be supported in some conditions (here, when a plurality of regions are resized.

In Sections 27A and 27B, a region to be resized between partitioning units is constructed individually for each partitioning unit (in Section 27A, a6 and d1 are constructed for a and d, respectively). In FIG. 28, a single region to be resized between partitioning units may be constructed for adjacent partitioning units (ad1 is constructed for a and d). It will be appreciated that the method may be included in the candidate group for the data processing method in Sections 27A and 27B and the resizing may be performed using a data processing method different from the above example even in FIG. 28.

In the process of resizing an image according to the present invention, a predetermined data processing method may be implicitly used in a resized region, or one of a plurality of data processing methods may be used to explicitly related information. The predetermined data processing method may be one of a filling method by using any pixel value, a filling method by copying outer pixels, a filling method by copying a specific region of an image, a filling method by transforming a specific region of an image, a filling method using data derived from a plurality of regions of an image, etc. For example, when a resized region is located inside an image (e.g., a packed image) and regions at both sides (e.g., a face) have spatial adjacency but no continuity, a data processing method may be applied to fill the resized region with data derived from a plurality of regions. Also, the resizing may be performed by one data processing method selected from among the plurality of data processing method, and related selection information may be explicitly generated. This may be an example applicable to a general image as well as a 360-degree image.

The encoder may add the information generated during the above process to a bitstream in units of at least one of sequences, pictures, slices, tiles, and the like, and the decoder may parse related information from the bitstream. Also, the information may be included in the bitstream in the form of SEI or metadata. The partitioning process, the reconstruction process, and the resizing process for a 360-degree image have been described, focusing on some projection formats such as ERP and CMP. However, the present invention is limited thereto, and the above-description may be applied even to other projection formats as it is or after modified.

It has been described that the image setting process for the above 360-degree image encoding/decoding apparatus may be applied to a pre-processing process, a post-processing process, a format transformation process, an inverse format transformation process, and the like as well as encoding/decoding processes.

In summary, the projection process may be constructed to include image setting processes. In detail, the projection process may be performed in addition to at least one of the image setting processes. The partitioning may be performed in units of regions (or faces) on the basis of the projected image. Depending on the projection format, the partitioning may be performed on a single region or a plurality of regions. For the partitioning, partitioning information may be generated. Also, the projected image may be resized, or a projected region may be resized. In this case, the resizing may be performed on at least one region. For the resizing, resizing information may be generated. Also, the projected image may be reconstructed (or face-arranged), or a projected region may be reconstructed. In this case, the reconstruction may be performed on at least one region. For the reconstruction, reconstruction information may be generated.

In summary, a region-wise packing process may be constructed to include image setting processes. In detail, the region-wise packing projection process may be performed in addition to at least one of the image setting processes. The partitioning process may be performed in units of regions (or faces) on the basis of the packed image. Depending on the region-wise packing settings, the partitioning may be performed on a single region or a plurality of regions. For the partitioning, partitioning information may be generated. Also, the packed image may be resized, or a packed region may be resized. In this case, the resizing may be performed on at least one region. For the resizing, resizing information may be generated. Also, the packed image may be reconstructed, or a packed region may be reconstructed. In this case, the reconstruction may be performed on at least one region. For the reconstruction, reconstruction information may be generated.

During the projection process, all or some of the image setting processes may be performed, and image setting information may be included. This information may be setting information for the projected image. In detail, this information may be setting information for regions in the projected image.

During the region-wise packing process, all or some of the image setting processes may be performed, and image setting information may be included. This information may be setting information for the packed image. In detail, this information may be setting information for regions in the packed image. Alternatively, this information may be mapping information (e.g., see the description with reference to FIG. 11; this can be understood assuming that P0 and P1 indicate projected images and S0 to S5 indicate packed images) between the projected image and the packed image. In detail, this information may be mapping information between a specific region in the projected image and a specific region in the packed image. That is, this information may be setting information assigned from the specific region in the projected image to the specific region in the packed image.

The image information may be represented as information acquired through the above-described various embodiments during the image setting process of the present invention. For example, when related information is represented using at least one syntax element in Table 1 to Table 6, the setting information for the projected image may include pic_width_in_samples, pic_height_in_samples, part_top[i], part_left[i], part_width[i], part_height[i], and the like, and the setting information for the packed image may include pic_width_in_samples, pic_height_in_samples, part_top[i], part_left[i], part_width[i], part_height[i], convert_type_flag [i], part_resizing_flag[i], top_height_offset[i], bottom_height_offset[i], left_width_offset[i], right_width_offset[i], resizing_type_flag[i], and the like. The above example may be an example of explicitly generating information regarding faces (e.g., part_top[i], part_left[i], part_width[i], and part_height[i] among the setting information of the projected image).

Some of the image setting process may be included in a projection process or a region-wise packing process corresponding to the projection format through a predetermined operation.

For example, ERP uses a method of filling regions expanded to the left by m and to the right by n with data of regions in directions opposite to the resizing directions for the image, and thus the resizing process may be implicitly included. Alternatively, CMP uses a method of filling regions expanded upward by m, downward by n, to the left by o, and to the right by p with data of a region having continuity with a resized region, and thus the resizing process may be implicitly included.

In the above example, the projection format may be an example of substitute formats capable of replacing the conventional projection formats or an example of additional formats (e.g., ERP1 and CMP1) for the conventional projection formats. However, the present invention is not limited thereto, examples of various image setting processes of the present invention may be alternatively combined, and similar applications may be possible for other formats.

Although not shown in the image encoding apparatus and the image decoding apparatus of FIGS. 1 and 2, a block partitioning part may be further included. Information regarding a default encoding part may be acquired from the picture partitioning part, and default encoding part may refer to a default (or start) unit for prediction, transformation, quantization, etc. during the image encoding/decoding process. In this case, the encoding part may be composed of one luminance encoding block and two chrominance encoding blocks according to a color format (here, YCbCr), and the size of the blocks may be determined according to the color format. The following example will be described with respect to the blocks (here, a luminance component). In this case, it is assumed that a block is a unit that may be acquired after each unit is determined, and it is also assumed that similar settings are applicable to other types of blocks.

The block partitioning part may be set in association with each element of the image encoding apparatus and the image decoding apparatus. Through this process, the size and shape of the blocks may be determined. In this case, a different block may be defined for each element. The block may be a prediction block for the prediction part, a transformation block for the transformation part, a quantization block for the quantization part, or the like. However, the present invention is not limited thereto, and an additional block unit may be defined for another element. The size and shape of the block may be defined by the width and height of the block.

A block may be expressed as M×N by the block partitioning part and may be acquired in the range from a minimum value to a maximum value. For example, when a block supports a square shape and has a maximum value of 256×256 and a minimum value of 8×8, a block having a size of $2^m \times 2^m$ (here, m is an integer from 3 to 8; for example, 8×8, 16×16, 32×32, 64×64, 128×128, and 256×256), a block having a size of 2m×2m (here, m is an integer from 4 to 128), or a block having a size of m×m (here, m is an integer from 8 to 128) may be acquired. Alternatively, when a block supports square and rectangle forms and has the same range as described above, a block having a size of $2^m \times 2^n$ (here, m and n are integers from 3 to 8; when it is assumed that the maximum aspect ratio is 2:1, 8×8, 8×16, 16×8, 16×16, 16×32, 32×16, 32×32, 32×64, 64×32, 64×64, 64×128, 128×64, 128×128, 128×256, 256×128, 256×256; there may be no limitation on the aspect ratio, or the maximum aspect ratio may be present depending on encoding/decoding settings) may be acquired. Alternatively, a block having a size of 2m×2n (here, m and n are integers from 4 to 128) may be acquired. Alternatively, a block having a size of m×n (here, m and n are integers from 8 to 256) may be acquired.

Acquirable blocks may be determined according to encoding/decoding settings (e.g., a block type, a partitioning scheme, a partitioning setting, etc.). For example, a block with a size of $2^m \times 2^n$ may be acquired as the encoding block, a block with a size of 2m×2n or m×n may be acquired as the prediction block, and a block with a size of $2^m \times 2^n$ may be acquired as the transformation block. Information regarding the size and range of the blocks (e.g., information related to an exponent and a multiple) may be generated on the basis of the settings.

The range (here, which is determined using the maximum value and the minimum value) may be determined depending on the block type. Also, some blocks may have block range information explicitly generated, and other blocks may have block range information implicitly determined. For example, the encoding block and the transformation block may have related information explicitly generated, and the prediction block may have related information implicitly processed.

In the explicit case, at least one piece of range information may be generated. For example, the range information of the encoding block may be generated as information regarding the maximum value and the minimum value. Alternatively, the range information may be generated on the basis of a difference (e.g., which is generated based on the settings; index difference information between the minimum value and the maximum value, etc.) between the predetermined minimum value (e.g., eight) and the maximum value. Also, a plurality of pieces of range information for the width and height of a rectangular block may be generated.

In the implicit case, the range information may be acquired on the basis of encoding/decoding settings (e.g., a block type, a partitioning scheme, a partitioning setting, etc.). For example, for the prediction block, the encoding block (here, having a maximum size of M×N and a minimum size of m×n), which is an upper unit, may acquire information regarding the maximum value and the minimum value according to a candidate group (here, M×N and m/2×n/2) acquirable from partitioning settings (here, quad-tree partitioning+partitioning depth of 0) of the prediction block.

The size and shape of an initial (or start) block of the block partitioning part may be determined from its upper unit. The initial block of the encoding block may be the default encoding block acquired from the picture partitioning part, the initial block of the prediction block may be the encoding block, and the initial block of the transformation block may be the encoding block or the prediction block, which may be determined according to encoding/decoding settings. For example, the prediction block is an upper unit of the transformation block when the encoding mode is an intra mode, and the prediction block is a unit that is independent of the transformation block when the encoding node is an inter mode. The initial block, which is a start block for partitioning, may be partitioned into small blocks. When an optimal size and shape corresponding to the block partitioning are determined, the block may be determined as an initial block of a lower unit. For example, the former case may correspond to the encoding block, and the latter case (lower unit) may correspond to the prediction block or the transformation block. As described above, when the initial block of the lower unit is determined, a partitioning process for finding a block of the optimal size and shape may be performed.

In summary, the block partitioning part may partition the default encoding unit (or the maximum encoding unit) into at least one encoding unit (or lower encoding unit). Also, the encoding unit may be partitioned into at least one prediction unit and also may be partitioned into at least one transformation unit. The encoding unit may be partitioned into at least one encoding block, and the encoding block may be partitioned into at least one prediction block and also may be partitioned into at least one transformation block. Also, the prediction unit may be partitioned into at least one prediction block, and the transformation unit may be partitioned into at least one transformation block.

When the block of the optimal size and form is found through the mode determination process as described above, mode information related to the block (e.g., partitioning information, etc.) may be generated. The mode information may be added to a bitstream in addition to information generated in a construction unit to which the block belongs (e.g., prediction-related information and transformation-related information) and then transmitted to a decoder. The mode information may be parsed by the decoder at units of the same level and then used during an image decoding process.

The following example will describe a partitioning scheme and assume that the initial block has the shape of a square. However, the same or similar applications may be possible for rectangular shapes.

The block partitioning part may support various partitioning schemes. For example, the block partitioning part may support tree-based partitioning or type-based partitioning, and other methods may be applied thereto. The tree-based partitioning may generate partitioning information with partitioning flags, and the type-based partitioning may be generate partitioning information with index information for block forms included in a predetermined candidate group.

Figure 29:
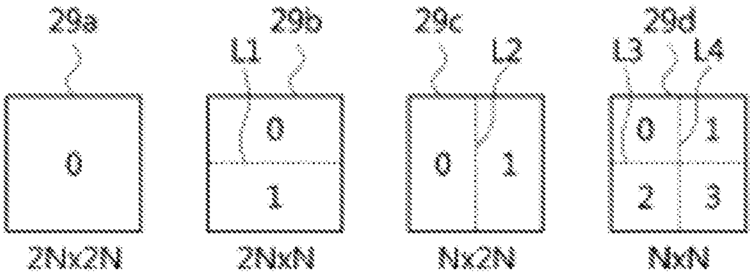
FIG. 29 is an example diagram showing a tree-based block form.

FIG. 29 is an example diagram showing a tree-based block form.

Section 29A shows a single 2N×2N block that is not partitioned, Section 29B shows an example in which two 2N×N blocks are acquired through some partitioning flags (here, binary tree-based horizontal partitioning), Section 29C shows an example in which two N×2N blocks are acquired through some partitioning flags (here, binary tree-based vertical partitioning), and Section 29D shows an example in which four N×N blocks are acquired through some partitioning flags (here, quad-tree partitioning or horizontal and vertical binary-tree partitioning). The acquired block form may be determined according to the type of the tree used for the partitioning. For example, when the quad-tree partitioning is performed, acquirable candidate blocks may correspond to Sections 29A and 29D. When the binary-tree partitioning is performed, acquirable candidate blocks may correspond to Sections 29A, 29B, 29C, and 29D. The quad tree supports a single partitioning flag. The flag being "0" may acquire Section 29A, and the flag being "1" may acquire Section 29D. The binary tree supports a plurality of partitioning flags. Among the partitioning flags, one partitioning flag may be a flag indicating whether partitioning is performed, another partitioning flag may be a flag indicating whether partitioning is horizontal or vertical, and still another partitioning flag may be a flag indicating whether to allow overlapping of horizontal/vertical partitioning. When the overlapping is allowed, acquirable candidate blocks may correspond to Sections 29A, 29B, 29C, and 29D. When the overlapping is not allowed, acquirable candidate blocks may correspond to Sections 29A, 29B, and 29C. The quad tree may be a default tree-based partitioning scheme, and an additional tree partitioning scheme (here, a binary tree) may be included in the tree-based partitioning scheme. When a flag allowing additional tree partitioning is implicitly or explicitly activated, a plurality of tree partitioning operations may be performed. The tree-based partitioning may allow recursive partition. That is, the partitioned block may be set as an initial block again, and the tree-based partitioning may be performed, which may be determined according to partitioning settings such as a partitioning range, a partitioning allowable depth, etc. This may be an example hierarchical partitioning scheme.

Figure 30:
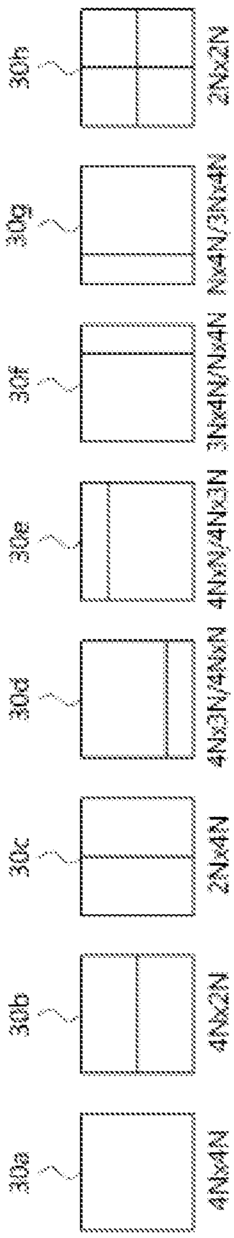
FIG. 30 is an example diagram showing a type-based block form.

FIG. 30 is an example diagram showing a type-based block form.

Referring to FIG. 30, a block after type-based partitioning may have a 1-partitioned form (here, Section 30A), a 2-partitioned form (here, Sections 30B, 30C, 30D, 30E, 30F, and 30G), and a 4-partitioned form (here, Section 30H). Candidates may be constructed through various constructions. For example, the candidates may be constructed as a, b, c, and n; a, b to g, and n; or a, n, and q of FIG. 31.

However, the present invention is not limited thereto, and various modifications may be possible, including the following example. Blocks supported when a flag allowing symmetric partition is activated may correspond to Sections 30A, 30B, 30C, and 30H, and blocks supported when a flag allowing asymmetric partition is activated may corresponding to all of Sections 30A to 30H. For the former case, related information (here, the flag allowing the symmetric partition) may be implicitly activated. For the latter case, related information (here, the flag allowing the asymmetric partition) may be explicitly generated. The tree-based partitioning may support one-time partitioning. Compared to the tree-based partitioning, a block acquired through the type-based partitioning may no longer be further partitioned. This may be an example in which the partitioning allowable depth is 0.

Figure 31:
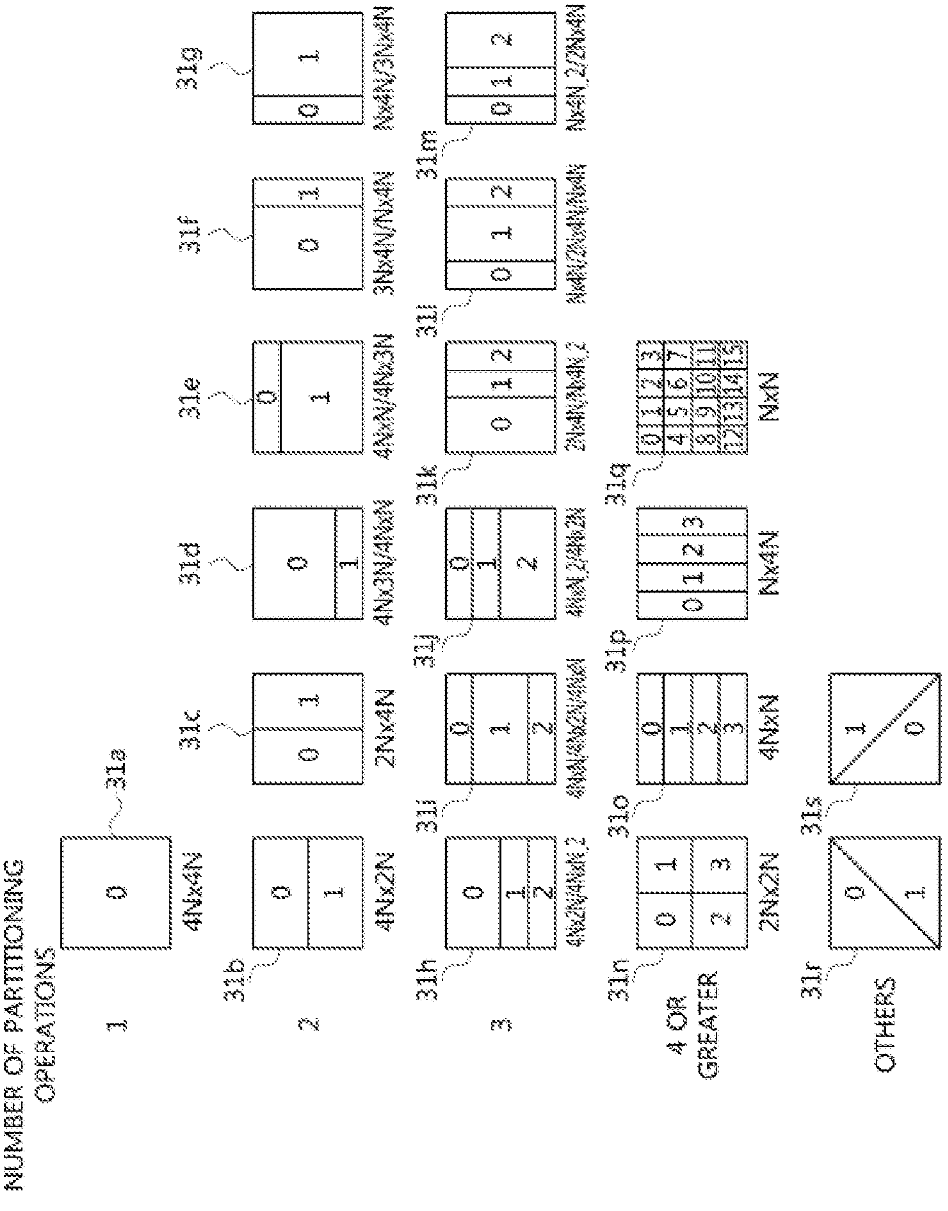
FIG. 31 is an example diagram showing various types of blocks that may be acquired by a block partitioning part of the present invention.

FIG. 31 is an example diagram showing various types of blocks that may be acquired by a block partitioning part of the present invention.

Referring to FIG. 31, blocks in Sections 31A to 31S may be acquired according to partitioning settings and partitioning schemes, additional block forms that are not shown may also be possible.

As an example, asymmetric partition may be allowed for the tree-based partitioning. For example, the binary tree may allow blocks shown in Sections 31B and 31C (here, partitioning into a plurality of blocks) or may allow blocks shown in Sections 30B to 31G (here, partitioning into a plurality of blocks). When the flag allowing asymmetric partition is explicitly or implicitly deactivated according to encoding/decoding settings, acquirable candidate blocks may be blocks in Section 31B or 31C (here, assuming that overlapping of horizontal partitioning and vertical partitioning is not allowed). When the flag allowing asymmetric partition is activated, acquirable candidate blocks may be blocks in Sections 31B, 31D, and 31E (here, horizontal partitioning) or blocks in Sections 31C, 31F, and 31G (here, vertical partitioning). This example may correspond to a case in which a partitioning direction is determined by a horizontal or vertical partitioning flag and a block form is determined according to a flag allowing asymmetry. However, the present invention is not limited thereto, and modifications may be made thereto.

As an example, additional tree partitioning may be allowed for the tree-based partitioning. For example, triple tree-based partitioning, quad-tree partitioning, octa tree-based partitioning, and the like may be allowed, and thus n partitioning blocks (here, 3, 4, and 8; n is an integer) may be acquired. Blocks supported for the triple tree-based partitioning may be blocks in Sections 31H to 31M, blocks supported for the quad-tree partitioning may be blocks in Sections 31N to 31Q, and blocks supported for the octa tree-based partitioning may be blocks in Section 31Q. Whether to support tree-based partitioning may be implicitly determined according to encoding/decoding settings, and related information may be explicitly generated. Also, the binary-tree partitioning and the quad-tree partitioning may be used solely or in combination depending on encoding/decoding settings. For example, blocks as shown in Sections 31B and 31C may be possible for the binary tree, and blocks as shown in Sections 31B, 31C, 31I, and 31L may be possible when the binary tree and the triple tree are used in combination. When other than the existing flags, a flag allowing additional partitioning is explicitly or implicitly deactivated according to encoding/decoding settings, acquirable candidate blocks may be blocks in Section 31B or 31C. When the flag for allowing additional partitioning is activated, acquirable candidate blocks may be blocks in Sections 31B and 31I or in Sections 31B, 31H, 31I, and 31J (here, horizontal partitioning) or blocks in Section 31C or 31L or in the 31C, 31K, 31L, and 31M (here, vertical partitioning). This example may correspond to a case in which a partitioning direction is determined by the horizontal or vertical partitioning flag and a block form is determined according to the flag allowing additional partitioning. However, the present invention is not limited thereto, and modifications may be made thereto.

As an example, non-rectangular partition may be allowed for the type-based block. For example, the partitioning as shown in Sections 31R and 31S may be possible. When the block is combined with the type-based block candidates, the blocks of Sections 31A, 31B, 31C, 31H, 31R, and 31S or Sections 31A to 31H, 31R, and 31S may be supported. Also, a block that supports n-partitioning (e.g., n is an integer; here, 3 other than 1, 2, and 4) as shown in Sections 31H to 31M may be included in the candidate group.

The partitioning scheme may be determined according to encoding/decoding settings.

As an example, the partitioning scheme may be determined according to a block type. For example, an encoding block and a transformation block may use the tree-based partitioning, and a prediction block may use the type-based partitioning. Alternatively, the partitioning scheme may be used in combination thereof. For example, the prediction block may use a partitioning scheme obtained by using the tree-based partitioning and the type-based partitioning in combination, and a partitioning scheme being applied may differ depending on at least one range of the block.

As an example, the partitioning scheme may be determined according to a block size. For example, the tree-based partitioning may be applied to a specific range (e.g., from a×b to c×d; when the latter is greater) between the minimum value and the maximum value of the block, and the type-based partitioning may be applied to another specific range (e.g., from e×f to g×h). In this case, range information according to the partitioning scheme may be explicitly generated or implicitly determined.

As an example, the partitioning scheme may be determined according to the shape of a block (or a block before partitioning). For example, when the block has a square shape, the tree-based partitioning and the type-based partitioning may be possible. Alternatively, when the block has a rectangular shape, the tree-based partitioning may be possible.

The partitioning settings may be determined according to encoding/decoding settings.

As an example, the partitioning settings may be determined according to a block type. For example, for the tree-based partitioning, an encoding block and a prediction block may use the quad-tree partitioning, and block a transformation block may use the binary-tree partitioning. Alternatively, the partitioning allowable depth of the encoding block may be set to m, the partitioning allowable depth of the prediction block may be set to n, and the partitioning allowable depth of the transformation block may be set to o. Here, m, n, and o may or may not be the same.

As an example, the partitioning settings may be determined according to a block size. For example, the quad-tree partitioning may be applied to a specific range of a block (e.g., from a×b to c×d), and the binary-tree partitioning may be applied to another specific range (e.g., from e×f to g×h; here, it is assumed that c×d is greater than g×h). In this case, the range may include all ranges between the maximum value and the minimum value of the block, and the ranges may be set to overlap one another or not to overlap one another. For example, the minimum value of a specific range may be equal to the maximum value of another specific range, or the minimum value of a specific range may be smaller than the maximum value of another specific range. When there is an overlapping range, a partitioning scheme with a greater maximum vale may have a higher priority. That is, whether to perform a partitioning scheme with a lower priority may be determined according to a result of partitioning in the partitioning scheme with the higher priority. In this case, range information according to the tree type may be explicitly generated or implicitly determined.

As another example, type-based partitioning with a specific candidate group may be applied to the specific range of the block (which is the same as the above example), and type-based partitioning with a specific candidate group (which has at least one different configuration from the former candidate group) may be applied to the specific range (which is the same as the above example). In this case, the range may include all ranges between the maximum value and the minimum value of the block, and the ranges may be set not to overlap one another.

As an example, the partitioning settings may be determined according to a block shape. For example, the block has a square shape, the quad-tree partitioning may be possible. Alternatively, when the block has a rectangular shape, the binary-tree partitioning may be possible.

As an example, the partitioning settings may be determined according to encoding/decoding information (e.g., a slice type, a color component, an encoding mode, etc.). For example, the quad-tree partitioning (or the binary-tree partitioning) may be possible for a specific range (e.g., from a×b to c×d) when the slice type is "I," may be possible for a specific range (e.g., from e×f to g×h) when the slice type is "P," and may be possible for a specific range (e.g., from i×j to k×l) when the slice type is "B." Also, the partitioning allowable depth of the quad-tree (or the binary-tree) partitioning may be set to m when the slice type is "I," may be set to n when the slice type is "P," and may be set to o when the slice type is "B." Here, m, n, and o may or may not be the same as one another. Some slice types may have the same settings as the other slices (e.g., slice "P' and slice "B").

As another example, the partitioning allowable depth of the quad tree (or the binary tree) may be set to m when the color component is a luminance component and may be set to n when the color component is a chrominance component. Here, m and n may or may not be the same. Also, the range (e.g., from a×b to c×d) of the quad-tree (or binary-tree) partitioning when the color component is a luminance component and the range (e.g., from e×f to g×h) of the quad-tree (or binary-tree) partitioning when the color component is a chrominance component may or may not be the same.

As another example, the partitioning allowable depth of the quad tree (or binary tree) may be m when the encoding mode is an intra mode, and may be n when the encoding mode is an inter mode (here, it is assumed that n is greater than m). Here, m and n may or may not be the same. Also, the range of the quad-tree (or binary-tree) partitioning when the encoding mode is the intra mode and the range of the quad-tree (or binary-tree) partitioning when the encoding mode is the inter mode may or may not be the same.

For the above example, information regarding whether to adaptively support partitioning candidate group elements may be explicitly generated or implicitly determined according to encoding/decoding information.

A case in which the partitioning scheme and the partitioning settings are determined according to encoding/decoding settings has been described through the above example. The above example may show some cases for each element, and modifications may be made to other cases. Also, the partitioning scheme and the partitioning settings may be determined according to a combination of a plurality of elements. For example, the partitioning scheme and the partitioning settings may be determined by a block type, a block size, a block form, encoding/decoding information, etc.

Also, in the above example, elements involved in the partitioning scheme, settings, etc. may be implicitly determined and information may be explicitly generated to determine whether to allow an adaptive case such as the above example.

Among the partitioning settings, a partitioning depth refers to the number of times an initial block is spatially partitioned (here, the partitioning depth of the initial block is 0). As the partitioning depth increases, the size of blocks into which the initial block is partitioned may decrease. Thus, depth-related settings may differ depending on the partitioning scheme. For example, one common depth may be used for the partitioning depth of the quad tree and the partitioning depth of the binary tree among the tree-based partitioning schemes, a depth may be used individually depending on a tree type.

When in the above example, a partitioning depth is used individually according to a tree type, the partitioning depth at a partitioning start position of the tree (here, a block before the partitioning) may be set to 0. The partitioning depth may be calculated not on the basis of the partitioning range (here, the maximum value) of each range but focusing on the partitioning start position.

Figure 32:
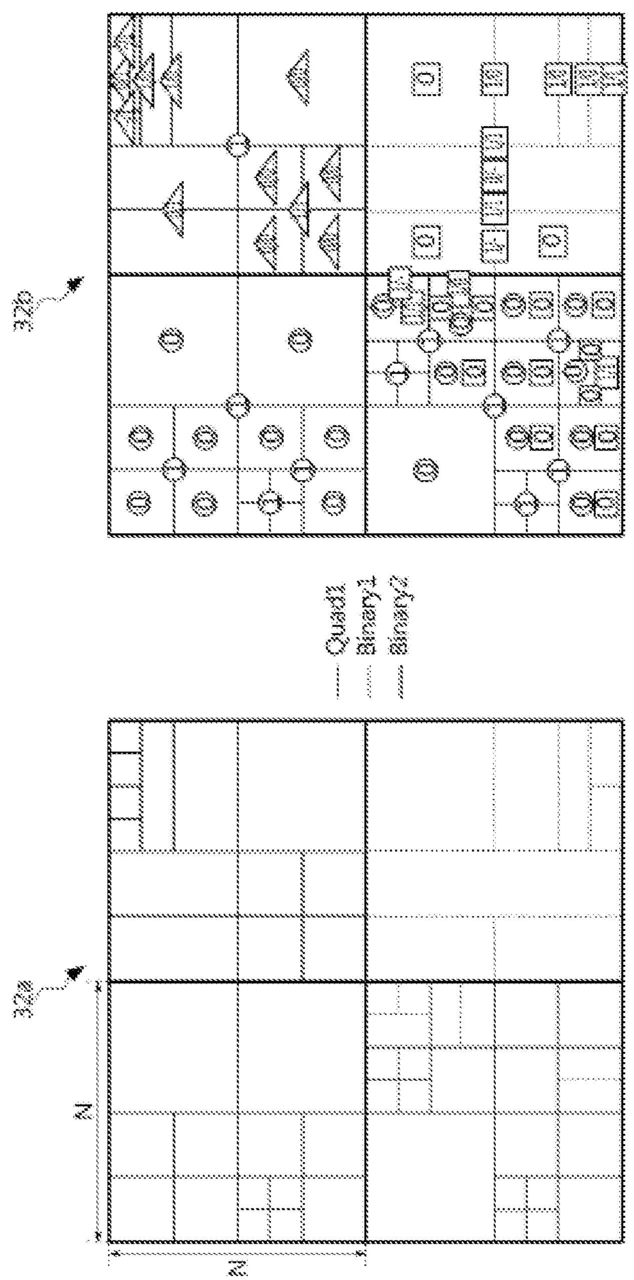
FIG. 32 is an example diagram illustrating tree-based partitioning according to an embodiment of the present invention.

FIG. 32 is an example diagram illustrating tree-based partitioning according to an embodiment of the present invention.

Section 32A shows examples of quad-tree partitioning and binary-tree partitioning. In detail, in Section 32A, an upper left block shows an example of quad-tree partitioning, upper right and lower left blocks show example of quad-tree partitioning and binary-tree partitioning, and a lower right block shows an example of binary-tree partitioning. In the drawings, a solid line (here, Quad1) represents a boundary line for quad-tree partitioning, a dotted line (here, Binary1) represents a boundary line for binary-tree partitioning, and a thick solid line represents a boundary line for binary-tree partitioning. A difference between the dotted line and the solid line may indicate a partitioning scheme difference.

As an example, (assuming the following conditions: the upper left block has a quad-tree partitioning allowable depth of 3; when a current block is N×N, partitioning is performed until one of the width and the height reaches N>>3, partitioning information is generated until one of the width and the height reaches N>>2; this is applied in common to the following example; and the maximum value and the minimum value of the quad tree is N×N, (N>>3)×(N>>3)), the upper left block may be partitioned into four blocks with a half width and a half height when the quad-tree partitioning is performed. The partitioning flag may have a value of 1 when the partitioning is activated and may have a value of 0 when the partitioning is deactivated. According to the above setting, the partitioning flag of the upper left block may be generated like an upper left block in Section 32B.

As an example, (assuming the following conditions: the upper right block has a quad-tree partitioning allowable depth of 0 and a binary-tree partitioning allowable depth of 4; the maximum value and the minimum value of the quad-tree partitioning are N×N, (N>>2)×(N>>2); and the maximum value and the minimum value of the binary-tree partitioning are (N>>1)×(N>>1), (N>>3)×(N>>3)), the upper right block may be partitioned into four blocks with a half width and a half height when the quad-tree partitioning is performed on the initial block. The size of the partitioned block is (N>>1)×(N>>1), and the binary-tree partitioning (here, binary-tree partitioning may be greater than the minimum value of the quad-tree partitioning, but the partitioning allowable depth is limited) may be possible according to the settings of this example. That is, this example may be an example in which it is not possible to use the quad-tree partitioning and the binary-tree partitioning in combination. In this example, the partitioning information of the binary tree may be composed of a plurality of partitioning flags. Some flags may be horizontal partitioning flags (here, corresponding to x of x/y), and other flags may be vertical partitioning flags (here, corresponding to y of x/y). The configuration of the partitioning flag may have similar settings to those of the quad tree partitioning. In this example, both of the two flag may be activated. In the drawings, when flag information is generated with "-," "-" may correspond to implicit flag processing which may be generated when additional partitioning is not possible according to conditions such as a maximum value, a minimum value, and a partitioning allowable depth according to tree-based partitioning. According to the above setting, the partitioning flag of the upper right block may be generated like an upper right block in Section 32B.

As an example, (assuming the following conditions: the lower left block has a quad-tree partitioning allowable depth of 3 and a binary-tree partitioning allowable depth of 2; the maximum value and the minimum value of the quad-tree partitioning are N×N, (N>>3)×(N>>3); and the maximum value and the minimum value of the binary-tree partitioning are (N>>2)×(N>>2), (N>>4)×(N>>4)), the lower left block may be partitioned into four blocks with a half width and a half height when the quad-tree partitioning is performed on the initial block. The size of the partitioned block is (N>>1)×(N>>1), and the quad-tree partitioning and the binary-tree partitioning may be possible according to the settings of this example. That is, this example may be an example in which it is possible to use the quad-tree partitioning and the binary-tree partitioning in combination. In this case, whether to perform the binary-tree partitioning may be determined according to a result of the quad-tree partitioning to which a higher priority is assigned. The binary-tree partitioning may not be performed when the quad-tree partitioning is performed, and the binary-tree partitioning may be performed when the quad-tree partitioning is not performed. When the quad-tree partitioning is not performed, the quad-tree partitioning may no longer be possible even though partitioning is possible according to the settings. In this example, the partitioning information of the binary tree may be composed of a plurality of partitioning flags. Some flags may be partitioning flags (here, corresponding to x of x/y), and other flags may be partitioning direction flags (here, corresponding to y of x/y; whether to generate y information may be determined according to x), and the partitioning flags may have similar settings to those of the quad-tree partitioning. In this case, all of the horizontal partitioning and the vertical partitioning cannot be activated. In the drawing, when the flag information is generated with "-," "-" may have the similar settings to the above example. According to the above setting, the partitioning flag of the lower left block may be generated like a lower left block in Section 32B.

As an example, (assuming the following conditions: the lower right block has a binary-tree partitioning allowable depth of 5; and the maximum value and the minimum value of the binary-tree partitioning are N×N, (N>>2)×(N>>3)), the lower right block may be partitioned into two blocks with a half width or a half height when the binary-tree partitioning is performed on the initial block. In this example, the lower right block may have the same partitioning flag settings as the lower left block. In the drawing, when the flag information is generated with "-," "-" may have the similar settings to the above example. In this example, the minimum values of the width and the height of the binary tree may be set to different values. According to the above setting, the partitioning flag of the lower right block may be generated like a lower right block in Section 32B.

Like the above example, block information (e.g., a block type, a block size, a block form, a block location, a block type, a color component, etc.) may be checked, and then the partitioning scheme and the partitioning settings may be determined according to the block information. Thus, a corresponding partitioning process may be performed.

Figure 33:
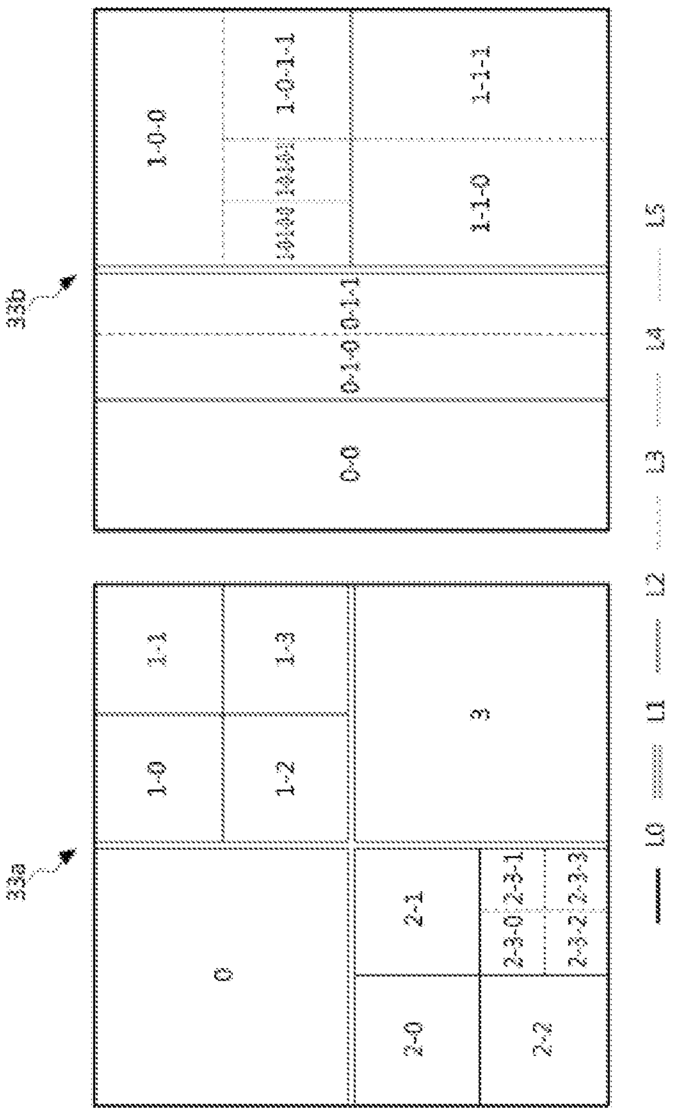
FIG. 33 is an example diagram illustrating tree-based partitioning according to an embodiment of the present invention.

FIG. 33 is an example diagram illustrating tree-based partitioning according to an embodiment of the present invention.

Referring to blocks in Sections 33A and 33B, a thick solid line L0 may represent the maximum encoding block, and a block partitioned with a thick solid line and other lines L1 to L5 may represent a partitioned encoding block. The number inside the block may represent the location of a sub-block obtained through partitioning (here in a raster scan order), and the number of '-' may represent a partitioning depth of a corresponding block, and the number of a boundary line between blocks may represent the number of times the partitioning is performed. For example, the order may be UL(0)-UR(1)-DL(2)-DR(3) when the block is 4-partitioned (here, a quad tree) and may be L or U(0)-R or D(1) when the block is 2-partitioned (here, a binary tree), which may be defined for each partitioning depth. The following example shows a case in which an acquirable encoding block is limited.

As an example, it is assumed that in Section 33A, the maximum encoding block is 64×64, the minimum encoding block is 16×16, and the quad-tree partitioning is used. In this case, since blocks 2-0, 2-1, and 2-2 (here, 16×16) have the same size as the minimum encoding block, the blocks may not be partitioned into smaller blocks such as blocks 2-3-0, 2-3-1, 2-3-2 and 2-3-3 (here, 8×8). In this case, a block acquirable from the blocks 2-0, 2-1, 2-2, and 2-3 may be a 16×16 block. In other words, since there is only one candidate block, block partitioning information is not generated.

As an example, it is assumed that in Section 33B, the maximum encoding block is 64×64 and the minimum encoding block has a width of 8 or a height of 8 and an allowable partitioning depth of 3. In this case, a block 1-0-1-1 (here, having a size of 16×16 and a partitioning depth of 3) may be partitioned into smaller blocks because the minimum encoding block condition is satisfied. However, the block 1-0-1-1 may not be partitioned into blocks with a higher partitioning depth (here, a block 1-0-1-0-0 and a block 1-0-1-0-1) because the block 1-0-1-1 has the same allowable partitioning depth. In this case, a block acquirable from the blocks 1-0-1-0 and 1-0-1-1 may be a 16×8 block. In other words, since there is only one candidate block, block partitioning information is not generated.

Like the above example, the quad-tree partitioning or the binary-tree partitioning may be supported depending on encoding/decoding settings. Alternatively, the quad-tree partitioning and the binary-tree partitioning may be supported in combination. For example, one or a combination of the schemes may be supported according to a block size, a block depth, etc. The quad-tree partitioning may be supported when a block belongs to a first block range, and the binary-tree partitioning may be supported when a block belongs to a second block range. When a plurality of partitioning schemes are supported, at least one setting such as the maximum encoding block size, the minimum encoding block size, an allowable partitioning depth, and the like may be provided according to each scheme. The ranges may or may not overlap each other. Alternatively, any one range may be set to include the other range. The setting may be determined according to individual or combined elements such as a slice type, an encoding mode, a color component, and the like.

As an example, the partitioning settings may be determined according to a slice type. The partitioning settings supported for I-slice may support partitioning in the range from 128×128 to 32×32 for the quad tree and may support partitioning in the range from 32×32 to 8×8 for the binary tree. The block partitioning settings supported for P/B-slice may support partitioning in the range from 128×128 to 32×32 for the quad tree and may support partitioning in the range from 64×64 to 8×8 for the binary tree.

As an example, the partitioning settings may be determined according to an encoding mode. The partitioning settings supported when the encoding mode is an intra mode may support partitioning in the range from 64×64 to 8×8 and have an allowable partitioning depth of 2 for the binary tree. The partitioning settings supported when the encoding mode is an inter mode may support partitioning in the range from 32×32 to 8×8 and have an allowable partitioning depth of 3 for the binary tree.

As an example, the partitioning settings may be determined according to a color component. The partitioning settings when the color component is a luminance component may support partitioning in the range from 256×256 to 64×64 for the quad tree and may support partitioning in the range of 64×64 to 16×16 for the binary tree. The partitioning settings when the color component is a chrominance component may support the same settings (here, a setting in which the length of each block is proportional to the chrominance format) as those of the luminance component for the quad tree and may support partitioning in the range (here, the same range for the luminance component is from 128×128 to 8×8; 4:2:0 is assumed) from 64×64 to 4×4 for the binary tree.

According to the above example, different partitioning settings are applied depending on a block type. Also, some blocks may be combined with other blocks, and thus a single partitioning process may be performed. For example, when an encoding block and a transformation block are combined into one unit, a partitioning process for acquiring an optimal block size and form may be performed. Thus, the optimal block size and form may be the optimal size and form of the transformation block as well as the optimal size and form of the encoding block. Alternatively, the encoding block and the transformation block may be combined into one unit, the prediction block and the transformation block may be combined into one unit, or the encoding block, the prediction block, and the transformation block may be combined into one unit. Also, other combinations of the blocks may be possible.

According to the present invention, the case in which partitioning settings are applied individually to each block has been described, but a plurality of units may be combined into a single unit to have a single partitioning setting.

The encoder may add the information generated during the above process to a bitstream in units of at least one of sequences, pictures, slices, tiles, and the like, and the decoder may parse related information from the bitstream.

In the present invention, the prediction part may be classified into intra-prediction and inter-prediction, and intra-prediction and inter-prediction may be defined as follows.

Intra-prediction may be technology for generating a predicted value from a region in which encoding/decoding of the current image (for example, a picture, a slice, a tile, and the like) is completed, and inter-prediction may be technology for generating a predicted value from at least one image (for example, a picture, a slice, a tile, and the like) in which encoding/decoding is completed before the current image.

Alternatively, intra-prediction may be a technology for generating a predicted value from a region in which encoding/decoding of the current image is completed, but some prediction methods {e.g., a method of generating a predicted value from a reference picture, block matching, template matching, and the like} may be excluded. Inter-prediction may be a technology for generating a predicted value from at least one image in which encoding/decoding is completed, and the image in which encoding/decoding is completed may be configured to include the current image.

According to encoding/decoding settings, one of the above definitions is followed. In the following example, description will be provided assuming that the second definition is followed. Further, a predicted value is described on the assumption that it is a value obtained through prediction in a spatial domain, but is not limited thereto.

Hereinafter, inter-prediction of the prediction part in the present invention will be described.

Inter-prediction in the image encoding method according to the embodiment of the present invention may be configured as follows. Inter-prediction of the prediction part may include a reference picture construction step, a motion estimation step, a motion compensation step, a motion information determination step, and a motion information encoding step. Further, the image encoding apparatus may be configured to include a reference picture construction part, a motion estimation part, a motion compensation part, a motion information determination part, and a motion information encoding part, which perform the reference picture construction step, the motion estimation step, the motion compensation step, the motion information determination step, and the motion information encoding step, respectively. Some of the above-described processes may be omitted, other processes may be added, or the order may be changed into another order.

Figure 34:
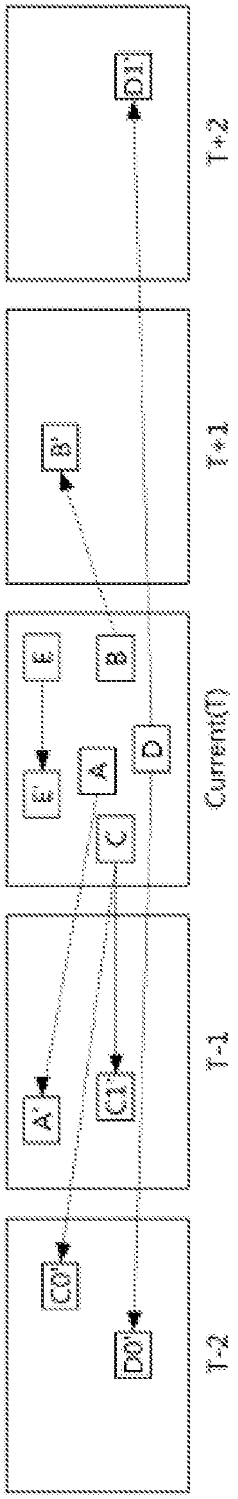
FIG. 34 is an example diagram illustrating various cases in which a prediction block is obtained through inter-prediction.

FIG. 34 is an example diagram illustrating various cases in which a prediction block is obtained through inter-prediction.

Referring to FIG. 34, in uni-directional prediction, a prediction block (A) may be obtained from a previously encoded reference picture (T−1 and T−2), or a prediction block (B) may be obtained from a subsequently encoded reference picture (T+1 and T+2). In bi-directional prediction, prediction blocks (C and D) may be obtained from a plurality of previously encoded reference pictures (T−2 to T+2). In general, a P image type may support uni-directional prediction, and a B image type may support bi-directional prediction.

Like the above example, a picture referenced in encoding/decoding of the current picture may be obtained from a memory. With respect to the current picture (T), a reference picture list may be constructed in a manner that a reference picture before the current picture and a reference picture after the current picture in time order or display order are included.

Inter-prediction (E) may be performed on the current image as well as previous or subsequent images with respect to the current image. Performing inter-prediction in the current image may be referred to as non-directional prediction. This may be supported in the I image type or in the P/B image type, and the supported image type may be determined according to encoding/decoding settings. Performing inter-prediction in the current image is intended to generate a prediction block using spatial correlation and is different from performing inter-prediction in another image in order to use temporal correlation, but the prediction method (e.g., a reference picture, a motion vector, and the like) may be the same.

The reference picture construction part may construct and manage, through the reference picture list, a reference picture used in encoding of the current picture. At least one reference picture list may be constructed according to encoding/decoding settings (e.g., the image type, the prediction direction, and the like), and a prediction block may be generated from a reference picture included in the reference picture list. For example, in the case of uni-directional prediction, inter-prediction may be performed on at least one reference picture included in a reference picture list 0 (L0) or a reference picture list 1 (L1). Further, in the case of bi-directional prediction, inter-prediction may be performed on at least one reference picture included in a combined list (LC) that is generated combining the L0 and the L1.

In general, the optimal reference picture for a picture to be encoded may be determined by the encoder, and a method of explicitly transmitting information on the reference picture to the decoder may be used. To this end, the reference picture construction part may perform management of a picture list referenced in inter-prediction of the current picture, and may set a rule for reference picture management by taking a limited memory size into consideration.

The transmitted information may be defined as a reference picture set (RPS). A picture selected as the RPS may be classified into a reference picture and may be stored in a memory (or a DPB). Pictures not selected as the RPS may be classified into non-reference pictures and may be removed from the memory after a predetermined time. The memory may store a predetermined number of pictures (e.g., 16 pictures for HEVC), and the size of the memory may be set according to the level and resolution of the image.

Figure 35:
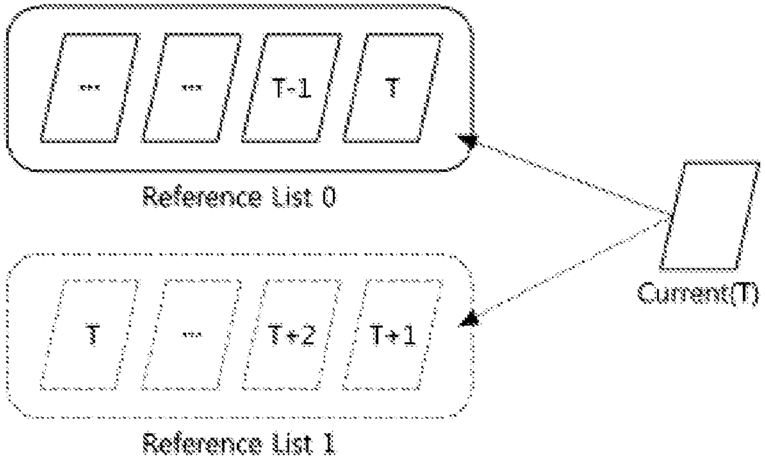
FIG. 35 is an example diagram illustrating composition of a reference picture list according to an embodiment of the present invention.

FIG. 35 is an example diagram illustrating composition of a reference picture list according to an embodiment of the present invention.

Referring to FIG. 35, in general, the reference pictures (T−1 and T−2) that are present before the current picture may be assigned to the L0, and the reference pictures (T+1 and T+2) that are present after the current picture may be assigned to the L1 for management. In constructing the L0, when not reaching the allowed number of reference pictures of the L0, the reference picture of the L1 is assigned. Similarly, in constructing the L1, when not reaching the allowed number of reference pictures of the L1, the reference picture of the L0 is assigned.

Further, the current picture may be included in at least one reference picture list. For example, the current picture may be included in the L0 or the L1; the L0 may be constructed by adding a reference picture (or current picture) of which the temporal order is T to a reference picture before the current picture; or the L1 may be constructed by adding a reference picture of which the temporal order is T to a reference picture after the current picture.

Composition of the reference picture list may be determined according to encoding/decoding settings. For example, the current picture may not be included in the reference picture list or may be included in at least one reference picture list, which may be determined by a signal (or a signal for allowing a method, such as block matching in the current picture, and the like) indicating whether to include the current picture in the reference picture list. The signal may be supported in units of sequences, pictures, slices, tiles, and the like.

Further, the current picture may be positioned in the beginning or the end of the reference picture list as shown in FIG. 35, and the arrangement order within the list may be determined depending on encoding/decoding settings (e.g., type information of an image, and the like). For example, in the case of the I type, the current picture may be positioned in the beginning, and in the case of the P/B type, the current picture may be positioned in the end. The present invention is not limited thereto, and modifications may be provided thereto.

The reference picture construction part may include a reference picture interpolation part. According to interpolation precision of inter-prediction, whether to perform an interpolation process for a pixel of a decimal unit may be determined. For example, when having interpolation precision of an integer unit, a reference picture interpolation process is omitted, and when having interpolation precision of a decimal unit, the reference picture interpolation process is performed.

An interpolation filer used in the reference picture interpolation process may be determined according to encoding/decoding settings. One preset interpolation filter {e.g., a discrete cosine transform based interpolation filter (DCT-IF), and the like} may be used, or one of a plurality of interpolation filers may be used. In the former case, selection information on the interpolation filter may be implicitly omitted, and in the latter case, the selection information on the interpolation filter may be included in units of sequences, pictures, slices, tiles, and the like.

The interpolation precision may be determined according to encoding/decoding settings, and may be precision of one among integer units and decimal units (e.g., ½, ¼, ⅛, 1/16, 1/32, and the like). The interpolation process may be performed according to one preset interpolation precision, or the interpolation process may be performed according to one precision of a plurality of interpolation precision.

Further, according to inter-prediction methods (e.g., a motion prediction method, a motion model, and the like), fixed interpolation precision or adaptive interpolation precision may be supported. For example, interpolation precision for a translation motion model and interpolation precision for a non-translation motion model may be the same or different from each other, which may be determined according to encoding/decoding settings. Interpolation precision-related information may be implicitly determined or explicitly generated, and may be included in units of sequences, pictures, slices, tiles, blocks, and the like.

The motion estimation part performs a process of estimating (or searching for) which block of which reference picture the current block has a high correlation with. The size and the shape (M×N) of the current block on which prediction is performed may be obtained from the block partitioning part, and description will be provided under assumption that support is possible in a range of 4×4 to 128×128 for inter-prediction. In general, inter-prediction is performed in units of prediction blocks, but is also performed in units of encoding blocks, transformation blocks, and the like according to the setting of the block partitioning part. Estimation is performed in a motion estimation range, and at least one motion estimation method may be used. In the motion estimation method, the estimation order, the condition of a pixel unit, and the like may be defined.

Motion estimation may be adaptively performed according to the motion prediction method. A region on which motion estimation is performed may be the current block in the case of block matching, and may be a template composed of a partial region of a block, which is adjacent to the current block, (e.g., left, upper, upper left, upper right, lower left blocks, and the like) in which encoding is completed in the case of template matching. Block matching may be a method of explicitly generating motion information, and template matching may be a method of implicitly obtaining motion information.

Here, template matching may be provided by a signal indicating support of an additional motion prediction method, and the signal may be included in units of sequences, pictures, slices, tiles, and the like. Further, a range of supporting template matching may be or may not be the same as a range (e.g., 4×4 to 128×128) of supporting block matching, or may be a limited range (e.g., 4×4 to 32×32). The range of supporting template matching may be determined according to encoding/decoding settings (e.g., an image type, a color component, and the like). When supporting a plurality of motion prediction methods, motion prediction method selection information is generated and is included in block units.

Further, motion estimation may be adaptively performed according to a motion model. In addition to the translation motion model considering only parallel translation, an additional motion model may be used to perform motion estimation and compensation. For example, motion estimation and compensation may be performed using a motion model considering motions such as rotation, perspective, zoom-in/out, and the like in addition to parallel translation. This may be supported to enhance encoding performance by generating a prediction block to which the above-described various types of motions generated according to a regional characteristic of an image are applied.

In the present invention, description is provided assuming that an affine motion model is a non-translation motion model. However, the present invention is not limited thereto, and modifications may be provided thereto. Here, the non-translation motion model may be provided by a signal indicating support of the additional motion model, and the signal may be included in units of sequences, pictures, slices, tiles, and the like. Further, a range of supporting the non-translation motion model may be or may not be the same as a range (e.g., 4×4 to 128×128) of supporting the translation motion model, or may be a limited range (e.g., 4×4 to 32×32), and may be determined according to encoding/decoding settings (e.g., an image type, a color component, and the like). When supporting a plurality of motion models, motion model selection information is generated and is included in block units.

Figure 36:
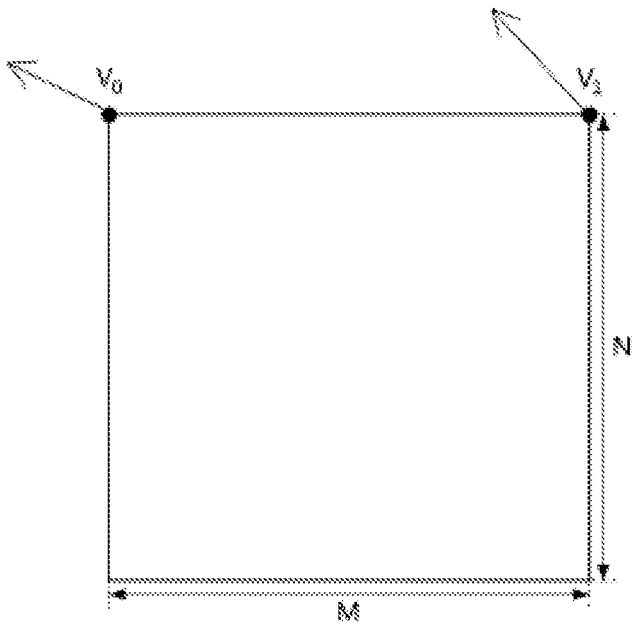
FIG. 36 is a conceptual diagram illustrating a non-translation motion model according to an embodiment of the present invention.

FIG. 36 is a conceptual diagram illustrating a non-translation motion model according to an embodiment of the present invention.

Referring to FIG. 36, in the case of the translation motion model, motion information is represented using a motion vector V0, whereas in the case of the non-translation motion model, additional motion information may be required for a motion vector V0. In this example, a case in which one additional motion vector V1 is used to represent motion information of the non-translation motion model is described, but other configurations (e.g., a plurality of motion vectors, rotation angle information, scale information, and the like) may also be possible.

In the case of the translation motion model, motion vectors of pixels included in the current block may be the same, and the same motion vectors in block units may be provided. One representative motion vector (V0) is used to perform motion estimation and compensation.

In the case of the non-translation motion model, motion vectors of pixels included in the current block may be different from each other, and individual motion vectors in pixel units may be provided. In this case, many motion vectors are required, so that a plurality of motion vectors (V0 and V1) that represent the motion vectors of the pixels included in the current block are used to perform motion estimation and compensation. That is, through the plurality of motion vectors, motion vectors in units of sub-blocks or pixels within the current block may be derived (or obtained).

For example, the motion vectors {in this example, (Vx, Vy)} in units of sub-blocks and pixels within the current block may be derived by Equation $Vx=(V1x-V0x)\times x/M-(V1y-V0y)\times y/N+V0x$, $Vy=(V1y-V0y)\times x/M+(V1x-V0x)\times y/N+V0y$. In the above equation, V0 {in this example, (V0x, V0y)} refers to the upper left motion vector of the current block, and V1 {in this example, (V1x, V1y)} refers to the upper right motion vector of the current block. Considering complexity, motion estimation and compensation of the non-translation motion model may be performed in sub-block units.

Figure 37:
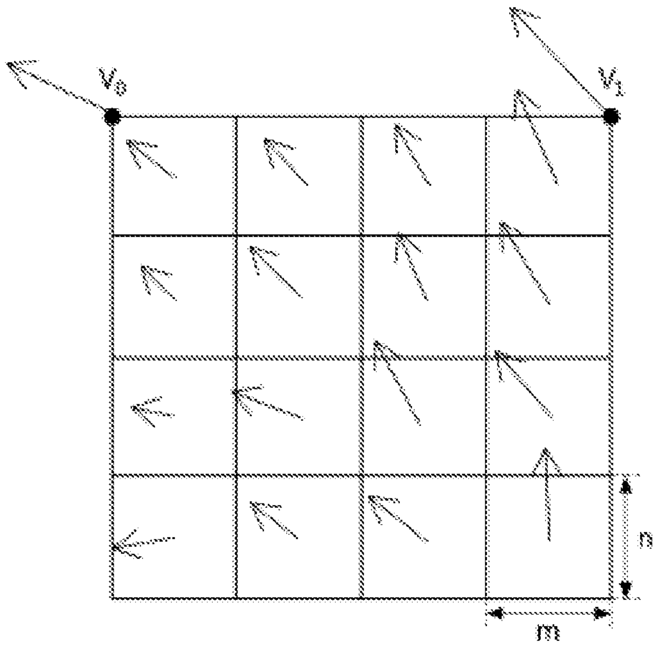
FIG. 37 is an example diagram illustrating motion estimation in sub-block units according to an embodiment of the present invention.

FIG. 37 is an example diagram illustrating motion estimation in sub-block units according to an embodiment of the present invention.

Referring to FIG. 37, the motion vector of the sub-block within the current block may be derived from a plurality of motion vectors (V0 and V1) that represent motion information of the current block, and motion estimation and compensation may be performed in sub-block units. Here, the size of the sub-block (m×n) may be determined according to encoding/decoding settings. For example, one fixed size may be set, or an adaptive size may be set on the basis of the size of the current block. The size of the sub-block may be supported in a range of 4×4 to 16×16.

In general, the motion estimation part may be an element existing in the encoding apparatus, but may also be an element existing in the decoding apparatus according to a prediction method (e.g., template matching, and the like). For example, in the case of template matching, the decoder may obtain motion information of the current block by performing motion estimation with a template adjacent to the current block. Here, motion estimation related information (e.g., a motion estimation range, a motion estimation method, template configuration information, and the like) may be implicitly or explicitly generated and may be included in units of sequences, pictures, slices, tiles, and the like.

The motion compensation part performs a process for obtaining data of some blocks of some reference pictures determined by the motion estimation process, as the prediction block of the current block. In detail, on the basis of motion information (e.g., reference picture information, motion vector information, and the like) obtained through the motion estimation process, the prediction block of the current block may be generated from at least one region (or block) of at least one reference picture included in a reference picture list.

The motion information determination part may perform a process for selecting optimal motion information of the current block. In general, using a rate-distortion technique in which distortion of a block {e.g., distortion of the current block and the restored block, sum of absolute difference (SAD), sum of square difference (SSD), and the like} and the number of bits caused by the motion information are considered, the optimal motion information in terms of encoding cost may be determined. The prediction block generated on the basis of the motion information that is determined through the process may be transmitted to the subtractor and to the adder. Further, the element may be included in the decoding apparatus according to some prediction methods (e.g., template matching, and the like), which may be determined on the basis of distortion of the block.

The motion information encoding part may encode motion information of the current block obtained through the motion information determination process. Here, the motion information may be composed of information on an image and a region referenced for the prediction block of the current block. In detail, it may be composed of information on the image (e.g., reference picture information, and the like) and information on the region (e.g., motion vector information, and the like).

Further, inter-prediction related setting information (e.g., a motion prediction method, motion model selection information, and the like) may be included in motion information of the current block. Configuration of information (e.g., the number of motion vectors, and the like) on the reference picture and the region may be determined on the basis of the inter-prediction related setting.

The reference picture information may be represented by a reference picture list, a reference picture index, and the like. Information on the reference picture list in use and information on the reference picture index may be encoded. Reference region information may be represented by a motion vector, and the like. A vector absolute value of each component (e.g., x and y) and sign information may be encoded.

Further, information on the reference picture and information on the reference region are configured as one combination, and motion information may be encoded. The combination of the information on the reference picture and the information on the reference region may be configured as a motion information encoding mode. Here, reference picture information and reference region information may be obtained from a neighboring block or a preset value (e.g., 0 <Zero> vector), and the neighboring block may be at least one spatially or temporally adjacent block. For example, motion information of the neighboring block or reference picture information may be used to encode motion information of the current block. Motion information of the neighboring block or information (or a median, information subjected to a transformation process, and the like) derived from reference picture information may be used to encode motion information of the current block. That is, motion information of the current block may be predicted from the neighboring block, and information thereon may be encoded.

In the present invention, a plurality of motion information encoding modes for motion information of the current block may be supported. Regarding the motion information encoding modes, one method among a skip mode, a merge mode, and a competition mode may be used to encode motion information.

The motion information encoding mode may be classified by settings for a combination of information on a reference picture and information on a reference region.

In the skip mode and the merge mode, motion information of the current block may be obtained from at least one candidate block (or a skip mode candidate group, a merge mode candidate group). That is, prediction information on the reference picture or the reference region may be obtained from the candidate block, and difference information there on is not generated. The skip mode is applied when the residual signal is zero, and the merge mode is applied when the residual signal is not zero.

In the competition mode, motion information of the current block may be obtained from at least one candidate block (or a competition mode candidate group). That is, prediction information on the reference picture or the reference region may be obtained from the candidate block, and difference information thereon may be generated.

A candidate group of the above mode may be adaptively constructed. For example, the skip mode and the merge mode may have the same configuration, and the competition mode may have a different configuration. The number of mode candidate groups may also be adaptively determined. For example, the skip mode and the merge mode may have a candidate groups, and the competition mode may have b candidate groups. Further, when the number of candidate groups for each mode is one, candidate selection information may be selected. When a plurality of candidate groups is supported, candidate selection information is generated.

According to one method determined from the above-described methods, motion information may be encoded. When the motion information encoding mode is the skip mode or the merge mode, a merge motion encoding process is performed. When the motion information encoding mode is the competition mode, a competition mode encoding process is performed.

In summary, in the merge motion encoding process, prediction information on the reference picture or on the reference region may be obtained, and the obtained prediction information may be encoded into motion information of the current block. Further, in the competition motion encoding process, prediction information on the reference picture or the reference region may be obtained. Difference information (e.g., mv-mvp=mvd, mv is current motion information, mvp is prediction motion information, and mvd is difference motion information) between the obtained prediction information and motion information of the current block may be encoded as motion information of the current block. In the former case, a residual signal may be or may not be encoded according to the motion information encoding mode.

The ranges of blocks in which each motion information encoding mode is supported according to encoding/decoding settings (e.g., an image type, a color component, and the like) may be the same or different from each other.

In addition, setting of the motion information encoding mode may be determined according to the setting related to inter-prediction. For example, in the case of template matching, the motion information encoding mode is not supported, and in the case of the non-translation motion model, a mode candidate group according to the motion vector may be supported differently in each motion information encoding mode.

The motion-related information generated through the motion information encoding part may be transmitted to the encoding part and recorded in the bitstream.

In the video decoding method according to an embodiment of the present invention, inter-prediction may be configured as follows. Inter-prediction of the prediction part includes a motion information decoding step, a reference picture construction step, and a motion compensation step. Further, the image decoding apparatus may be configured to include a motion information decoding part, a reference picture construction part, and a motion compensation part, which perform the motion information decoding step, the reference picture construction step, and the motion compensation step, respectively. Some of the above-described processes may be omitted, other processes may be added, or the order may be changed into another order. Further, a redundant description of the encoder will be omitted.

The motion information decoding part may receive the motion information from the decoding part to restore the motion information of the current block. The motion information may be restored from information such as a motion vector, a reference picture list, reference picture index, and the like for an image and a region that are referenced to generate the prediction block. Further, information on the reference picture and the reference region may be restored from the motion information encoding mode. Further, the inter-prediction related setting information may be restored.

The reference picture construction part may construct the reference picture in the same manner as the reference picture construction part of the encoder, and a detailed description thereof will be omitted.

The motion compensation part may perform motion compensation in the same manner as the motion compensation part of the encoder, and a detailed description thereof will be omitted. The prediction block generated through this process may be transmitted to the adder.

Hereinafter, inter-prediction according to an embodiment of the present invention will be described in detail. In the following example, the encoder will be mainly described.

In the resizing process of an image, resizing may be performed during the prediction step or before performing prediction, and resizing of the reference picture may be performed in the case of inter-prediction. Alternatively, in the resizing process of the image, resizing may be performed at initial stage of encoding and decoding, and the resizing of an encoded picture may be performed in the case of inter-prediction.

For example, when expanding a reference picture (default size), expansion into a reference picture (expanded size) of the current encoding picture is possible. Alternatively, when expanding an encoding picture (default size), storage (expanded size) in a memory is possible after encoding is completed, and use as a reference picture (extended size) of another encoding picture is possible. Alternatively, when expanding an encoding picture (a default size), reduction and storage (a default size) in a memory is possible after encoding is completed, and use as a reference picture (an expanded size) of another encoding picture is possible through a reference picture expansion process.

Inter-prediction of a 360-degree image in which an image resized through various cases as described above is used will be described later.

Figure 38:
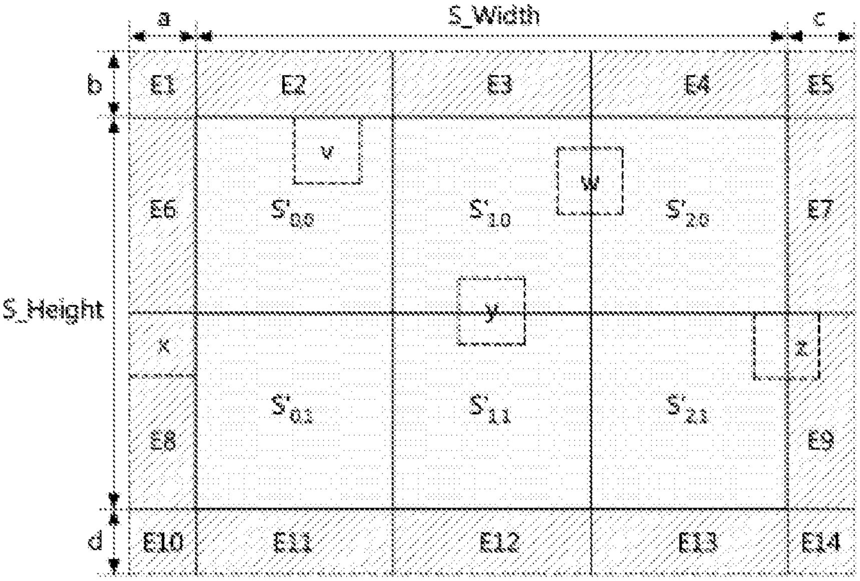
FIG. 38 is an exemplary diagram illustrating that inter-picture prediction is performed using an expanded picture according to an embodiment of the present invention.

FIG. 38 is an exemplary diagram illustrating that inter-picture prediction is performed using an expanded picture according to an embodiment of the present invention. It shows inter-prediction in a CMP projection format of a 360-degree image.

Referring to FIG. 38, an image means a reference picture, and an example of a prediction block (V to Z in FIG. 38, a size of 2M×2N) obtained from the current block (not shown in the figure) of the encoding picture through inter-prediction is shown. In FIG. 38, existing regions may be S'0,0 to S'2, 1, and expanded regions may be E1 to E14. This example may be an example of resizing as shown in Section 27C of FIG. 27. Resizing values are expanded by b, d, a, and c in up, down, left, and right directions. Description is provided assuming expansion into a size (2M×2N) of a prediction block obtained from the block partitioning part.

A description is provided assuming that some data processing methods (e.g., a filling method by transforming a specific region of an image) are used for resizing a picture. Further, a group of S'0,0+S'1,0+S'2,0, and a group of S'0, 1+S'1,1+S'2,2 may be in succession. E8 may be obtained from S'2,1, or E9 may be obtained from S'0,1. The image continuity between the faces of the current drawing is based on the image continuity according to FIGS. 21, 24, and 25.

In the case of V, V may be obtained as a prediction block in the existing region (S'0,0).

In the case of W, W is positioned over a plurality of existing regions (S'1,0, S'2,0), and the plurality of existing regions are faces having continuity, so that W may be obtained as a prediction block. Alternatively, division into M×2N belonging to a specific existing region (S'1,0) and M×2N belonging to a specific existing region (S'2,0) is possible. The plurality of existing regions has the characteristics of distorted continuity with respect to a face boundary, so that acquisition as a sub-prediction block is possible.

In the case of X, X is positioned in an expanded region (E8), and the expanded region is a region obtained using data of the region (S'2, 1) having a high correlation with the existing region (S'0,1), so that acquisition as a prediction block is possible. When resizing of an image is not performed, acquisition as a prediction block from the existing region (S'2,1) is possible.

In the case of Y, Y is positioned over a plurality of existing regions (S'1,0, S'1,1), and the plurality of existing regions are faces not having continuity, so that acquisition as a sub-prediction block is possible by being partitioned into 2M×N belonging to a specific existing region (S'1,0) and 2M×N belonging to a specific existing region (S'1,1).

In the case of Z, Z is positioned over a specific existing region (S'2, 1) and a specific expanded region (E9), and the expanded region is a region obtained using data of the region (S'0,1) having a high correlation with the existing region (S'2,1), so that acquisition as a prediction block is possible. When resizing of an image is not performed, acquisition as a sub-prediction block is possible by being partitioned into M×2N belonging to a specific existing region (S'2,1) and M×2N belonging to a specific existing region (S'0,1).

As in the above example, a prediction block such as X and Z is obtained by expanding the outer boundary of an image (assuming that the distorted continuity between the existing region and the expanded region is removed by using the data processing method in this example), thereby enhancing coding performance. However, due to the face boundary within an image having no continuity, partitioning into sub-blocks such as Y takes place, which may degrade encoding performance. Further, there is a case in which although continuity within an image is present, it is difficult to obtain an accurate prediction block like W due to the face boundary having distorted continuity. To this end, resizing at the inner boundary (e.g., the boundary between faces) of the image may be considered.

Figure 39:
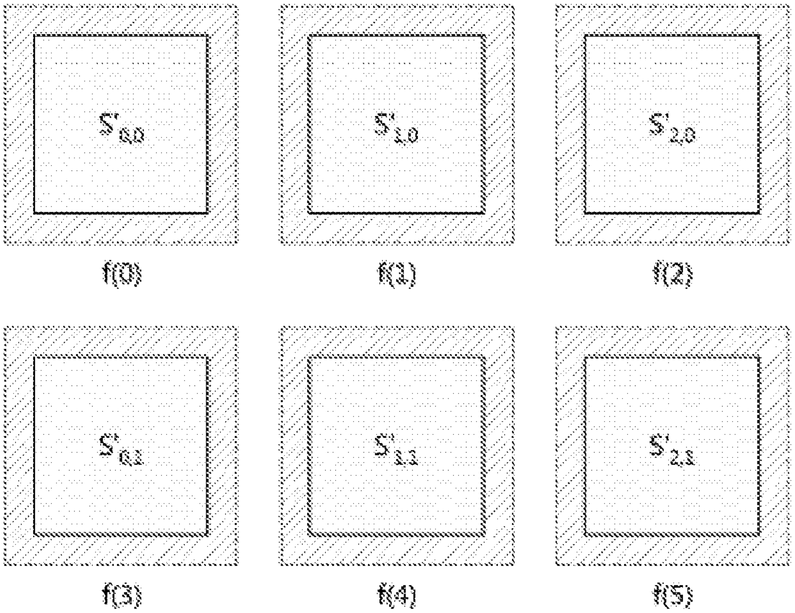
FIG. 39 is a conceptual diagram illustrating an expansion of a face unit according to an embodiment of the present invention.

FIG. 39 is a conceptual diagram illustrating an expansion of a face unit according to an embodiment of the present invention.

As shown in FIG. 39, inter-prediction efficiency may be enhanced by performing expansion of the face unit. This example may be an example of resizing as shown in Section 27A. In Section 27A, resized faces compose one picture. Conversely, in this example, resized faces are configured as individual sub-pictures. In this example, an expanded face unit is referred to as a partial image.

The partial image may be temporarily used for the existing reference picture, or may be used instead of the existing reference picture, or may be used continuously with the existing reference picture. In the following example, the case of being used instead of the existing reference picture will be mainly described.

During inter-prediction in an image (picture), a prediction block may be obtained from a block designated by the motion vector of the current block.

During inter-prediction in the partial image (face), it is possible to check which partial image the block designated by the motion vector of the current block belongs to, thereby obtaining the prediction block in the partial image. Here, it is possible to determine, from the picture, which partial image the block belongs to.

Hereinafter, various cases in which a prediction block is obtained from a partial image will be described. Here, various examples will be described with reference to V to Z in FIG. 38. In FIG. 38, a case of non-expanded image (S_Width×S_Height) is assumed.

For example, in the case (V) of belonging to one face, a prediction block may be obtained from a partial image (f0) related to the face.

For example, in the cases (W and Y) of belonging to a plurality of faces, a prediction block may be obtained from a partial image (f1 or f2 for w, and f1 or f4 for Y) related to a face including more pixels. Here, when including the same number of pixels, which face the block belongs to may be determined according to a preset rule.

For example, in the case (Z) of partially belonging to one face, a prediction block may be obtained from a partial image (f5) related to the face.

For example, in the case (X) of not belonging to any face, a prediction block may be obtained from a partial image (f3) related to the adjacent face.

The above example is a specific example in which the partial image is used to perform inter-prediction. The present invention is not limited thereto, and other definitions and other modifications may be provided thereto.

Figure 40:
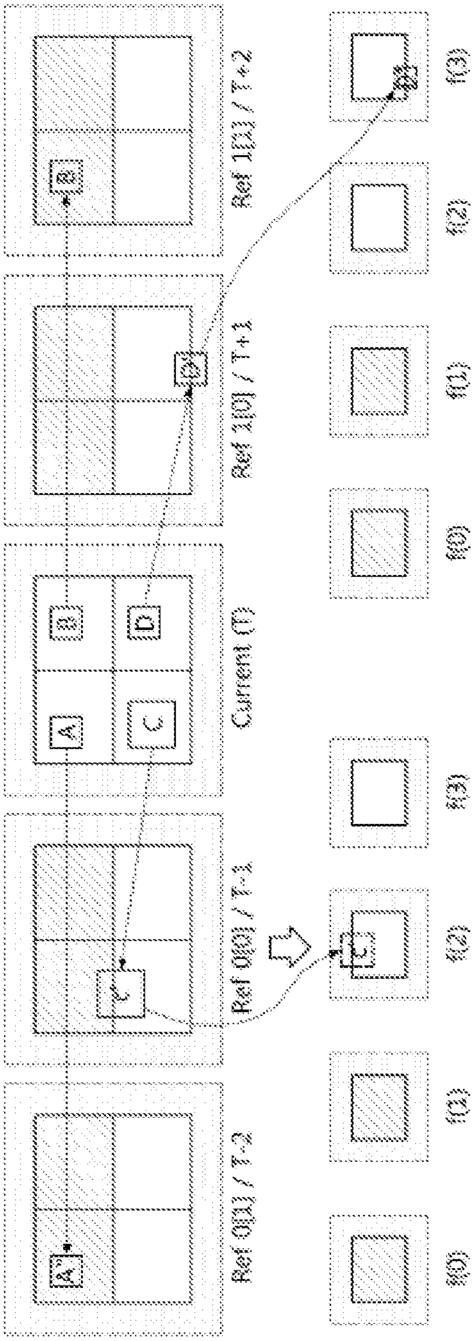
FIG. 40 is an example diagram illustrating that inter-picture prediction is performed using an expanded image according to an embodiment of the present invention.

FIG. 40 is an example diagram illustrating that inter-prediction is performed using an expanded image according to an embodiment of the present invention.

Referring to FIG. 40, an example of obtaining prediction blocks (A' to D', C'', and D'' in FIG. 40) from reference pictures (Ref 0[1], Ref 0[0], Ref 1[0], and Ref 1[1] in FIG. 40) by performing inter-prediction of the current blocks (A to D in FIG. 40) is shown. Alternatively, an example of obtaining a prediction block from a partial image (f0 to f3 in FIG. 40) of the reference picture. Herein, f(0) to f(3) may mean an area expanded in a face unit for each face when each reference picture is composed four faces, upper left face, upper right face, lower left face, and lower right faces. Herein, the above-described description of FIG. 27 may be referred to regarding the expansion in a face unit.

In the following example, inter-prediction in an expanded image and inter-prediction in a partial image as shown in FIG. 38 will be described and are referred to as a first method and a second method, respectively. Further, a description is provided assuming that some data processing methods (for example, a method of transforming and filling a specific region of an image) are used for resizing.

In the case of block A, in the first method, a prediction block (A') may be obtained from a default region of a specific reference picture (Ref 0[1]), and in the second method, a prediction block (A') may be obtained from a specific partial image (f0) of a specific reference picture (Ref 0[1]).

In the case of block B, in the first method, a prediction block (B') may be obtained from a default region of a specific reference picture (Ref 1[1]), and in the second method, a prediction block (B') may be obtained from a specific partial image (f0) of a specific reference picture (Ref 1[1]).

In the case of block C, in the first method, a sub-prediction block (C' is assumed as a case of vertical partitioning) may be obtained from a plurality of default regions of a specific reference picture (Ref 0[0]), and in the second method, a prediction block (C'') may be obtained from a specific partial image (f2) of a specific reference picture (Ref 0[0]).

In the case of block D, in the first method, a prediction block (D') may be obtained from a default region and an expanded region of a specific reference picture (Ref 1[0]), and in the second method, a prediction block (D'') may be obtained from a specific partial image (f3) of a specific reference picture (Ref 1[0]).

In the above example, in the case of blocks A and B, the inter-prediction results of the existing image, the expanded image, and the partial image are the same. In the case of block D, the inter-prediction results of the expanded image and the partial image are the same, but are different from the inter-prediction result of the existing image. In the case of block C, the inter-prediction results of the existing image and the expanded image are the same, but are different from the inter-prediction result of the partial image.

In summary, in inter-prediction of the expanded image, considering the characteristics of the 360-degree image, the outside of the image boundary is expanded, and the region is filled with data having a high correlation for use in inter-prediction, but due to the characteristic of the inner boundary of the image, prediction efficiency may be decreased. In inter-prediction of the partial image, inter-prediction may be performed considering the above-described problem, so that prediction efficiency may be increased.

A method of decoding a 360-degree image according to an embodiment of the present invention may include receiving a bitstream in which the 360-degree image is encoded, generating a predicted image with reference to syntax information acquired from the received bitstream, acquiring a decoded image by combining the generated predicted image with a residual image acquired by inversely quantizing and inversely transforming the bitstream, and reconstructing the decoded image into the 360-degree image according to a projection format.

Here, the syntax information may include projection format information for the 360-degree image.

Here, the projection format information may be information indicating at least one of an ERP format in which the 360-degree image is projected into a 2D plane, a CMP format in which the 360-degree image is projected to a cube, an OHP format in which the 360-degree image is projected to an octahedron, and an ISP format in which the 360-degree image is projected to a polyhedron.

Here, the reconstructing may include acquiring arrangement information according to region-wise packing with reference to the syntax information and rearranging blocks of the decoded image according to the arrangement information.

Here, the generating of the predicted image may include performing image expansion on a reference picture acquired by restoring the bitstream, and generating a predicted image with reference to the reference picture on which the image expansion is performed.

Here, the performing of the image expansion may include performing image expansion on the basis of a partitioning unit of the reference picture.

Here, the performing of the image expansion on the basis of the partitioning units may include generating an expanded region individually for each partitioning unit, using a boundary pixel of the partitioning unit.

Here, the expanded region may be generated using a boundary pixel of a partitioning unit spatially adjacent to a partitioning unit to be expanded or using a boundary pixel of a partitioning unit having image continuity with a partitioning unit to be expanded.

Here, the performing of the image expansion on the basis of the partitioning unit may include generating an expanded image for a region where two or more partitioning units that are spatially adjacent to each other among the partitioning units are combined, using a boundary pixel of the combined region.

Here, the performing of the image expansion on the basis of the partitioning unit may include generating an expanded region between the adjacent partitioning units that are spatially adjacent to each other among the partitioning units, using all adjacent pixel information of the adjacent partitioning units.

Here, the performing of the image expansion on the basis of the partitioning unit may include generating the expanded region using an average value of adjacent pixels of each of the spatially adjacent partitioning units.

Here, the generating of the prediction picture may include generating the prediction block of the current block to be decoded using a reference region that is included within at least one reference picture and is set in a region having image continuity between faces according to the projection format by referencing to the motion information acquired from the syntax information.

Here, the reference picture may be expanded in up, down, left, and right directions on the basis of image continuity according to the projection format, and then the reference region may be set.

Here, the reference picture may be expanded in a face unit, and the reference region may be set over the face boundary.

Here, the motion information may include at least one among a reference picture list to which the reference picture belongs, an index of the reference picture, and a motion vector indicating the reference region.

Here, the generating of the prediction block of the current block may include partitioning the current block into a plurality of sub-blocks and generating a prediction block for each of the plurality of sub-blocks that result from the partitioning.

The methods according to the present invention may be realized in a program command format that may be executed by using diverse computing means, so as to be recorded in a computer-readable medium. The computer-readable medium may independently include a program command, a data file, a data structure, and so on, or may include a combination of the same. The program command being recorded in the computer-readable medium may correspond to a program command that is specifically designed and configured for the embodiments of the present invention, or the program command may correspond to a program command that is disclosed and available to anyone skilled in or related to computer software.

Examples of the computer-readable recording medium may include hardware devices, such as ROMs, RAMs, flash memories, and so on, specially configured for storing and executing program commands. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

In addition, a part or whole of the configurations or functions of the above-described method or apparatus may be implemented in a combined manner or separately.

Although the present invention has been described with reference to the exemplary embodiments, those skilled in the art will appreciate that various modifications and variations can be made in the present invention without departing from the spirit or scope of the invention described in the appended claims.

What is claimed is:

1. An image decoding method performed by an image decoding apparatus, the image decoding method comprising:

partitioning a current image into a plurality of sub-areas based on partitioning information, wherein the partitioning information includes first information specifying a number of the plurality of sub-areas and a second information specifying a top left position of a sub-area of the plurality of sub-areas;

obtaining a coding block by dividing a current sub-area among the plurality of sub-areas;

obtaining coding information for the current sub-area from the bitstream;

dividing the coding block in the current sub-area to obtain one or more sub-blocks based on the coding information, wherein the coding information includes at least one of a first syntax element indicating whether to divide the coding block to obtain the one or more sub-blocks, a second syntax element indicating whether to divide the coding block asymmetrically, or a third syntax element indicating whether a division direction for the coding block is a horizontal direction or a vertical direction, the first syntax element, the second syntax element and the third syntax element being different from each other;

obtaining a residual signal of the coding block by performing inverse-quantization and inverse-transformation on a first sub-block, the first sub-block belonging to the one or more sub-blocks; and reconstructing the coding block based on the residual signal and a prediction signal corresponding to the residual signal, wherein the prediction signal is generated by obtaining prediction information for the coding block from the bitstream, determining a prediction method for the coding block based on the prediction information, and performing prediction for the coding block based on the determined prediction method, wherein the prediction method is determined as one among a plurality of prediction methods including an intra prediction method.

2. An image encoding method performed by an image encoding apparatus, the image encoding method comprising:

partitioning a current image into a plurality of sub-areas based on partitioning information, the partitioning information being encoded into a bitstream, wherein the partitioning information includes first information specifying a number of the plurality of sub-areas and a second information specifying a top left position of a sub-area of the plurality of sub-areas;

obtaining a coding block by dividing a current sub-area among the plurality of sub-areas;

dividing the coding block in the current sub-area to obtain one or more sub-blocks, wherein coding information for dividing the coding block is encoded into the bitstream, and wherein the coding information includes at least one of a first syntax element indicating whether to divide the coding block to obtain the one or more sub-blocks, a second syntax element indicating whether to divide the coding block asymmetrically, or a third syntax element indicating whether a division direction for the coding block is a horizontal direction or a vertical direction, the first syntax element, the second syntax element and the third syntax element being different from each other; and encoding a residual signal of the coding block by performing a transform on a first-sub-block, the first sub-block belonging to the one or more sub-blocks, wherein the residual signal is obtained based on a prediction signal corresponding to the residual signal, wherein the prediction signal is generated by determining a prediction method for the coding block, and performing prediction for the coding block based on the determined prediction method, wherein the determined prediction method is encoded into the bitstream using prediction information, and wherein the prediction method is determined as one among a plurality of prediction methods including an intra prediction method.

3. A method of transmitting a bitstream comprising:

partitioning a current image into a plurality of sub-areas based on partitioning information, the partitioning information being encoded into the bitstream, wherein the partitioning information includes first information specifying a number of the plurality of sub-areas and a second information specifying a top left position of a sub-area of the plurality of sub-areas;

obtaining a coding block by dividing a current sub-area among the plurality of sub-areas;

dividing the coding block in the current sub-area to obtain one or more sub-blocks, wherein coding information for dividing the coding block is encoded into the bitstream, and wherein the coding information includes at least one of a first syntax element indicating whether to divide the coding block to obtain the one or more sub-blocks, a second syntax element indicating whether to divide the coding block asymmetrically, or a third syntax element indicating whether a division direction for the coding block is a horizontal direction or a vertical direction, the first syntax element, the second syntax element and the third syntax element being different from each other, encoding a residual signal of the coding block by performing a transform on a first-sub-block to generate the bitstream, the first sub-block belonging to the one or more sub-blocks; and transmitting the bitstream, wherein the residual signal is obtained based on a prediction signal corresponding to the residual signal, wherein the prediction signal is generated by determining a prediction method for the coding block, and performing prediction for the coding block based on the determined prediction method, wherein the determined prediction method is encoded into the bitstream using prediction information, and wherein the prediction method is determined as one among a plurality of prediction methods including an intra prediction method.

* * * * *